United States Patent [19]
Akao

[11] Patent Number: 6,013,723
[45] Date of Patent: Jan. 11, 2000

[54] INJECTION MOLDED ARTICLE USED WITH A PHOTOSENSITIVE MATERIAL

[75] Inventor: Mutsuo Akao, Kanagawa, Japan

[73] Assignee: Fuji Photo Film Co., Ltd., Kanagawa, Japan

[21] Appl. No.: 08/982,516

[22] Filed: Dec. 2, 1997

[30] Foreign Application Priority Data

Dec. 3, 1996 [JP] Japan .................................. 8-323149
Mar. 7, 1997 [JP] Japan .................................. 9-052852
Mar. 7, 1997 [JP] Japan .................................. 9-070843

[51] Int. Cl.⁷ .......................... C08K 25/00; C08L 27/00; C08L 31/00
[52] U.S. Cl. .......................... 524/577; 524/353; 524/399; 524/558; 524/568; 524/593; 524/612
[58] Field of Search .................................. 524/353, 399, 524/558, 568, 577, 593, 612

[56] References Cited

U.S. PATENT DOCUMENTS 5,470,919 11/1995 Tojo et al. ........................ 525/334.1

*Primary Examiner*—Kriellion Sanders
*Attorney, Agent, or Firm*—Sughrue, Mion, Zinn Macpeak & Seas, PLLC

[57] ABSTRACT

Injection molding is performed by using a thermoplastic resin composition including a thermoplastic resin of 30 wt. % or more, a lubricant and an antioxidant. The thermoplastic resin is polymerized with a single-sight catalyst and has molecular-weight distribution of 1.1–5.0. The thermoplastic resin polymerized by using the single-sight catalyst is used for an injection molded article so that the injection molded article is superior in physical strength and blocking proofness. By adding the lubricant and the antioxidant to the thermoplastic resin composition, lubricity and antioxidant thereof may be improved.

25 Claims, 12 Drawing Sheets

MOLDING PROGRAM OF FILM CASSETTE CONTAINER BODY

INJECTION MOLDED ARTICLE USED WITH A PHOTOSENSITIVE MATERIAL

BACKGROUND OF THE INVENTION

1. Field of the Invention

The present invention relates to an injection molded article used with a photosensitive material, and more particularly to an injection molded article having various characteristics, for example, oil resistance, resistance to organic solvents, heat resistance, tasteless property, non-odorous property, non-toxicity, moisture absorption resistance, dimensional stability, surface hardness, and fracture resistance.

2. Description of the Related Art

A photosensitive material has a membrane consisting of photographic emulsion and formed on a support member by a method of coating or deposition. The photosensitive material is classified into a photographic film, a dry plate, a photographic paper and so forth in accordance with a kind of the support member. The photographic film uses a resin film as the support member. As the photographic film, there are, for example, various roll films having a size of from 8 mm to 1,000 mm, a cabinet of 4 cm×5 cm and various sheet films having a size of B5, A4, B4 and A4. These photosensitive materials are sold in a state that they are light-tightly contained in a package constituted of injection molded articles made of a thermoplastic resin including a light shielding material.

Homopolystyrene resin being GP polystyrene resin (hereinafter GPPS resin), in which only styrene monomer is polymerized, has good dimensional stability. Moreover, the homopolystyrene resin does not have any taste, any odor and any toxicity. Thus, the homopolystyrene resin is manufactured in great quantities for transparent containers. However, the homopolystyrene resin tends to be damaged by some of oils and organic solvents, and does not have sufficient resistance to climate and heat. Further, it tends to be electrostatically charged and is inferior in resistance to fracture. Therefore, rubber including polystyrene resin (generally called high impact polystyrene resin or impact resistance polystyrene resin, hereinafter HIPS) is used for an injection molded article requiring light shielding property and including a light shielding material of carbon black and so forth (refer to Japanese Patent Laid-Open Publication No. 1-312538). In the HIPS resin, for example, synthetics rubber of butadiene rubber and so on is graft copolymerized for the styrene monomer.

The synthetic rubber is included in the HIPS resin. A rubber-like material of such synthetic rubber and so forth gives bad influences (fog, sensitization and so on) for the photographic property of the photosensitive material. Accordingly, content of the rubber-like material is restricted to 1–12% (refer to Japanese Patent Laid-Open Publication No. 6-313948).

By the way, polypropylene-based resin was used for a container body of a film cassette container. As to the container body, the dimensional stability of the injection molded article is not required so much, however, it is required to be superior in moistureproofness, transparency, rigidity, appearance, molding cycle and impact strength (refer to Japanese Patent Publication No. 2-38939). In the polypropylene-based resin, the content of propylene resin having high melt index (16–80 g/10 min) is 70 wt. % or more.

Moreover, high-pressure ramification low-density polyethylene resin (hereinafter LDPE resin) having high melt index (7–40 g/10 min) has been used for a cap of the film cassette container (refer to Japanese Patent Publication No. 6-29953). As to the cap, the dimensional stability of the injection molded article is not required so much, however, it is required to be superior in moistureproofness, suitable rigidity, molding cycle, impact strength, and fitting property for the container body.

However, when the injection molding is performed at rapid cycle, using the above resin composition and a multi-cavity die having a plurality of same cavities and cores, number of which is more than ten, dimensions of the injection molded articles become different according to molding position. In consequence, fitting with the container body becomes worse. Further, the moistureproofness becomes worse and fitting strength reduces. Therefore, there arise a problem in that the cap may be easily separated from the container body by being dropped from a hand and by pressing with heavy thing during transportation. If the cap comes off, the moistureproofness is not kept. Further, photographic property of the photographic film is not kept and the photographic film cassette are not protected. In order to solve this problems, it is considered that the molding cycle is lengthened so as to take out the injection molded article from the die after it was completely cooled. However, in this case, the productivity is greatly decreased.

The rubber-like material and the light shielding material lower the flowability of the resin so that the injection moldability becomes worse. Further, weld lines occur on a surface of the injection molded article made of the resin composition so that its appearance is damaged. Moreover, upon adding the rubber-like material and the light shielding material, the elasticity of the resin lowers so that the injection molded article made of the resin composition including them can not obtain sufficient physical strength. Accordingly, it is difficult to maintain the wear resistance and the resistance to scuffing at high level.

As to the injection molded article made of the conventional high-impact polystyrene resin, heat distortion temperature thereof is low. Accordingly, when the package for the photosensitive material, which is used under the sun light such as a lens-fitted film unit, a camera, a photo film cassette made of resin, a sheet film unit and so forth, is made of such injection molded articles, the package is distorted by heat of the sun light, impact from outside and friction force. Thus, there is possibility that loading to the camera or advancement of the photographic film becomes impossible. Moreover, even if photographing can be performed, there is possibility that fatal troubles for the photosensitive material occur, for example, the light shielding property is damaged by the distortion of the package, the photographic fog occurs on the photosensitive material, the flaw is generated on a photographic emulsion face during film advancement, the dust adheres to the photographic emulsion, and so forth. Furthermore, the resistance to chemicals is inferior and the distortion is caused by benzene, toluene, acetone, ethyl acetate and so forth. Therefore, there arises a problem that it is impossible to keep the light shielding property, the dimensional accuracy and so forth.

SUMMARY OF THE INVENTION

In view of the foregoing, it is a primary object of the present invention to provide an injection molded article used with a photosensitive material in which the cost is low, a bad influence is not given to the photographic property of the photosensitive material and various characteristics required as the injection molded article are obtainable.

It is a second object of the present invention to provide an injection molded article used with a photosensitive material in which photographic property, heat resistance, resistance to chemicals, wear resistance, resistance to scuffing, injection moldability are improved.

In order to achieve the above and other objects, in a preferred embodiment, the injection molded article is made of thermoplastic resin composition in which thermoplastic resin polymerized with a single-sight catalyst and having the molecular-weight distribution of 1.1–5 is included by 30 wt. % or more. Thus, the injection molded article is superior in physical strength and blocking proofness.

Further, by adding a lubricant and an antioxidant, lubricity and anti-oxidant property are improved. When the thermoplastic resin is polyolefin resin, compatibility becomes excellent, moreover, injection moldability and lubricant adding effect are improved. By adding a nucleating agent, crystal is grown to improve transparency, impact resistance, rigidity, hardness and dimensional stability. Light shielding property is improved by containing a light shielding material in the other light shielding material. When at least two kinds of the light shielding material having different Mohs hardness, for example, the light shielding material having greater Mohs hardness rather than carbon black, are used together, dispersion property of the carbon black is further improved and light shielding ability may be improved more than 20% (similar light shielding property is obtained if content of the carbon black is reduced by about 20%). Static trouble is reduced by containing a conductive material. When syndiotactic polystyrene resin is used, high crystalline and high polymerizability are obtained. Further, heat resistance is improved and polymerization is performed at low cost.

In another embodiment, as the injection molding material, the thermoplastic resin composition including crystalline syndiotactic polystyrene resin by 50 wt. % or more is used. The syndiotactic polystyrene resin has melt flow rate of 1 to 50 g/10 min. The injection moldability and the dimensional accuracy are excellent and the physical strength, the heat resistance, the resistance to chemicals, the wear resistance and the resistance to scuffing are improved. From among the syndiotactic polystyrene resins, the resin, in which the styrene monomer is polymerized by using the single-sight catalyst and the melting point of which is 220–310° C., is selected to be used so that the heat resistance is improved without lowering the physical strength of the injection molded article. Thus, the distortion of the injection molded article due to heat and impact is prevented. Accordingly, occurrence of trouble lowering the photographic property of the photosensitive material, for example, photographic fog, flaw, adhesion of wastage and so forth are prevented.

In another embodiment, the injection molded article is made of the thermoplastic resin composition in which the thermoplastic resin is included by 30 wt. % or more, at least one kind of the lubricant and the hydrotalcite compound is included by 0.01–10 wt. %, and at least one kind of the antioxidant is included by 0.001–1.0 wt. %. The thermoplastic resin is polymerized by using the single-sight catalyst and has the molecular-weight distribution of 1.1–5. The single-sight catalyst comprises at least one kind of metallocene complexes of zirconium, titanium, hafnium and vanadium. Accordingly, the injection molded article according to the present invention has required various characteristics at the same time without giving bad influences (fog, change of the sensitivity, coloring trouble, unevenness of the density and so forth) for the photographic property of the photosensitive material.

As to the thermoplastic resin, it is preferable to be polyolefin resin and to have the melt flow rate of 3–100 g/10 min and the melting point of 90° C. or more. Moreover, it is preferable that the remaining amount of the zirconium, the titanium, the hafnium and the vanadium in the thermoplastic resin is 50 ppm or less, because the bad influences are not given to the photographic property of the photosensitive material. Further, it is preferable that the thermoplastic resin is produced by gas phase producing process wherein a solvent is not used. At this time, polymerizing temperature is 40–100° C. and polymerizing pressure is 5–50 kg/cm$^2$.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
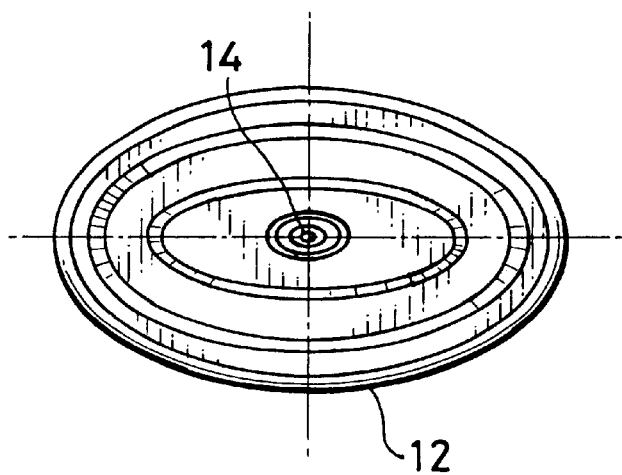
FIG. 1 is a plan view of a lid constituting a part of a film cassette container as an injection molded article according to the present invention.

As thermoplastic resins used for thermoplastic resin composition according to this embodiment, there are polystyrene resin, high impact polystyrene resin, styrene-acrylonitrile copolymer resin, styrene-acrylonitrile-butadiene copolymer resin, propylene-α-olefin copolymer resin, high-density polyethylene, ethylene-α-olefin copolymer resin, polyethylene terephthalate resin, polybutylene terephthalate resin, polyethylene naphthalate resin, polyacetal resin, polycarbonate resin, polyvinyl chloride resin and so forth. In these thermoplastic resins, various addition agents described later may be included.

In the present invention, "single-sight catalyst" means a catalyst in which active point is uniform. The "single-sight catalyst" is different from conventional "multi-sight catalyst" in which the active point is not uniform. The "single-sight catalyst" is a most suitable catalyst for producing the thermoplastic resin having similar molecular weight (namely, molecular-weight distribution and composition distribution are narrow). When the copolymer resin is produced by using the "single-sight catalyst", comonomer is equally inserted every molecular-weight component. Accordingly, in such thermoplastic resin, the molecular-weight distribution and the composition distribution are small (narrow), physical strength is large, and transparency and blocking resistance are superior. Especially, the ethylene-α-olefin (number of carbons is 3–20)random copolymer resin is preferable for the injection molded article requiring the transparency.

Typical single-sight catalyst is a catalyst discovered by Professor Kaminsky of Hamburg University in Germany at 1980 as a high active polyethylene resin polymerization catalyst. As shown in Chemical Formula 1, the catalyst is constituted of metallocene compound represented by dichlorozirconocen and cocatalyst represented by methylaluminoxan. Further, the catalyst is soluble in organic solvent and has single catalyst active point.

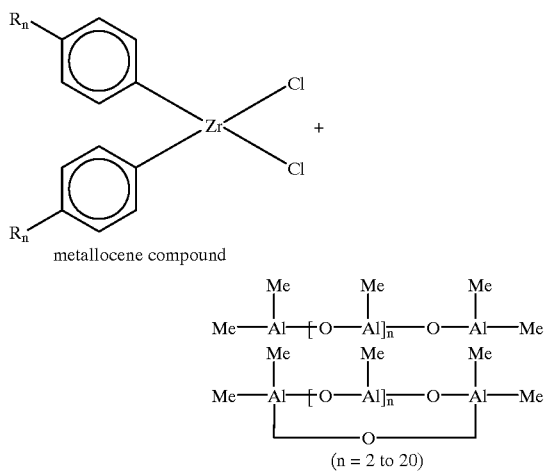

[Chemical Formula 1]

metallocene compound (n = 2 to 20)

In the present embodiment, it is not exclusive to the above Chemical Formula 1. The thermoplastic resin in which molecular-weight distribution is 1.1–5.0 may be polymerized by using the single-sight catalyst which is capable of producing it at low cost. For example, various single-sight catalysts well-known at present and the single-sight catalyst developed in the future are usable for producing the thermoplastic resin by which bad influence is not given to the photographic property of the photosensitive material, and the characteristics required for the injection molded article are obtained. Typical examples are disclosed in Japanese Patent Laid-Open publication Nos. 58-19309, 59-95299, 60-35006, 60-35007, 60-35008 and so forth.

Typical examples which are especially preferable for the present embodiment are described below. However, needless to say, the present embodiment is not exclusive to these. Example of metallocene transition-metal compound constituting the preferable single-sight catalyst is that one or two of cyclopentadienyl group, indene group, tetrahydroindene group, fluonyl group and substituting group thereof are bonded to zirconium, hafnium, titanium and vanadium, or two groups among these are crosslinked by covalent linkage and bonded thereto. Besides that, there are compounds having substituting group and ligand of, for example, unsaturated hydrocarbon. The substituting group includes hydrogen atom, oxygen atom, halogen atom, alkyl group, aralkyl group, alkoxy group, cycloalkyl group, aryl group, carbonyl group, silyl group, Lewis base and silicon atom.

As to polymerization method of olefin, the catalyst which is new high-active polymerization catalyst and is constituted of the transition-metal compound and aluminoxan is disclosed in Japanese Patent Laid-Open Publication Nos. 58-19309, 59-95292, 60-35005, 60-35006, 60-35007 and 60-35008. Among these prior arts, Japanese Patent Laid-Open Publication Nos. 58-19309, 60-35005, 60-35006, 60-35007 and 60-35008 teach that the catalyst is available to copolymerization of ethylene and α-olefin. However, none of these teach about manufacturing method for crystalline ethylene-α-olefin copolymer in which the molecular-weight distribution and the composition distribution are narrow.

In the present invention, molecular-weight distribution means a ratio of weight-average molecular weight (hereinafter $MW_{(AV)}$) measured by gel permeation chromatography method (hereinafter GPC method) to number-average molecular weight (hereinafter $Mn_{(AV)}$). Namely, the molecular-weight distribution is $MW_{(AV)}/Mn_{(AV)}$. Concretely, the measurement was performed with 150-C manufactured by Waters. (column; GMH-XLHT manufactured by Toso. 8 mmφ×30 m×3, solvent; 1,2,4-trichlorobenzene, temperature; 135° C., flow rate; 10 ml/min). $MW_{(AV)}$ and $Mn_{(AV)}$ are measured by GPC method and the value of $MW_{(AV)}/Mn_{(AV)}$ is calculated.

In the present embodiment, in view of superior injection moldability, dimensional stability of the injection molded article, physical strength, appearance, polymerizability, cost and so forth, the molecular-weight distribution ($MW_{(AV)}/Mn_{(AV)}$) of the thermoplastic resin is 1.1–5.0. As to this range, 1.2–4.5 is preferable, 1.3–4.0 is more preferable and 1.5–3.5 is most preferable. In the present embodiment, in order to obtain the superior characteristics of the injection molded article used with the photosensitive material, the thermoplastic resin which is polymerized by using the single-sight catalyst and in which the molecular-weight distribution is limited is included in the injection molded article by 30 wt. % or more. As to the weight percentage, 40 wt. % or more is preferable, 50–99.9 wt. % is more preferable and 60–99.9 wt. % is most preferable. When the light-shielding property is required (for example, colored injection molded articles of a photographic film spool, a photo film cartridge made of resin and used for Advanced Photo System (new photographic system, hereinafter APS), a lens-fitted film unit, a instant film unit, a sheet film pack, a camera, sheet film holder and so forth), the light shielding material is included. In this case, content of the thermoplastic resin, which is polymerized by using the single-sight catalyst and in which the molecular-weight distribution is limited, is 30 wt. % or more. As to the content, 40 wt. % or more is preferable, 50–99.5 wt. % is more preferable and 60–99 wt. % is most preferable.

As typical example of the preferable thermoplastic resin polymerized by using the single-sight catalyst, there are ethylene-α-olefin copolymer resin, homopolyethylene resin, homopolypropylene resin, propylene-α-olefin copolymer resin (propylene-ethylene random copolymer resin, propylene-ethylene block copolymer resin and so forth), and syndiotactic polystyrene resin. Particularly, preferable resin is homopolyethylene resin, ethylene-α-copolymer resin, crystallite syndiotactic polystyrene resin, crystallite syndiotactic polypropylene resin, and isotactic polypropylene resin.

Typical examples of marketed resin are described below. However, the present embodiment is not exclusive to these. As typical example of polyethylene resin (most of these are ethylene-α-olefin copolymer resin, abbreviation thereof is L-LDDE resin), there are EXACT (trade name, manufactured by Exxon), CARNEL (trade name, manufactured by Mitsubishi Chemical), CATAUTHENE (trade name, manufactured by Toso) which are relative to high-pressure ion polymerization method, and there are AFFINITY and ENGAGE (trade name, manufactured by Dow Chemical) which are relative to solution polymerization method. With respect to gas phase polymerization, there are SUPER POLYETHYLENE (trade name, manufactured by Mitsui Oil Chemical) and so forth. In the present embodiment, the thermoplastic resin of the above thermoplastic resins is polymerized by using the single-sight catalyst. The molecular-weight distribution thereof measured by the GPC method is 1.1–5.0 and the content thereof is restricted to 30 wt. % or more. Further, lubricant and antioxidant are included. Injection molding is performed by using such thermoplastic resin so that the injection molded article having superior physical characteristics is obtained.

Other various thermoplastic resins may be included in the injection molded article according to the present embodiment in accordance with the purpose of use.

For example, there are GPPS resin, HIPS resin, homopolyethylene resin (hereinafter LDPE) having long-chain ramification manufactured by high-pressure method, high-density homopolyethylene resin (hereinafter HDPE resin) polymerized by using the conventional polymerizing catalyst, medium-density homopolyethylene resin (hereinafter MDPE resin), various ethylene copolymer resin, for example, homopolypropylene resin and propylene-α-olefin copolymer resin (hereinafter PP resin), various thermoplastic elastomers, various acid-modified thermoplastic resins, various polyamide resins (various nylon resins, hereinafter PA resin), polyethylene terephthalate resin (hereinafter PET resin), polyethylene naphthalate resin (hereinafter PEN resin), acrylonitrile.butadiene.styrene terpolymer resin (hereinafter ABS resin), polycarbonate resin (hereinafter PC resin).

In view of low cost, dispersion property, injection moldability and lubricant adding effect, various polyolefin resins, various thermoplastic elastomers and various compatible resins are especially preferable. These resins do not give a bad influence to the photographic property of the photosensitive material and are superior in compatibility when they are combined with the thermoplastic resin which is polymerized by using the single-sight catalyst and in which the molecular-weight distribution is 1.1–5.

Preferable typical examples of various polyolefin resins, various thermoplastic elastomers and various compatible resins are described below. As typical example of the polyolefin resin, there are high-density homopolyethylene resin, medium-density homopolyethylene resin, low-density homopolyethylene resin, homopolypropylene resin, propylene-α-olefin copolymer resin, various ethylene copolymer resins and so forth.

Typical examples of various ethylene copolymer resins are described below.

(1) Ethylene-vinyl acetate copolymer resin (hereinafter EVA)
(2) Ethylene-propylene copolymer resin
(3) Ethylene-1-butene copolymer resin
(4) Ethylene-butadiene copolymer resin
(5) Ethylene-vinyl chloride copolymer resin
(6) Ethylene-methyl methacrylate copolymer resin (hereinafter EMMA)
(7) Ethylene-methyl acrylate copolymer resin (hereinafter EMA)
(8) Ethylene-ethyl acrylate copolymer resin (hereinafter EEA)
(9) Ethylene-acrylonitrile copolymer resin
(10) Ethylene-acrylic acid copolymer resin (hereinafter EAA)
(11) Ionomer resin (copolymerizate of ethylene and unsaturated acid is crosslinked with a metal, for example, zinc)
(12) Ethylene-α-olefin copolymer resin (hereinafter L-LDPE)
(13) Ethylene-propylene-butene-1 terpolymer resin The L-LDPE resin is described in detail below. The L-LDPE (Linear Low Density Polyethylene) resin is called third polyethylene resin and has advantages of the medium-density polyethylene resin and the high-density polyethylene resin. Further, the L-LDPE resin is produced at low cost and has high strength. This resin is a copolymer in which ethylene and α-olefin, carbon number of which is 3–20, are copolymerized. As to the carbon number, 3–13 is preferable, 4–10 is more preferable and 5–9 is especially preferable. Moreover, the L-LDPE resin is polyethylene-based resin having a short ramification on a linear chain. As the α-olefin which is preferable in view of the physical strength and the cost, there are used, for example, butene-1, pentene-1, octene-1, hexene-1, 4-methyl-pentene-1, heptene-1, 3-methyl-pentene-1, 4,4-dimethyl-pentene-1, hepcene-1, nonene-1, undecene-1, dodecene-1, decene-1. The L-LDPE resin, in which the α-olefin is butene-1, hexene-1, 4-methyl-pentene -1 or octene-1 and the content of the α-olefin is 0.1–15 mol %, is preferable. The L-LDPE resin in which the α-olefin is butene-1 and the content of the butene-1 is 1–8 mol % is most preferable.

Typical examples of the marketed L-LDPE resin polymerized with the conventional catalyst are described below. Ethylene.butene-1 copolymer resin: G RANGE and NUC-FLX (trade name, manufactured by UCC), DOWLEX (trade name, manufactured by Dow chemical), SCLAIR (trade name, manufactured by Du Pont Canada), MARLEX (trade name, manufactured by Phillips), STAMILEX (trade name, manufactured by DSM), EXCELLEN VL (trade name, manufactured by Sumitomo Chemical), NEOZEX (trade name, manufactured by Mitsui Oil Chemical), UKALON-LL (trade name, manufactured by Mitsubishi Yuka), NISSEKI LINILEX (trade name, manufactured by Nippon Oil Chemical), NCU polyethylene-LL (trade name, manufactured by Nippon Unicar), NIPOLON (trade name, manufactured by Toso), SHOLEX LINEAR (trade name, manufactured by Showa Denko), UBE polyethylene L (trade name, manufactured by Ube Kosan), Idemitsu polyethylene L (trade name, manufactured by Idemitsu Oil Chemical) and so forth, ethylene.hexene-1 copolymer resin: TUHLIN (trade name, manufactured by UCC), TUFTHENE (trade name, manufactured by Nippon Unicar) and so forth, ethylene.4 methylpentene-1 copolymer resin: ULTZEX (trade name, manufactured by Mitsui Oil Chemical)and so forth, ethylene.octene-1 copolymer resin: STAMILEX (trade name, manufactured by DSM), DOWLEX (trade name, manufactured by Dow Chemical), SCRARE (trade name, manufactured by Du Pont Canada), MORETEC (trade name, manufactured by Idemitsu Oil Chemical) and so forth.

In view of balance of physical strength and injection moldability, preferable one is the L-LDPE resin in which MFR (measured in E condition of ASTM D-1238-88, temperature is 190° C., test load is 2.16 kgf) is 2–80 g/10 min, preferably 5–50 g/10 min, density (measured by JIS K-6760) is 0.890–0.985 g/cm$^3$, preferably 0.900–0.980 g/cm$^3$, and the number of carbon of $\alpha$-olefin is 3–12.

Detail of acid modified polyolefin resin is described below. The acid modified polyolefin resin is superior in compatibility with the thermoplastic resin which is polymerized by using the single-sight catalyst and in which the molecular-weight distribution is 1.1–5. This resin is modified polyolefin resin in which polyolefin resin and unsaturated carboxylic acid are graft modified. For example, there are graft modified polyethylene resin, graft modified polypropylene resin, graft modified ethylene copolymer resin (EVA resin, EEA resin, L-LDPE resin, EMA resin and so forth).

Unsaturated carboxylic acid includes its derivative. As typical examples thereof, there are acrylic acid, methacrylic acid, maleic acid, fumaric acid, itaconic acid, tetrahydrophthalic acid, mesaconic acid, angelic acid, citraconic acid, crotonic acid, isocrotonic acid, nagic acid (endocis-bicyclo [2,2,1]hepto-5-ene-2,3-dicarboxylic acid), maleic anhydride, citraconic anhydride, itaconic anhydride, methyl acrylate, butyl methacrylate, ethyl acrylate, ethyl methacrylate, butyl acrylate, butyl acrylate, glycidyl acrylate, glycidyl methacrylate, monoethyl maleate, diethyl maleate, monomethyl fumarate, dimethyl fumarate, diethyl itaconate, amide acrylate, amide methacrylate, monoamide maleate, diamide maleate, maleic-N-monoethyl amide, maleic-N,N-diethylamide, maleic-N-monobutylamide, maleic-N,N-dibutylamide, monoamide fumarate, diamide fumarate, fumaric-N-monoethylamide, fumaric-N,N-diethylamide, fumaric-N-monobutylamide, fumaric-N,N-diethylamide, fumaric-N-monobutylamide, fumaric-N,N-dibutylamide, maleimide, monomethyl maleate, dimethyl maleate, sodium acrylate, zinc acrylate, magnesium acrylate, calcium acrylate, sodium methacrylate, potassium acrylate, potassium methacrylate, N-butylmaleimide, N-phenylmaleimide, malonyl chloride, gurishijin maleate, dipropyl maleate, aconitic anhydride, sorbic acid and so forth. It is possible to mix these carboxylic acids. Among these, acrylic acid, maleic acid, maleic anhydride and nagic acid are preferable and maleic anhydride is especially preferable.

Graft modifying method for unsaturated carboxylic acid relative to modified polyolefin resin is not exclusive. Various methods are disclosed in Japanese Patent Publication Nos. 43-27421, 44-15422, 43-18144, 50-77493 and so forth. In order to keep adhesive strength, usage of unsaturated carboxylic acid is 0.01–20 parts by weight for 100 parts by weight of polyolefin resin base polymer ($\alpha$-olefin copolymer resin of various polyethylene resins, various polypropylene resins, various polyolefin copolymer resins, polybutene-1 resin, poly-4-methylpentene-1 and so forth, and copolymer resin thereof). 0.2–5 parts by weight is preferable.

Organic peroxide and so forth are used to accelerate a reaction of polyolefin resin and unsaturated carboxylic acid. As the organic peroxide, there are benzoylperoxide, lauroylperoxide, azobisisobutyronitrile, dicumylperoxide, $\alpha,\alpha'$bis(t-butylperoxydiisopropyl)benzene, 2,5-dimethyl-2, 5-di(t-butylperoxy)hexane, 2,5-dimethyl-2,5-di(t-butylperoxy)hexyne, di-t-butylperoxide, cumenehydroperoxide, t-butyl-hydroperoxide, dicumylperoxide, t-butylperoxylaurate, t-butylperoxybenzoate, 1,3-bis(t-butylperoxyisopropyl) benzene, cumene hydroperoxide, di-t-butyl-diperoxyphthalate, t-butylperoxymaleic acid, isopropylpercarbonate, azo compound of azoisobutyronitrile and so forth, ammonium persulfate, and so forth. Two or more of these may be combined to be used. Among these, di-t-butylperoxide, di-cumylperoxide, 2,5-dimethyl-2,5-di (t-butylperoxy) hexane, 2,5-dimethyl-2,5-di(t-butylperoxy) hexyne, 1,3-bis(t-butylperoxyisopropyl)benzene, each of which have a decomposition temperature of 170° C. to 200° C., are especially preferable. Load of the peroxide is not limited, however, it is 0.005–5 parts by weight for 100 parts by weight of polyolefin resin. 0.01–1 parts by weight is preferable.

Typical marketed examples of acid modified polyolefin resin are described below.

(1) Nippon Oil Chemical Co., Ltd. "N polymer" (trade name)
(2) Mitsui Oil Chemical Co., Ltd. "ADMER" (trade name)
(3) Showa Denko Co., Ltd. "ER RESIN" (tradename)
(4) Mitsubishi Kasei Industrial Co., Ltd. "NOVATEC-AP" (trade name)
(5) Mitsubishi Yuka Co., Ltd. "MODIC" (trade name)
(6) Nippon Unicar Co., Ltd. "NUC-ACE" (trade name)
(7) Ube Kosan Co., Ltd. "UBE BOND" (trade name)
(8) Toso Co., Ltd. "MERSEN M" (tradename)
(9) Sumitomo Chemical Industry "HOLDINE" (trade name)
(10) Mitsui Du Pont chemical Co., Ltd. "CMPS" (trade name)
(11) Exxon "DEXONE" (trade name)
(12) Toa Nenryo Industrial Co., Ltd. "HA SERIES" (trade name)
(13) Mitsui Toatsu Chemical Co., Ltd. "MITSUI LONPLY" (trade name)

Feature of producing process for the L-LDPE resin is schematically described below.

1) Gas Phase Method

Necessary amount of energy for polymerizing is small. Volatile single component must be used for comonomer so that it is restrained in comparison with a solution method. Recently, selection of comonomer and control of the molecular-weight distribution are tend to be easy.

2) Slurry Method

Liquid phase polymerizing method in which solvent is used is divided into slurry method and solution method. In the slurry method, slurry (different phase) uses the solvent so that solution in reaction container has low density. Therefore, it is possible to produce by comparative compact facilities and removing of the solvent is easily performed. On the other hand, as to lowering the density, production of the L-LDPE having a density of 0.930 g/cm$^3$ or less is limited because polymer having low molecular weight and low density dissolves in the solvent so that the solution becomes high viscosity, further, polymer is bulked due to imbibition.

3) Solution Method

Polymerization of the solution method is carried out in the solution. Its reaction is performed at high temperature in order to keep solution state. Permit range for lowering the density is wide. This method is most suitable producing process for copolymerization of α-olefin of $C_6$ or more (4 methylpentene-1, hexene-1, octene-1, decene-1 and so forth) and ethylene. Moreover, this method is most suitable as a producing process of the L-LDPE resin (low-density L-LDPE resin, density of which is 0.910 $g/cm^3$ or less) in which content of α-olefin is large.

4) Improved High-pressure Method

The L-LDPE resin is obtained by Ziegler catalyst at high temperature and at high pressure, utilizing conventional high-pressure method process as it is. Running cost is higher than above 1) to 3). This method is also called high-pressure conversion method.

Typical examples of various thermoplastic elastomers are described below. The thermoplastic elastomer (hereinafter TPE) is classified roughly into styrene-base (hereinafter SBC), ester-base (hereinafter TPEE), olefin-base (hereinafter TPO), vinyl chloride-base (hereinafter TPVC), amide-base (hereinafter TPAE), crystalline 1,2 polybutadiene-base (hereinafter RB), ionomer-base, fluorine-base (hereinafter F-TPE), urethane-base (hereinafter TPU), and isoprene-base.

As typical examples of marketed TPE, there are TPR (Uniroyal), TPN or Somel (E.I. Du Pont de Nemours), Telcar. Estane (B.F. Goodrich Chemical), Vistaflex (Exxon Chemical), Visalon (Esso Chemical), Pro-fax (Hercules), ET (Allied Chemical), Ren flex (Ren Plastics), Santoprene (Monsanto), Keltan-TP (Naamloze Vennootschap DSM), Uneprene (International Synthetic Rubber), Dutral TP (Montedison), Esprene EPR or Sumitomo TPE (Sumitomo Chemical Industry), Milastomer (Mitsui Oil Chemical), JSR-thermolan (Nippon Gosei Rubber) and so forth.

Class, manufacture and trade name of typical TPE are shown in Table 1.

TABLE 1

| Class | Rigid phase | Non-rigid phase | Manufacturer | Trade name |
|---|---|---|---|---|
| SBC | PS | BR or IR | Shell Chemical | Kraton Cariflex TR |
| | | | Phillips Petroleum | Solprene |
| | | | ANIC | Europrene SOLT |
| | | | Asahi Kasei | Tufprene |
| | | | Nippon Elastomer | Solprene-T |
| | | | Nippon Gosei Rubber | JSR TR |
| | | | Denki Kagaku | DENKA STR |
| | | | Nippon Zeon | |
| | | Hydrogenation BR | Shell Chemical | Kraton G |
| TPO | PE or PP | IIR or EPDM | Sumitomo Chemical | Sumitomo TPE |
| | | | Mitsui Oil Chemical | Milastomer |
| | | | Nippon Gosei Rubber, Mitsubishi Yuka | JSR-thermorun Yukathermorun |
| | | | Monsanto (Mitsubishi Monsanto) | Santoprene |
| | | | Nippon Oil Chemical | Softflex |
| TPVC | Crystalline PVC and the other | Noncrystalline PVC | Sumitomo Bakelite | Sumiflex |
| | | | Mitsubishi Kasei | Sunprene |
| | | | Denki Kagaku | Vinycon R |
| | | | Shinetsu Polymer Industry | EZ-800 |
| | | | Chisso | Elaslit |
| | | | Toa Gosei Chemical | Allonelast |
| | | | E.I. Du Pont de Nemours | Aleryn |
| TPU | Urethane structure | polyester or polyether | MD Kasei | Delecene |
| | | | Nippon Elastrun | Elastlan |
| | | | Nippon Polyurethane | Paraphene |
| | | | Dainippon Ink Chemical | Pandex |
| | | | Takeda Chemical | Takelac |
| | | | Nippon Oil Seal | Iron Rubber |
| | | | Dainich Seika Kogyo | Resamine |
| | | | Mitsui Nisso urethane | Hyprene |
| TPEE | Polyester | Polyether | E.I. Du Pont de Nemours | Hytrel, Tore · Du Pont |
| | | | Akzo Chemie (Dainippon Ink) | Arnitel |
| | | | Toyo Boseki | Pelprene |
| | | | General Electric (EPL) | Lomod |
| TPAE | Polyamide | Polyether | Huls (Disel Huls) | Vestamid (Diamid-PAE) |
| | | | Atochem (Tore) | PEBAX |
| | | | Ems (Dai-Nippon Ink Chemical) | Glylax A |
| Others | Syndiotactic 1.2 BR | Noncrystalline BR | Nippon Gosei Rubber | JSR RB |
| | Trans-1.4-IR | Noncrystalline IR | Polysar Krare Isoprene Chemical | TRANS-PIP Trans-polyisoprene |
| | Metal carboxylate ion cluster | Noncrystalline PE | E.I. Du Pont de Nemours Mitsui · Du Pont Polychemical | Surlyn A |
| | Crystalline polyethylene | EVA or EEA | Toyo Sotatsu, Nippon Unicar, Asahi Kasei, Sumitomo Chemical, Mitsubishi Yuka, Mitsui · Du Pont Polychemical | |
| | Crystalline polyethylene | Chlorinated polyethylene | Syowa Yuka Osaka Sotatsu Dow Chemical | Elaslene Taisolac Dow-CPE |
| | Fluorine resin | Fluorine resin | Dykin Industry | Dyelsa-moPlastic |

As to the TPO and the TPU, manufacturer besides Japanese manufacturer is excluded. Moreover, a company wrote in the parenthesis of column of manufacturer is import sales company.

The styrene-based thermoplastic elastomer is described in detail below. The styrene-base thermoplastic elastomer is superior in dispersion property of light shielding material so that the light-shielding injection molded article including the elastomer is preferable for the present embodiment. Especially, when the styrene-based thermoplastic elastomer is used for masterbatch resin pellet, there is obtained a color injection molded article which is superior in dispersion property, physical strength and appearance.

When resin composition of the masterbatch resin pellet contains the styrene-based thermoplastic elastomer, color resin composition for the injection molded article is excellently compatibilized even if resin composition for dilution is crystalline resin (polyolefin resin, polyacetal resin, polyamide resin, polyvinylidene chloride resin, linear polyester resin and so forth), non-crystalline resin (polystyrene resin, polycarbonate resin, polyvinyl alcohol resin, polyvinyl chloride resin, methacrylic acid resin, vinyl acetate resin and so forth), or mixture of these resins, further, even if recycle resin is included therein.

The styrene-based thermoplastic elastomer is a copolymer of styrene monomer (hard segment) and the other monomer (soft segment) which is monoolefin, diolefin and so forth, or is a hydrogen additional matter of this copolymer. The copolymer includes random copolymer, block copolymer and graft copolymer. Particularly, the block copolymer is preferable. As the styrene monomer, there are styrene, α-chlorostyrene, 2,4-dichlorostyrene, p-methoxystyrene, p-methylstyrene, p-phenylstyrene, p-divinylbenzene, p-(chloromethoxy)-styrene, α-methylstyrene, o-methyl-α-methylstyrene, m-methyl-α-methylstyrene, p-methyl-α-methylstyrene, p-methoxy-α-methylstyrene and so forth. Among these, the styrene is especially preferable. As the diolefin, there are non-conjugated diene and conjugated diene. The non-conjugated diene is dicyclopentadiene, 1,4-hexadiene, cyclooctadiene, methylnorbornane and so forth. The conjugated diene is butadiene, isoprene and so forth. Among these, butadiene is especially preferable.

As the monoolefin, there are ethylene, propylene, butene-1, hexene-1, 3-methylbutene-1, 4-methylpentene-1, heptene-1, octene-1, decene-1 and so forth, which are α-olefin having carbons of three or more. Among these, ethylene and propylene are especially preferable. As a structure of the block copolymer, there are so-called ABA type in which the hard segment is combined to both ends of the soft segment, multi-block type which has repeated structure of both blocks and radial-block type in which both blocks are combined in radial state. In working range of temperature, polystyrene block forms domain of glass state and is dispersed in the segment. At this time, its size is about a few times 10 nm. Further, by constraining the soft segment, physical crosslinking point is formed.

Such styrene-based thermoplastic elastomer is obtained by copolymerizing the above monomer in well-known method, for example, an anion living polymerization method or a radical polymerization method of a batch bulk polymerization method, a continuous bulk polymerization method, a suspension polymerization method, a continuous solution polymerization, an emulsion polymerization and so forth. Among these polymerization methods, the anion living copolymerization is especially preferable and organic lithium compound is generally used as an initiator in order to regulate microstructure of diene polymer. Moreover, the polymerization method includes a successive polymerization method in which both components are successively polymerized and a method in which molecules are combined in coupling reaction after successive polymerization. The radial block type is produced by the latter method in which multifunctional coupling agent is used. The other monomer, which is monoolefin, diolefin and so forth copolymerized with the styrene monomer, is contained in the styrene monomer by 1–12 wt. %. As to the content, 1.5–10 wt. % is preferable and 2–8 wt. % is especially preferable. If the content is 1–12 wt. %, lack of strength is prevented at the time of dropping a photographic film spool, a photographic film cassette, an instant film unit, a camera body, a photo film cartridge, a photographic film magazine, a lens-fitted film unit and so forth, which are sometimes used under a condition of 0° C. or less. Moreover, it is superior in wear characteristics. Further, when the photosensitive material is preserved in sealing state for three month or more, the fog may be prevented from increasing and the sensitivity may be prevented from partially raising.

As concrete examples of the styrene-based thermoplastic elastomer, there are, for example, styrene-butadiene-styrene block copolymer resin and styrene-ethylene-butylene-styrene block copolymer resin which is hydrogenation mater thereof, styrene-butadiene copolymer resin and styrene-ethylene-butylene block copolymer resin which is hydrogenation mater thereof, styrene-isoprene copolymer resin and styrene-ethylene-propylene block copolymer resin which is hydrogenation mater thereof, styrene-isoprene-styrene block copolymer resin and styrene-ethylene-propylene-styrene block copolymer resin which is hydrogenation mater thereof. Among these styrene-based thermoplastic elastomers, the styrene-butadiene copolymer resin and the hydrogenation mater are especially preferable.

Trade names and manufactures of typical styrene-based thermoplastic elastomer are described below. Kraton (or Califlex TR), Kraton G (or Elexar) (Shell Chemical), Solprene T (Phillips Petroleum), Europrene SOL T (ANIC), Solprene T (Petrochi), Tufprene (Asahi Kasei), Solprene T, Asaprene T (Nippon elastomer), Clearene (Denki Kagaku), JSR, SBR (Nippon Gosei Rubber), and so forth.

Instead of, or with the above styrene-based thermoplastic elastomer, modified styrene-base thermoplastic elastomer may be used. For modifying the styrene-based thermoplastic elastomer, any method may be used. For example, unsaturated carboxylic acid or its derivative may be used as a modifier. As the unsaturated carboxylic acid, there are unsaturated mono or dicarboxylic acid of acrylic acid, methacrylic acid, maleic acid, endo-dicyclo[2,2,1]-5-heptene-2,3-dicarboxylic acid, fumaric acid, tetrahydrophthalic acid, itaconic acid, citraconic acid, crotonic acid, isocrotonic acid and so forth. As the derivative, there are acid, halide, amide, imide, anhydride, ester and so forth. As concrete examples of derivative, there are malonyl chloride, maleimide, maleic anhydride, methyl acrylate, methyl methacrylate, citraconic anhydride, monomethyl maleate, dimethyl maleate and so forth. These modifiers may be used alone or together with another one. Generally, content of unsaturated carboxylic acid or its derivative is 0.1–15 wt. % for the styrene-based thermoplastic elastomer and preferably, it is 0.1–10 wt. %. The modified styrene-based thermoplastic elastomer is obtained by copolymerizing the above styrene-based thermoplastic elastomer and the unsaturated carboxylic acid or its derivative in the known modifying method of solution method, solution kneading method and so forth.

Typical examples of various compatibilizing resins are described below. The compatibilizing resin is a material which can accomplish compatibilizing when new property and new performance, which do not exist in the single thermoplastic resin, are tried to take place. The compatibilizing resin is, for example, such as a master batch thermoplastic resin, a thermoplastic resin for dilution and mixture resin thereof. In the master batch thermoplastic resin, the thermoplastic resins being same kind and having different characteristics, a recycling thermoplastic resin, a virgin thermoplastic resin and a light shielding resin are blended at high density. As to content of the compatibilizing resin, 2–45 wt. % is preferable, 3.5–40 wt. % is more preferable and 5–35 wt. % is most preferable. When the content is 2 wt. % or less, improvements of the physical strength, the appearance and compatibility are not effectively accomplished. Moreover, when the content is more than 50 wt. %, bad influence tends to be given to the photosensitive material. Further, it becomes expensive so that its cost increases. Accordingly, it is difficult to put it to practical use in view of economy.

With respect to the compatibilizing resin, there are a nonreaction-type compatibilizing resin and a reaction-type compatibilizing resin. Typical examples of the compatibilizing resin are described below.

Examples of Nonreaction-type Compatibilizing Resin

Styrene.ethylene.butadiene block copolymer resin

Polyethylene.polystyrene graft copolymer resin

Polyethylene.polymethyl methacrylate graft copolymer resin

Polyethylene.polymethyl methacrylate block copolymer resin

Ethylene.propylene.diene copolymer resin

Ethylene.propylene copolymer resin

Polystyrene.low-density homopolyethylene graft copolymer resin

Polystyrene.high-density homopolyethylene graft copolymer resin

Hydrogenation styrene.butadiene copolymer resin

Styrene.ethylene.butadiene.styrene copolymer resin

Styrene.butadiene.styrene copolymer resin

Chlorinated polyethylene resin

Polypropylene.polyamide graft copolymer resin

Polypropylene.ethylene.propylene.diene copolymer resin

Polystyrene.polyacrylic ethyl graft copolymer resin

Polystyrene.polybutadiene graft copolymer resin

Polystyrene.polymethyl methacrylate block copolymer resin and so forth

Examples of Reaction-type Compatibilizing Resin

Maleic anhydride ethylene.propylene copolymer resin

Maleic anhydride styrene graft copolymer resin

Maleic anhydride styrene.butadiene.styrene copolymer resin

Maleic anhydride styrene.ethylene butadiene styrene copolymer resin

Ethylene.glycidylmethacrylate copolymer resin

Ethylene.glycidylmethacrylate.styrene graft copolymer resin

Ethylene.glycidylmethacrylate.methylmethacrylate graft copolymer resin

Maleic anhydride graft polypropylene copolymer resin and so forth

Typical Examples of Marketed Compatibilizing Resin are Described Below.

Kroton G (composition: hydrogenation SBS, hydrogenation SEBS and maleic compound, Shell)

Royaltuf (composition: EPDM.styrene graft copolymer resin, maleic EPDM, EPDM.acrylonitrile copolymer resin, Uniroyal)

Modiper (composition: block or graft copolymer resin of two of various resins, Nippon Yushi)

Paraloid (composition: maleic EPDM, core-shell-type block copolymer resin, Rohm and Haas)

Reseda (composition: styrene.methylmethacrylate graft copolymer resin, Toa Gosei)

Bondfirst (composition: ethylene.glycidyl methacrylate copolymer resin, Sumitomo Chemical)

Exxelor (composition: maleic EPDM, Exxon Chem)

Tuftec (composition: SBS, SEBC and maleic compound, Asahi Kasei)

Bennet (composition: EVA.EPDM.polyolefin graft copolymer resin, High Tech Plastics)

Dylark (composition: styrene.maleic anhydride copolymer resin, ARCO)

Rexpearl (composition: ethylene.glycidyl methacrylate copolymer resin, Nippon Oil Chemical)

VMX (composition: impregnating polymerization of EVA 50 parts and styrene 50 parts, Mitsubishi Yuka)

(SBS is abbreviation of styrene.butadiene.styrene copolymer resin. SEBS is abbreviation of styrene ethylene butadiene.styrene copolymer resin. EPDM is abbreviation of ethylene propylene.diene copolymer resin. EVA is abbreviation of ethylene.vinyl acetate copolymer resin.)

Melt flow rate (MFR) of the thermoplastic resin, which is polymerized by using the single-sight catalyst and in which the molecular-weight distribution is 1.1–5, is 3–100 g/10 min in view of prevention of short shot and weld line, improvement of appearance, reduction of molding cycle and dimensional stability of the injection molded article. As to the melt flow rate, 5–80 g/10 min is preferable, 10–60 g/10 min is more preferable and 15–50 g/10 min is most preferable. By the way, measurement condition of the melt flow rate is different according to kind of the resin and is set forth in Table 2.

Especially, in the case of the polyolefin resin in which heat capacity is twice times that of the polystyrene resin and the molecular-weight distribution is small, it is preferable to use the thermoplastic resin having a large MFR measured in E condition of ASTM D-1238 in order to keep the above superior performance. As to the MFR, 10–80 g/10 min is preferable, 15–70 g/10 min is more preferable and 20–60 g/10 min is most preferable.

TABLE 2

| Kind of resin | Measurement condition of ASTM D 1238-88 | Temp. (° C.) | Piston load (kg) |
| --- | --- | --- | --- |
| Homopolyethylene resin | ASTM D 1238-88 E condition | 190 | 2.16 |
| Ethylene copolymer resin (ethylene-α-olefin copolymer resin) | ASTM D 1238-88 E condition | 190 | 2.16 |
| Thermoplastic resin elastomer | ASTM D 1238-88 E condition | 230 | 2.16 |
| Homopolypropylene resin | ASTM D 1238-88 L condition | 230 | 2.16 |
| Propylene copolymer resin (propylene-α-olefin copolymer resin, etc.) | ASTM D 1238-88 L condition | 230 | 2.16 |
| Homopolystyrene resin | ASTM D 1238-88 G condition | 200 | 5 |
| Styrene copolymer resin (styrene-rubber copolymer resin, rubber-containing | ASTM D 1238-88 G condition | 200 | 5 |

TABLE 2-continued

| Kind of resin | Measurement condition of ASTM D 1238-88 | Temp. (° C.) | Piston load (kg) |
|---|---|---|---|
| polystyrene resin, ABS resin, AS resin, etc.) | | | |
| Polyacetal resin (polyoxymethylene resin, etc) | ASTM D 1238-88 E condition | 190 | 2.16 |
| Acrylic resin | ASTM D 1238-88 H condition | 230 | 1.2 |
| Polyamide resin (nylon 6, nylon 12, nylon 66, etc.) | ASTM D 1238-88 R condition | 235 | 2.16 |
| Polycarbonate resin | ASTM D 1238-88 O condition | 300 | 1.2 |
| Polyester resin | ASTM D 1238-88 T condition | 250 | 2.16 |
| Joriphenylsulfide resin (PPS) | ASTM D 1238-88 X condition | 315 | 5.0 |
| Polyfluoroethylene resin | ASTM D 1238-88 J condition | 265 | 12.5 |

When both or either of the homopolyethylene resin and the ethylene-α-olefin copolymer resin are used for a photographic film cassette cap requiring sealing characteristics for a cassette body, its density is 0.85–0.940 g/cm$^3$. As to the density, 0.89–0.935 g/cm$^3$ is preferable, 0.90–0.930 g/cm$^3$ is more preferable and 0.91–0.928 g/cm$^3$ is most preferable. Moreover, endothermic peaks are observed while heating is performed by using DSC manufactured by Parkin Elmer up to 200° C. at raising speed of 10° C./min, after that, the temperature is kept for two minutes, next, cooling is performed until 40° C. at falling speed of 10° C./min, after that, the temperature is kept for two minutes, successively, heating is performed up to 200° C. at raising speed of 10° C./min. Among the single or plural endothermic peaks, the temperature giving a peak position of largest endothermic peak is 90° C. or more. Hereinafter, the temperature is indicated as a melting point. With respect to the melting point, 100° C. or more is preferable, 105° C. or more is more preferable and 110° C. or more is most preferable. By the way, when rigidity, heat resistance, wear resistance, oil resistance and solvent resistance are required, for example, in the case of the film cassette container and the photographic film cassette which is made of resin, the density is 0.941–0.985 g/cm$^3$. As to the density, 0.954–0.980 g/cm$^3$ is preferable, 0.950–0.975 g/cm$^3$ is more preferable and 0.955–0.970 g/cm$^3$ is most preferable. In view of the heat resistance, the melting. point measured by the DSC is 110° C. or more, 115° C. or more is preferable, 120° C. or more is more preferable and 125° C. or more is most preferable.

Lubricant which is one of requisites of the present embodiment is explained. Typical lubricants on market and manufacturer thereof are described below.

1. Fatty Acid Amide Lubricants

Saturated Fatty Acid Amide Lubricants (1) Behenic amide lubricant; DIAMID KN (trade name, manufactured by Nippon Kasei).

(2) Stearic amide lubricant; AMIDE HT (trade name, manufactured by Lion Fat & Oil), ALFLOW S-10 (trade name, manufactured by Nippon Oils & Fats), FATTY AMIDE S (trade name, manufactured by Kao), DIAMID 200 (trade name, manufactured by Nippon Kasei), DIAMID AP-1 (trade name, manufactured by Nippon Kasei), AMIDE S and AMIDE T (trade name, manufactured by Nitto Chemical), NEWTRON-2 (trade name, manufactured by Nippon Fine Chemical).

Hydroxy Stearic Amide Lubricant (1) Palmitic amide lubricant; NEWTRON S-18 (trade name, manufactured by Nippon Fine Chemical), AMIDE P (trade name, manufactured by Nitto Chemical).

(2) Lauric amide lubricant; AMIDE C (trade name, manufactured by Lion Akzo), DIAMID (trade name, manufactured by Nippon Kasei).

Unsaturated Fatty Acid Amide Lubricants (1) Erucic amide lubricants; ALFLOW P-10 (trade name, manufactured by Nippon Oils & Fats), NEWTRON-S (trade name, manufactured by Nippon Fine Chemical), LUBROL (trade name, manufactured by I.C.I), DIAMID L-200 (trade name, manufactured by Nippon Kasei).

(2) Oleic amide lubricants; ARMO SLIP-CP (trade name, manufactured by Lion Akzo), NEWTRON (trade name, manufactured by Nippon Fine Chemical), NEWTRON E-18 (trade name, manufactured by Nippon Fine Chemical), AMIDE O (trade name, manufactured by Nitto Chemical), DIAMID O-200 and DIAMID G-200 (trade name, manufactured by Nippon Kasei), ALFLOW E-10 (trade name, manufactured by Nippon Oils & Fats), FATTY AMIDE O (trade name, manufactured by Kao).

Bis Fatty Acid Amide Lubricants (1) Methylene bis behenic amide lubricants; DIAMID NK BIS (trade name, manufactured by Nippon Kasei).

(2) Methylene bis stearic amide lubricants; DIAMID 200 BIS (trade name, manufactured by Nippon Kasei), ARMO WAX (trade name, manufactured by Lion Akzo), BIS AMIDE (trade name, manufactured by Nitto Chemical).

(3) Methylene bis oleic amide lubricants; LUBRON O (trade name, manufactured by Nippon Kasei).

(4) Ethylene bis stearic amide lubricants; ARMO SLIP EBS (trade name, manufactured by Lion Akzo).

(5) Hexamethylene bis stearic amide lubricants; AMIDE 65 (trade name, manufactured by Kawaken Fine Chemical).

(6) Hexamethylene bis oleic amide lubricants; AMIDE 60 (trade name, manufactured by Kawaken Fine Chemical).

2. Nonionic Surface Active Agent Lubricants

ELECTROSTRIPPER TS-2, ELECTROSTRIPPER TS-3 (trade name, manufactured by Kao Soap).

3. Hydrocarbon Lubricants

Natural paraffin, micro wax, synthetic paraffin, polyethylene wax (number-average molecular weight is 10,000 or less, 8,000 or less is preferable and 6,000 or less is especially preferable.), polypropylene wax (number-average molecular weight is 10,000 or less, 8,000 or less is preferable and 6,000 or less is especially preferable.), chlorinated hydrocarbon, and fluorocarbon.

4. Fatty Acid Lubricants

Higher fatty acid (whose preferable number of carbon atoms is C12 or more, for example, stearic acid, oleic acid, erucic acid, palmitic acid), and oxy fatty acid.

5. Ester Lubricants

Fatty acid lower alcohol ester, fatty acid polyvalent alcohol ester, fatty acid polyglycol ester, and fatty acid fatty alcohol ester.

6. Alcohol Lubricants

Polyvalent alcohol, polyglycol, polyglycerol.

7. Fatty Acid Metal Salt Lubricants (Metallic Soaps)

Compounds of fatty acid and metal. The fatty acid is, for example, caproic acid, caprylic acid, myristic acid, lauric acid, stearic acid, succinic acid, behenic acid, linolic acid, stearyl lactic acid, lactic acid, acetic acid, oxalic acid, citric acid, phthalic acid, benzoic acid, hydroxy stearyl acid, montanic acid, ricinoleic acid, naphthenic acid, oleic acid, palmitic acid, and erucic acid. As to these, number of carbons is 6–50. With respect to the number, 10–40 is preferable and 11–35 is more preferable. The metals are, for example, Li, Na, Mg, K, Mn, Ca, Sr, Ba, Co, Ni, Zn, Cd, Al, Sn, Pb, and Cd. stearic acid magnesium, stearic acid zinc, palmitic acid calcium and oleic acid magnesium are preferable.

8. Montanic Ester Partial Saponification Material

9. Silicone lubricants

Dimethylpolysiloxane of various grade and modified material thereof (Shinetsu silicone and Tore silicone). Especially, various silicone oils are preferable. The silicone oil improves resin flowability and lubricity. When a light shielding material is used together, dispersion property of the light shielding material is improved. Further, resin composition becomes cloudy and haze (ASTM D-1003) increases. Accordingly, coloring power and light shielding property are improved.

Viscosity of the silicone oil at the normal temperature (25° C.) is 50–100,000 centistokes. Range of 1,000–60,000 centistokes is preferable and 5,000–30,000 centistokes is further preferable. In case of 50 centistokes or less, a bad influence is given to the photographic property and bleedout occurs so that it is difficult to attempt practical use. In case of 100,000 centistokes or more, it is very difficult to manufacture that and the viscosity becomes very high so that it is difficult to attempt practical use.

As concrete examples of the silicone and the silicone modified material, there are polymethyl phenyl siloxane, olefin modified silicone, amide modified silicone, amino modified silicone, polydimethyl siloxane, carboxyl modified silicone, α-methyl styrene modified silicone, polyether modified silicone, olefin/polyether modified silicone, epoxy modified silicone, alcohol modified silicone, and silicone oil including modified siloxane linkage.

Among these silicone oils, olefin modified silicone, amide modified silicone, polydimethyl siloxane, polyether modified silicone and olefin polyether modified silicone are preferable for the injection molded article used with the photosensitive material because the bad influence is hardly given to the photographic property of the photosensitive material and a high lubricity effect is obtained. The silicone oil improves friction coefficient of molding material, for example, resin film in heating state to lower sliding resistance when heat plate sealing is performed by an automatic wrapper device. Thus, occurrence of wrinkle is prevented. Accordingly, the resin film having beautiful appearance, high sealing property and adhesion property is obtained. Moreover, decline of gloss due to sliding is prevented so that beautiful seal is obtained. In the present embodiment, if the silicone oil is used when the sliding heat seal is performed, it is possible to set the high-temperature friction coefficient at 1.4 or less.

Moreover, with respect to a wrapping article used with the photosensitive material, light shielding property is improved so that it becomes possible to reduce the load of the light shielding material. Therefore, various properties, for example, physical strength, injection moldability, appearance may be improved.

Effects of Adding the Silicone Oil are as Follows (1) When fibrous filler, non-fibrous light shielding material and pigment are used together, the surface thereof is covered so that dispersion property is improved.

(2) Dispersion property of the resin is improved, motor loading of screw is reduced and occurrence of melt fracture is prevented.

(3) Sufficient lubricity is kept without adding the lubricant, for example, fatty acid amide which becomes white powder due to bleedout.

(4) Friction coefficient of the injection molded article in heating state is reduced. Wear due to the photographic film and winding g torque are reduced.

(5) When the light shielding material is used together, the thermoplastic resin becomes cloudy and the haze increases so that the coloring power is improved and the light shielding ability is also improved more than 20%. If a load of the light shielding material lowering physical properties is reduced more than 20%, the light shielding property is maintained. It is preferable to use a nucleating agent which becomes a nucleus of crystal and grows the crystal. The nucleating agent improves transparency, impact resistance, rigidity, hardness, dimensional stability and so forth.

Load of the lubricant is different according to its kind. In the case of the lubricant having small lubricity effect, such as the fatty acid metal salt, main purpose of which is to keep the photographic property of the photosensitive material by neutralizing a halide included in the resin, the load of the lubricant is 0.01–10 wt. %. As to the load, 0.03–5 wt. % is preferable, 0.05–3 wt. % is more preferable and 0.09–1.5 wt. % is most preferable. The fatty acid metal salt is most suitable lubricant to maintain the photographic property of the photosensitive material in good condition. In the case of the lubricant having large lubricity effect, such as the fatty acid amide lubricant, the bis fatty acid amide lubricant and so forth, which causes the bleedout and affects the photosensitive material, the load of the lubricant is 0.005–5 wt. %. As to the load, 0.01–1 wt. % is preferable, 0.03–0.5 wt. % is more preferable and 0.05–0.3 wt. % is most preferable.

Antioxidant which is one of requisites of the present embodiment is explained. In the injection molded article according to the present embodiment, at least one of antioxidants is added in order to prevent heat deterioration and heat decomposition of the addition agent, which is the lubricant, the fatty acid, organic nucleating agent, surfactant and so forth. Moreover, the antioxidant prevents marked change of flowability of the thermoplastic resin composition. Further, the antioxidant prevents occurrence of foreign substance lump and heat decomposition material (aldehyde and so on) giving a bad influence to the photographic property of the photosensitive material. A load of the antioxidant is 0.001–1.0 wt. %. As to the load, 0.005–0.7 wt. % is preferable, 0.01–0.5 wt. % is more preferable and 0.02–0.3 wt. % is most preferable. When the load is 0.01 wt. % or less, there is no effect and cost of kneading increases. When the load is 1.0 wt. % or more, a bad influence is given to the photographic property of the photosensitive material and its appearance gets worse due to the bleedout of the injection molded article surface. Further, the appearance of the injection molded article gets worse due to plate-out formed on a surface of a mold tool and in-place environment gets worse due to smoking.

Typical Examples of the Antioxidants are as Follows (a) Phenol-based antioxidants:

6-tert-butyl-3-methylphenyl derivatives; 2,6-di-tert-butyl-p-cresol; 2,2'-methylenebis(4-ethyl-6-tert-butylphenol); 4,4'-butylidenebis(6-tert-butyl-m-cresol); 4,4'-thiobis(6-tert-butyl-m-cresol); 4,4'-dihydroxydiphenylcyclohexane; alkylated bisphenol; styrenated phenol; 2,6-di-tert-butyl-4-methylphenol; n-octadecyl-3-(3',5'-di-tert-butyl-4'-hydroxyphenyl) propionate; 2,2'-methylenebis(4-methyl-6-tert-butylphenol); 4,4'-thiobis(3-methyl-6-tert-butylphenyl); 4,4'-butylidenebis(3-methyl-6-tert-butylphenol); stearyl-β-(3,5-di-tert-butyl-4-hydroxyphenyl)propionate; 1,1,3-tris(2-methyl-4-hydroxy-5-tert-butylphenyl)butane; 1,3,5-trimethyl-2,4,6-tris(3,5-di-tert-butyl-4-hydroxybenzyl)benzene; and tetrakis

[methylene-3-(3',5'-di-tert-butyl-4'-hydroxyphenyl) propionate]methane.

(b) Ketone amine condensate-based antioxidants:

6-ethoxy-2,2,4-trimethyl-1,2-dihydroquinoline; polymers of 2,2,4-trimethyl-1,2-dihydroquinoline; and trimethyldihydroquinoline derivatives.

(c) Allylamine-based antioxidants:

Phenyl-α-naphthylamine; N-phenyl-β-naphthylamine; N-phenyl-N'-isopropyl-p-phenylenediamine; N,N'-diphenyl-p-phenylenediamine; N,N'-di-β-naphthyl-p-phenylenediamine; and N-(3'-hydroxybutylidene)-1-naphthylamine.

(d) Imidazole-based antioxidants:

2-mercaptobenzoimidazole; zinc salt of 2-mercaptobenzoi-midazole; and 2-mercaptomethylbenzoimidazole.

(e) Phosphite-based antioxidants:

Alkylated allylphosphite; diphenylisodecylphosphite; sodium tris(nonylphenyl)phosphate; tris(nonylphenyl) phosphate; and triphenyl phosphite.

(f) Thiourea-based antioxidants:

Thiourea derivatives; and 1,3-bis(dimethylaminopropyl)-2-thiourea.

(g) Other antioxidants useful for air oxidation:

Dilauryl thiodipropionate.

Among the above antioxidant, Phenol-based antioxidant and Phosphite-based antioxidant are preferable. Moreover, among the Phenol-based antioxidant, the antioxidant having molecular weight of 350 or more is preferable. In this case, there is a little bleedout and smoking, it is possible to resist the high temperature during mold processing and a bad influence is hardly given to the photographic property of the photosensitive material. For example, there are various hindered phenol-based antioxidants. More concretely, there are tetrakis methylene-3-(3,5-di-t-butyl-4-hydroxyphenyl) propionate]methane, 1,3,5-tris-(2-butyl-4-hydroxy-5-di-t-butyl)butane and so forth.

Preferred antioxidants are the phenol-based ones. As marketed antioxidants, there are IREGANOX series products (Ireganox 1010, Ireganox 1076 and so on) of Ciba Geigy, SUMILIZERS BH-T, SUMILIZER BH-76, SUMILIZER WX-R, SUMILIZER BP-101 and so forth of Sumitomo Chemical Co., Ltd. Moreover, it is effective to use the antioxidant with one or more of 2.6-di-butyl-p-cresol (BHT), low-volatility polymeric Phenol-based antioxidant (trade name: Ireganox 1010, Ireganox 1076, Topanol CA, Ionox 330 and so forth), diuramilthiodipropionate, distearylthiopropionate, dialkylphosphate and so forth.

It is preferable to use the phenol-based and phosphorus-based antioxidants in combination with carbon black in view of the high effect of antioxidant action. In addition, various antioxidants disclosed in Plastic Data Handbook, published by Kabushiki kaisha Kogyo Chosakai, pp. 794–799, Plastic Additives Data, issued by K.K. Kagaku Kogyo Sha, pp. 327–329 and Plastics Age Encyclopedia, Advanced Version (1986), issued by K.K. Plastic Age, pp. 211–212. It is possible to select from among these antioxidants. As a combination of two or more antioxidants, there are, for example, a combination of the hindered phenol-based antioxidant and pentaerythritol phosphate compound-based antioxidant, a combination of the hindered phenol-based antioxidant and diorganicpentaerythritol diphosphite compound-based antioxidant, and a combination of the hindered phenol-based antioxidant and phosphite-based antioxidant. It is possible to select from alkyl-substituted monophenol-based antioxidant, alkyl-substituted polyvalent phenol-based antioxidant, organicphosphite compound-based antioxidant and organicphosphite-based antioxidant. Among these, the hindered-based antioxidant is especially preferable because it prevents heat deterioration of stearic zinc and reduces the occurrence of the lump, further, it improves the photographic property of the photosensitive material.

The light shielding material which is one of the requisites of the present embodiment is described below.

1. Inorganic Compounds (1) Oxide; silica, diatomaceous earth, alumina, titanium oxide, iron oxide (black iron oxide), zinc oxide, magnesium oxide, antimony oxide, barium ferrite, strontium ferrite, beryllium oxide, pumice stone, pumice stone balloon, and alumina fiber.

(2) Hydroxide; aluminum hydroxide, magnesium hydroxide, and basic magnesium carbonate.

(3) Carbonate; calcium carbonate, magnesium carbonate, dolomite, and danalite.

(4) Sulfate and sulfite: calcium sulfate, barium sulfate, ammonium sulfate, and calcium sulfate.

(5) Silicate; talc, clay, mica, asbestos, glass fiber, glass balloon, glass bead, calcium silicate, montmorillonite, and bentonite.

(6) Carbon; carbon black, graphite, carbon fiber, and carbon hollow sphere.

(7) Other compounds; iron powder, copper powder, lead powder, tin powder, stainless steel powder, pearlescent pigment, aluminum powder, molybdenum sulfide, boron fiber, silicon carbide fiber, aluminum fiber, stainless fiber, nickel fiber, brass fiber, potassium titanate, lead titanate zirconate, zinc borate, barium metaborate, calcium borate, sodium borate, and aluminum paste.

2. Organic Compounds

Wood meal (pine, oak, sawdust), husk fiber (almond, peanut, rice hull), cotton, jute, paper strip, cellophane piece, nylon fiber, polypropylene fiber, starch (including modified starch and surface treated starch), and aromatic polyamide fiber.

Among these light shielding materials, the inorganic compound is preferable because it does not affect the photographic property and is stable at 150° C. or more. Particularly, carbon black, titanium oxide, graphite and black iron oxide which are inert substrate are preferable in view of heat resistance and light resistance.

As classified examples based on the raw material of the carbon black, there are gas black, furnace black, channel black, anthra black, acetylene black, ketchen carbon black, thermal black, lamp black, animal black, vegetable black and so forth.

As typical examples of preferable marketed carbon black, there are, for example, CARBON BLACK #20(B), #30(B), #33(B), #40(B), #41(B), #44(B), #45(B), #50, #55, #100, #600, #950, #1000, #2200(B), #2400(B), MA8, MA11, MA100 and so forth manufactured by Mitsubishi Kasei.

Besides that, there are United R, BB, 15, 102, 3001, 3004, 3006, 3007, 3008, 3009, 3011, 3012, XC-3016, XC-3017, 3020 and so forth manufactured by Ashland Chemical. However, these are not exclusive.

In the present embodiment, the furnace carbon black is preferable in view of light resistance, cost and improvement of physical property. As the light shielding material having antistat effect, the acetylene carbon black and the ketchen carbon black which is modification accessory carbon black are preferable. It is also preferable to mix the former and the latter at need. Forms for loading the light shielding material to the thermoplastic resin are roughly classified as follows:

(1) Uniform color pellet state

This is called color compound and generally used.

(2) Dispersion powder state

This is called dry color and treated by various finishing agents. Further, dispersing agent is added to grind in fine particle state.

(3) Pasty state

The light shielding material is dispersed in plasticizer and so forth.

(4) Liquid state

This is called liquid color. The light shielding material is dispersed in surfactant and so forth.

(5) Master batch pellet state

The light shielding material is dispersed in the plastic being colored at high density.

(6) Lubricating granular powder state

This is processed in granular powder state after the light shielding material was dispersed in the plastic at high density.

(7) Dry powder state

This is an ordinal non-processed one.

As stated above, there are various forms for loading the light shielding material in the thermoplastic resin. However, the master batch method is preferable in view of cost, pollution control and so forth. Japanese Patent Publication No. 40-26196 discloses a method for producing the master batch of polymer-carbon black by dispersing the carbon black in solution of the polymer dissolved in a organic solvent. Japanese Patent Publication No. 43-10362 discloses a method for producing the master batch by dispersing the carbon black in the polyethylene. In Japanese Patent Publication No. 63-186740, the present inventor discloses a resin composition for color master batch in which the light shielding material is dispersed in specified ethylene ethylacrylate copolymer resin.

Among the carbon blacks, the carbon black having pH (measured under JIS K 6221) of 6.0–9.0 and average particle diameter (measured by electron microscope) of 10–120 m$\mu$, particularly, 10–80 m$\mu$ is preferable. Especially preferable one is the furnace carbon black in which volatile component (measured under JIS K 6221) is 2.0% or less and DBP oil absorption (measured under JIS K 6221, Oil absorption A method) is 50 ml/100 g or more in view of light shielding property, dispersion property and physical property.

Moreover, when the sulfur component of the wrapping material measured under ASTM D 1619-60 is not 0.9% or less, a bad influence is given to the photographic property of the photosensitive material. As to the sulfur component, 0.5% or less is preferable. Free sulfur component directly affecting the photographic property of the photosensitive material is 0.1% or less. As to the free sulfur component, 0.05% or less is preferable and 0.01% or less is especially preferable. Content of cyanogen compound making the photographic property worth is 20 PPM or less. The content is a converted value in PPM unit relative to weight of hydrogen cyanide determined by 4-pyridine carboxylic acid-.pyrazolone light absorbing analytical method for the weight of the light shielding material. As to the content of the cyanogen compound, 10 PPM or less is preferable and 5 PPM or less is especially preferable. Absorption of iodine (measured under JIS K 6221) is 20 mg/g or more. As the absorption, 30 mg/g or more is preferable, 50 mg/g or more is more preferable and 80 mg/g or more is most preferable. (DBP) Oil absorption of dibutyl phthalate (measured under JIS K 6221) is 50 ml/100 g or more. As to the oil absorption, 60 ml/100 g or more is preferable, 70 ml/100 g or more is more preferable and 100 ml/100 g or more is most preferable.

Next preferable light shielding materials to the carbon black are inorganic pigment having refractive index of 1.50 or more measured by Larsen oil immersion method, various metal powders, metal flake, metal paste, metal fiber and carbon fiber. Typical examples of the inorganic pigment and the metal powder are described below. However, the present embodiment is not exclusive to these. Numeral in parenthesis represents the refractive index. As the inorganic pigment having the refractive index of 1.50 or more, there are rutile-type titanium oxide (2.75), silicon carbide (2.67), anatase-type titanium oxide(2.52), zinc oxide (2.37), antimony oxide (2.35), basic lead carbonate (2.09), zinc white (2.02), lithopone (1.84), zircon (1.80), corundum (1.77), spinel (1.73), apatite (1.64), barytes powder (1.64), barium sulfate (1.64), magnesiter (1.62), dolomite (1.59), calcium carbonate (1.58), talc (1.58), calcium sulfate (1.56), silicic anhydride (1.55), quartz powder (1.54), magnesium hydroxide (1.54), hydrochloric magnesium carbonate (1.52), alumina (1.50) and so forth. As to the refractive index, 1.56 or more is preferable and 1.60 or more is most preferable.

Calcium silicate (1.46), diatomite (1.45), water-containing silicic acid (1.44) and so forth having the refractive index of 1.50 or less are not preferable as the light shielding ability is small. In order to prevent occurrence of the fog due to X-rays, it is preferable to use the light shielding material having specific gravity of 3.1 or more. As to the specific gravity, 3.4 or more is preferable. Typical examples of the light shielding material having X-ray shielding property are set forth below. However, these are not exclusive. As forms thereof, there are pigment, flake, whisker, fiber and so forth. As the light shielding material having the specific gravity of 3.1 or more, there are silicon carbide, barium sulfate, molybdenum disulfide, lead oxide (basic lead carbonate), iron oxide, titanium oxide, magnesium oxide, barium titanate, copper powder, iron powder, brass powder, nickel powder, silver powder, lead powder, steel powder, zinc powder, tungsten whisker, silicon nitride whisker, copper whisker, iron whisker, nickel whisker, chrome whisker, stainless powder, stainless whisker, magnesiter, apatite, spinel, corundum, zircon, antimony trioxide, barium carbonate, zinc white, chromium oxide, tin powder, mixture thereof and so forth.

The particular preferable light shielding material for giving the x-ray shielding property is zircon, corundum, barium sulfate, barium chloride, barium titanate, lead powder, lead oxide, zinc powder, zinc white, tin powder, stainless powder, stainless whisker, iron oxide, tungsten whisker, nickel whisker. For the injection molded article used with a high-grade photosensitive material having ISO sensitivity of 400 or more, the light shielding material having the refractive index of 1.50 or more and the specific gravity of 3.1 or more is preferable. As to the refractive index, 1.56 or more is most preferable. As to the specific gravity, 3.4 or more is most preferable. Although a content of the light shielding material is changed according to a thickness of layer and a kind of used resin, the content is 0.05–60 wt. %. As to the content, 0.2–40 wt. % is more preferable and 0.3–30 wt. % is most preferable. The refractive index and the specific gravity of the light shielding material are set forth in Table 3.

TABLE 3

| Name of light shielding material | Refractive index | Specific gravity |
|---|---|---|
| Rutile-type titanium oxide | 2.76 | 4.2 |
| Silicon carbide | 2.67 | 3.17–3.19 |

TABLE 3-continued

| Name of light shielding material | Refractive index | Specific gravity |
| --- | --- | --- |
| Anatase-type titanium oxide | 2.52 | 3.8 |
| Antimony oxide | 2.35 | 4.6 |
| Basic lead carbonate | 2.09 | 6.4–6.9 |
| Zinc white | 2.02 | 4.3 |
| Lithopone | 1.84 | 5.59 |
| Zircon | 1.80 | 3.9–4.1 |
| Corundum | 1.77 | 3.9–4.0 |
| Spinel | 1.73 | 3.5–3.6 |
| Apatite | 1.64 | 3.1–3.2 |
| Barytes powder | 1.64 | 4.5 |
| Barium sulfate | 1.64 | 4.3 |
| Magnesiter | 1.62 | 3.0–3.1 |
| Carbon black | 1.61 | 1.7–2.1 |
| Dolomite | 1.59 | 2.8–2.9 |
| Calcium carbonate | 1.58 | 2.83 |
| Talc | 1.58 | 2.6–2.8 |
| Quartz powder | 1.54 | 2.5–2.6 |
| Hydrochloric magnesium carbonate | 1.42 | 2.2–2.3 |
| Alumina | 1.50 | 3.75 |

(Oil immersion method of Larsen is used for the refractive index and A-method of ASTM D 153 is used for the specific gravity.)

As to the content of the light shielding material having the X-ray shielding property, 5–80 wt. % is preferable, 10–70 wt. % is more preferable and 20–60 wt. % is most preferable. When the content is less than 5 wt. %, there are no X-ray shielding effect. When the content is more than 80 wt. %, it is difficult to produce that. Further, sufficient physical strength and injection moldability are not obtained so that it is difficult to put that in the practical use.

A volatile component, which is almost moisture, in the resin composition including various light shielding materials is dried and reduced at 100° C. and for five hours so as not to affect the photosensitive material and not to make the injection moldability worse due to foaming and occurrence of silver streak. Drying state of 2.0 wt. % or less is preferable, 1.0 wt. % or less is more preferable, 1.5 wt. % or less is especially preferable and 0.3 wt. % or less is most preferable.

Moreover, it is preferable to use oil absorbing inorganic pigment as the light shielding material. The oil absorbing inorganic pigment has an absorbing effect of the lubricant, the antioxidant, the organic nucleating agent, a deodorizer, a fragrance imparting agent, disoxidant and so forth. As typical examples thereof, there are zinc white (52), asbestine (50), clay (51), titaniumoxide (56), kaolin (60), talc (60), carbon black (60 or more), activated carbon and so forth. Numeral in the parenthesis represents the oil absorption (measured by oil absorption A method of JIS K 6221, unit is ml/100 g).

As typical examples of metal powder including metal paste, there are aluminum powder, aluminum paste, copper powder, stainless powder, iron powder, nickel powder, brass powder, silver powder, tin powder, zinc powder, steel powder and so forth.

In the present embodiment, the aluminum powder includes aluminum paste. The aluminum powder in which surface thereof is covered with a surface cladding material is preferable. It is also preferable to knead the aluminum powder in which low-volatile material than aluminum paste is removed into the thermoplastic resin. In view of uniform dispersion property, moldability, photographic property, appearance and smell, average particle diameter of the aluminum powder is 0.3–50 μm, preferably 0.5–45 μm and more preferably 0.8–40 μm. Moreover, average thickness is 0.03–0.5 μm, more preferably 0.05–0.4 μm and most preferably 0.08–0.35 μm. Further, content of fatty acid is 5 wt. % or less, preferably 4 wt. % or less and most preferably 3 wt. % or less.

The aluminum paste is made in paste state under the existence of mineral spirit and a little higher fatty acid (for example, stearic acid or oleic acid) when the aluminum powder is made by well-known method, for example, ball mill method, stamp mill method or atomize method. In the present embodiment, the aluminum paste, various aromatic monovinyl resins (polystyrene resin, rubber-including polystyrene resin and so forth), polyolefin thermoplastic resin (various polypropylene resins, various polyethylene resins, acid modified resin, EVE resin, EEA resin, EAA resin and so forth), low-molecular-weight polyolefin resin, paraffin wax, viscosity imparting agent, dispersant of metallic soap and so forth are heated and kneaded. It is preferable to use aluminum paste compound resin and aluminum paste master batch resin in which low-volatile material (mineral spirit, white spirit) is removed by vacuum pump or the like and the content of the volatile material is 3% or less. As to the content, 1% or less is preferable and 0.5% or less is more preferable.

Especially, it is preferable to use the aluminum paste master batch resin for removing the bad influence to the photosensitive material and the bad smell. For example, when content of the mineral spirit of the master batch resin, in which the content of the aluminum paste is 40 wt. %, is 1.0 wt. %, natural resin (resin for dilution) of 19 parts by weight is kneaded relative to the aluminum paste master batch of 1 part by weight in order to set the aluminum paste density at 2 wt. %. In the injection molded article, there are some mineral spirits removed as the gas by heating during injection molding. Accordingly, the content of the mineral spirit becomes 0.05 wt. % or less. As a consequence of that, the bad influence to the photosensitive material is removed and the bad smell is reduced.

The aluminum powder includes the one of flake state in which an aluminum box is ground by the ball mill method, the stamp mill method and so forth, besides the one of powder state in which a molten aluminum is processed by atomize method, powdering method, rotational disc dropping method, evaporation method and so forth. The aluminum powder alone is unstable so that various well-known surface cladding processes are performed in order to make the surface of the aluminum powder inert. A rolled aluminum foil is cut in predetermined thickness (5–20 μm, preferably 6–15 μm, more preferably 7–10 μm) by using a calendering oil which does not affect the photographic property of the photosensitive material. Annealing is performed for the aluminum foil and fatty acid is removed. After that, fatty acid (including compound) in which number of carbon is eight or more is added to the cut aluminum foil by 5 wt. % or less. And, by using at least one grinder selected from among a ball mill, a stamp mill, a vibrating mill and an attritor, the aluminum powder in which the average particle diameter is 0.3–50 μm, the average thickness is 0.03–0.5 μm and the content of fatty acid is 5 wt. % or less is made. In the present embodiment, the aluminum powder is especially preferable in view of the dispersion property, photographic property, gloss and smell.

Although the preferable total content of the light shielding material for the injection molded article is set at 0.05–60 wt. % in order to improve the physical strength, the photographic property, the injection moldability and economic conditions, the content changes according to the light shielding ability of the light shielding material. In the case of carbon black, titanium oxide and aluminum powder which are superior in the light shielding ability, the total content of 0.05–20 wt. % is preferable in view of a balance of light shielding property, economic condition, physical strength, injection moldability and so forth. As to the content, 0.1–15 wt. % is more preferable and 0.2–10 wt. % is most preferable.

When the total content is less than 0.05 wt. %, if the thickness of the injection molded article is not thick, an optical fog occurs due to lack of the light shielding ability. If the thickness is increased to obtain the sufficient light shielding property at that state, injection molding speed of the injection molded article becomes slow (cooling time becomes long) and resin usage increases. Accordingly, it is difficult to put that in practical use. Moreover, when the total content is more than 60 wt. %, the dispersion property gets worse and much micro grit is generated so that the pressure fog and scratches occur. Moreover, moisture amount in the injection molded article increases according to increase of the moisture absorbing to the carbon black. Thus, the bad influence (for example, occurrence of the fog, disorder of sensitivity and color)is given to the photosensitive material. Further, the injection moldability of the injection molded article gets worse (occurrence of foaming, silver streak, pin hole, short shot and so forth) and the physical strength is lowered so that it is difficult to put that in practical use.

As to the light shielding material (the carbon black, the aluminum powder, the inorganic pigment having the refractive index of 1.50 or more, the inorganic pigment having the specific gravity of 3.4 or more and the inorganic pigment having the oil absorption of 50 ml/100 g are especially preferable), it is preferable to cover the surface thereof with the surface cladding material in order to improve the dispersion property and the resin flowability, and in order to prevent occurrence of the micro grit and the volatility material, deterioration of rate of the moisture absorption and dirt of die lip. Typical examples of the surface cladding material are described below.

(1) Coupling agent
  1. Coupling agent including azidosilane group (disclosed in Japanese Patent Laid-Open Publication No. 62-32125 and so forth);
  2. Silane coupling agent (aminosilane and so forth);
  3. Titanate coupling agent.

(2) Silica is deposited, successively, alumina is deposited.

(3) Higher fatty acid metal salt of zinc stearate, magnesium stearate, calcium stearate and so forth.

(4) Surfactant of soda stearate, potassium stearate, oxy ethylenedodecyl, amine and so forth.

(5) Barium sulfide aqueous solution and sulfuric aqueous solution are reacted under excess amount of barium ion and barium sulfate having the average particle diameter of 0.1–2.5 µm is produced. Silicic alkaline aqueous solution is added to this aqueous slurry and barium silicate is produced on a surface of the barium sulfate. Successively, mineral acid is added the slurry and the barium silicate is decomposed to water-containing silica so as to be deposited on the surface of the barium sulfate.

(6) Surface is covered with metal hydrated oxide (one or more of titanium, aluminum, cerium, zinc, iron, cobalt and silicon hydroxide) and metal oxide (one or two of titanium, aluminum, cerium, zinc, iron, cobalt and silicon hydroxide), or composition consisting of either one of the metal hydrated oxide and the metal oxide.

(7) Polymer having at least one reactive group selected from among aziridine group, oxazoline group and N-hydroxyalkylamide group is covered.

(8) Polyoxyalkyleneamine compound is covered.

(9) Surface is covered with ceriumcation, selected acid anion and alumina.

(10) Surface is covered with alkoxy monoderivative having α-hydroxy carboxylic acid residue at substituent group.

(11) Surface is covered with polytetrafluoroethylene.

(12) Surface is covered with polydimethylsiloxane or silicone modified material.

(13) Surface is covered with phosphoric ester compound.

(14) Surface is covered with dihydric to quadrivalent alcohol.

(15) Surface is covered with olefin wax (polyethylene wax, polypropylene wax).

(16) Water-containing aluminum oxide is covered.

(17) Surface is covered with silica or zinc compound (combination of one or more of zinc chloride, zinc hydroxide, zinc oxide, zinc sulfate, zinc nitrate, zinc acetate, zinc citrate and so forth).

(18) Surface is covered with polyhydroxy saturated hydrocarbon.

(19) Surface is covered with surfactant (cation, nonionics, amphoteric ion)

(20) Surface is covered with organic metal chelate compound (β-dititonchelate compound is preferable).

Among the above surface cladding material, (1), (3), (12), (15), (16), (18), (19) and (20) are especially preferable in view of influence for the photographic property of the photosensitive material, improvement of dispersion property of the light shielding material, reduction of the lump and improvement of flowability of the resin. Various antistatic agents, lubricants, drip-proof agents which have another effect besides the surface covering effect are also preferable. Particularly, by adding ester of aliphatic monocarboxylic acid having carbon number of 20 to 40 and aliphatic monohydric alcohol having carbon number of 20 to 40, the above problems are prevented. Especially, bad influence for the photographic property of the photosensitive material is reduced and load of a motor of the injection molding machine is reduced. Further, the dispersion property of the light shielding material, the injection moldability and the appearance of the injection molded article are improved.

As example of the monocarboxylic acid, there are montanic acid, melissic acid, cerotic acid, lacceric acid and so forth. As example of the monohydric alcohol, there are montil alcohol, melissil alcohol, laccil alcohol, seril alcohol and so forth.

These improve the flowability of the thermoplastic resin and uniform kneading so that these are superior as the surface cladding material of the light shielding material as well. Further, when these are used as a dispersant of inorganic or organic nucleating agent, various effects, for example, prevention of fly and bleedout, improvement of dispersion property and flowability, are taken. A surface covering amount of the surface cladding material is 0.1–50 parts by weight for 100 parts by weight of the light shielding material which is the carbon black, the titanium oxide, the aluminum powder and so forth. As to the covering amount, 0.5–40 parts by weight is preferable, 1–30 parts by weight is more preferable and 1.5–20 parts by weight is most preferable. When the covering amount is less than 0.1 parts by weight, covering effect is hardly taken. When the covering amount is more than 50 parts by weight, occurrence of the bleedout increases and slip between the resin and screw occurs. As a consequence of that, a discharging amount thereof changes so that scatter of thickness of the injection molded article increases. Thus, it is impossible to put that in practical use.

All sulfur content (ASTM D-1619) of the total light shielding material is 1.0% or less, preferably 0.8% or less and more preferably 0.5% or less. Free sulfur content is 150 ppm or less, preferably 50 ppm or less and more preferably 30 ppm or less. Ash content under ASTM D-1506 is 0.5% or less, preferably 0.4% or less and more preferably 0.3% or less. Content of aldehyde compound is 0.2% or less, preferably 0.1% or less and more preferably 0.05% or less. If the content is not less than the prescribed amount, bad influence is given to the photographic property of the photosensitive material.

Further, cyanide affects the photographic property. Converted value of hydrogen cyanide content to ppm unit for the weight of the light shielding material is 20 ppm or less, preferably 10 ppm or less and more preferably 5 ppm or less. The hydrogen cyanide content is determined by 4-pyridinecarboxylic acid.pyrazolone light absorbing analytical method.

In the present embodiment, coloring light shielding material may be added to the thermoplastic resin composition to color it in half-transparent state or opaque state. In this case, the light shielding property is improved, rigidity increases, injection moldability is improved, coloring trouble of the resin and the lump are not remarkable, appearance is improved and worth of product is raised. As the coloring light shielding material, there are dye, coloring pigment, white pigment, metal powder, metal fiber, metal flake, carbon black and so forth.

Next, typical examples of the coloring light shielding material are set forth below.

Black; carbon black, black iron oxide, graphite, mineral black, aniline black and so forth.

White; titanium oxide, calcium carbonate, mica, zinc white, clay, barium sulfate, calcium sulfate, antimony white, basic lead carbonate, lithopone, magnesium silicate and so forth.

Yellow; titanium yellow, yellow oxide, chromium yellow, zinc yellow, cadmium yellow, loess, pigment yellow L, Hansa Yellow 3G and so forth.

Red; red oxide, cadmium red, BON red 2B, carmine 6B, pyrazolone red, lake red C, red lead oxide, permanent 4R and so forth.

Blue; cobalt blue, ultramarine blue, Prussian blue, phthalocyanine blue, indanthrene blue, indigo, cyanin blue and so forth.

Green; chrome oxide green, titanium green, zinc green, emerald green, cobalt green, pigment green, phthalocyanine green, cyanin green and so forth.

Particularly, the carbon black is superior in cost and light shielding ability. When the carbon black is used, coloring trouble and the lump are not remarkable. Thus, the carbon black is preferable. When color print is performed for the container body, the cassette body and so on, coloring in white, gray, yellow or silver is preferable in view of its appearance, lighting of paint and so forth.

Typical examples of the surfactant for keeping antistatic properties are set out below. It is preferable to contain the surfactant in the injection molded article.

Nonionic

1. Alkylamine derivatives; T-B103 (trade name, manufactured by Matsumoto Yushi), and T-B104 (trade name, manufactured by Matsumoto Yushi).

Alkylamide types

Tertiary amine (laurylamine); Armostat 400 (trade name, manufactured by Lion Fat & Oil).

N,N-bis(2-hydroxyethylcocoamine); Armostat 410 (trade name, manufactured by Lion Fat & Oil).

Tertiary amine; ANTISTATIC 273C, 273 and 273E (trade name, manufactured by Fine Org. Chem.).

N-hydroxyhexadecyl-di-ethanol-amine; Belg. P. 654,049.

N-hydroxyoctadecyl-di-ethanol-amine; National Dist.

2. Fatty acid amide derivatives; TB-115 (trade name, manufactured by Matsumoto Yushi), Elegan P100 (trade name, manufactured by Nippon Oils & Fats), and Erik SM-2 (trade name, manufactured by Yoshimura Yukagaku).

Hydroxystearic amide.

Oxalic-N,N'-distearylamidebutylester.

Polyoxyethylenealkylamide.

3. Ether types

Polyoxyethylenealkylether

RO(CH$_2$CH$_2$O)nH

Polyoxyethylenealkylphenyl ether;

Special nonionic types: Resistat 104, PE100, 116–118, PE 132 and 139 (trade name, manufactured by Dai-ichi Kogyo Seiyaku), Elegan E115, Chemistat 1005 (trade names, manufactured by Nippon Oils & Fats), Erik BM-1 (trade name, manufactured by Yoshimura Yukagaku), and ELECTROSTRIPPER TS, TS 2, 3, 5, EA, EA2 and 3 (trade name, manufactured by Kao Soap).

4. Polyhydric alcohol ester types

Glycerine fatty acid ester: mono-, di- or triglyceride of stearic acid or hydroxystearic acid, monoglyceride (manufactured by Nippon Shono), TB-123 (trade name, manufactured by Matsumoto Yushi), and Resistat 113 (trade name, manufactured by Dai-ichi Kogyo Seiyaku).

Sorbitan fatty acid ester

Special ester; Erik BS-1 (trade name, manufactured by Yoshimura Yukagaku).

1-Hydroxyethyl-2-dodecylglyoxazoline (manufactured by British Cellophane).

Anionic

1. Sulfonic acids; Alkylsulfonate, RSO$_3$Na, Alkylbenzenesulfonate, Alkylsulfate, and ROSO$_3$Na.

2. Phosphoric ester type; Alkyl phosphate.

Cationic

1. Amide type cation; Resistat PE300, 401, 402, 406 and 411 (trade name, manufactured by Dai-ichi Kogyo Seiyaku).

2. Quaternary ammonium salts;

Quaternary ammonium chloride,

Quaternary ammonium sulfate,

Quaternary ammonium nitrate,

Catimin CSM-9 (trade name, manufactured by Yoshimura Yukagaku), CATANAC 609 (trade name, manufactured by American Cyanamide), Denon 314C (trade name, manufactured by Marubishi Yuka), Armostat 300 (trade name, manufactured by Lion Fat & Oil), 100V (trade name, manufactured by ARMOR), ELECTROSTRIPPER ES (trade name, manufactured by Kao Soap), and Chemistat 2009A (trade name, manufactured by Nippon Oils & Fats), Stearamido propyl-dimethyl-β-hydroxyethyl ammonium nitrate; CATANAC-SN (trade name, manufactured by American Cyanamide).

Ampho-ionic

1. Alkylbetaine type;

2. Imidazoline types; Leostat 53 and 532 (trade name, manufactured by Lion Fat & Oil), AMS 53, 303 and 313 (trade name, manufactured by Lion Fat & Oil);

Alkylimidazoline type.

3. Metal salt types;

AMS 576 (trade name, manufactured by Lion Fat & Oil)

Leostat 826 and 923 (trade name, manufactured by Lion Fat & Oil)

(RNR'CH$_2$CH$_2$CH$_2$NCH$_2$COO)$_2$Mg (manufactured by Lion Fat & Oil) wherein R$\geq$C, R'=H or (CH$_2$)$_m$ COO—, R=$C_3$–$C_6$ hydrocarbon, A=oxygen or an imino group, and M=organic amine or a metal.

4. Alkyl alanine type;

Others

Resistat 204 and 205 (trade name, manufactured by Daiichi Kogyo Seiyaku), Elegan 2E and 100E (trade name, manufactured by Nippon Oils & Fats), Chemistat 1002, 1003 and 2010 (trade name, manufactured by Nippon Oils & Fats), Erik 51 (trade name, manufactured by Yoshimura Yukagaku), and ALROMINE RV-100 (trade name, manufactured by Geigy). Further, it is possible to select from various antistatic agents disclosed in "Plastic data handbook" (KK Kogyo Chosakai, issued on Apr. 5, 1984, pp. 776–778).

Among the above-described surfactant, the nonionic antistatic agent is particularly preferable due to small harmful influence for the photographic properties and human body and due to preventing static marks.

It is preferable to contain the deodorant and the fragrance imparting agent in the injection molded article. Typical examples thereof are described below.

As the deodorant, there are, for example, organic carboxylic acid, mixture of organic carboxylic acid and zinc compound, and mixture of organic carboxylic acid, zinc compound and aluminum compound.

As the organic carboxylic acid, there are, for example, aliphatic polycarboxylic acid, aromatic polycarboxylic acid, and acidic polyester compound which is reaction product of the aliphatic or the aromatic polycarboxylic acid and polyhydric alcohol, and end of which is carboxyl group.

As the aliphatic polycarboxylic acid, there are di or tricarboxylic acid, for example, oxalic acid, malonic acid, succinic acid, adipic acid, fumaric acid, methylfumaric acid, maleic acid, methylmaleic acid, itaconic acid, acetylene acid, malic acid, methylmalic acid, citric acid, isocitric acid, mesaconic acid, citraconic acid, and salt thereof. Especially, citric acid, fumaric acid and salt thereof are preferable.

As the aromatic polycarboxylic acid, there are aromatic carboxylic acid and anhydrous compound, for example, phthalic acid, terephthalic acid, isophthalic acid trimellitic acid, pyromellitic acid, benzene hexatricarboxylic acid, naphthalene dicarboxylic acid, naphthalene tricarboxylic acid, naphthalene tetracarboxylic acid, azo benzene tetracarboxylic acid. Especially, benzene tricarboxylic acid and trimellitic acid are preferable.

As the acidic polyester compound whose end is carboxyl group, there are polyester whose end is carboxyl group, in which polycarboxylic acid and polyhydric alcohol are reacted, and acidic cellulosic. As the zinc compound use in combination with the organic carboxylic acid, there are inorganic zinc salt and organic zinc. The inorganic zinc salt is zinc oxide, zinc chloride, zinc sulfate, zinc phosphate, zinc carbonate, and so on. The organic zinc is zinc citrate, zinc fumarate, and so on.

As the fragrance imparting agent, natural aromatic component and synthetic aromatic component are used by being wrapped with micro capsule, cyclodextrin, zeolite, starch, and talc. The natural aromatic component is, for example, lilac oil, jasmine, abies oil, cinnamon oil, lavender oil, and lemon oil. The synthetic aromatic component is , for example, geraniol, eugenol, n-octyl alcohol, carbitol, cis-jasmone, lemon terpene, menthane, methyl salicylate, metylphenyl carbinol, triethyl sitorate, benzyl benzoate, citral, d-limonene, ethylcinnamate, octanol, alkylene glycocoll, benzyl salicylate, linalool, vanillin, coumarin, methylnaphthyl ketone, and rose phenone.

In the injection molded article according to the present embodiment, at least one of above-described antioxidant, deodorant and agent imparting fragrance is totally included by 0.01–20 wt. %. As to the content, 0.05–17 wt. % is preferable, 0.1–15 wt. % is more preferable, and 0.5–12 is most preferable. When the content is less than 0.01 wt. %, kneading cost increases without effect due to adding them. When the content is more than 20 wt. %, material cost increases without effect due to increasing amount. Further, there are possibility that some of them give bad influence for the photographic property and reduce the physical strength of the injection molded article.

It is preferable to contain hydrotalcite compound in the injection molded article. In the injection molded article according to the present embodiment, at least one of the hydrotalcite compound and the fatty acid metal salt is added in order to neutralize catalyst residue, to absorb the halide for making the material affecting the photographic property harmless and to prevent resin discoloration or the like. The content thereof is 0.001–5.0 wt. %, preferably 0.005–4.0 wt. %, more preferably 0.01–3.0 wt. % and most preferably 0.02–2.0 wt. %. When the content is less than 0.001 wt. %, adding effect is not taken and kneading cost increases. When the content is more than 5.0 wt. %, the adding effect is not taken, weldline and lump occur and its cost increases. Typical examples of the hydrotalcite compound are set forth below.

General formula of the hydrotalcite is as follows:

$$M_X R_Y(OH)_{2x+3y-2z}(A)_{z\cdot a}H_2O$$

Character M is Mg, Ca or Zn. Character R is Al, Cr or Fe. Character A is $CO_3$ or $HPO_4$. Characters x, y, z and a are integral numbers.

Concretely, there are $Mg_6Al_2(OH)_{16}CO_3 \cdot 4H_2O$, $Mg_8Al_2(OH)_{20}CO_3 \cdot 5H_2O$, $Mg_5Al_2(OH)_{14}CO_3 \cdot 4H_2O$, $Mg_{10}Al_2(OH)_{22}(CO_3)_2 \cdot 4H_2O$, $Mg_6Al_2(OH)_{16}HPO_4 \cdot 4H_2O$, $Ca_6Al_2(OH)_{16}CO_3 \cdot 4H_2O$, $Zn_6Al_2(OH)_{16}CO_3 \cdot 4H_2O$, $Mg_{4.5}Al_2(OH)_{13} \cdot 3.5H_2O$ and so forth.

Another general formula of the hydrotalcite is as follows:

$$M_{(1-x)}Alx.(OH)_2X_{x/n} \cdot mH_2O$$

Character M denotes alkali earth metal and Zn. Character X denotes n-valence anion. Characters x, m and n satisfy the following condition.

$$0<x<0.5,\ 0\leq m\leq 2,$$

and character n is integral number from 1 to 4.

Further, the refractive index (measured by Larsen oil immersion method) is within a range of 1.40–1.55.

As examples of the n-valence anion represented by X in the above formula, there are $Cl^-$, $Br^-$, $I^-$, $NO_3^-$, $ClO_4^-$, $SO_4^{2-}$, $CO_3^{2-}$, $SiO_3^{2-}$, $HPO_4^{2-}$, $HBO_3^{2-}$, $PO_4^{3-}$, $Fe(CN)_6^{3-}$, $Fe(CN)_4^{4-}$, $CH_3COC^-$ and $C_6H_4(OH)COO^-$.

Preferable concrete examples are set forth below.

$Mg_{0.7}Al_{0.3}(OH)_2(CO_3)_{0.15} \cdot 0.54H_2O$ $Mg_{0.67}Al_{0.33}(OH)_2(CO_3)_{0.165} \cdot 0.54H_2O$ $Mg_{0.67}Al_{0.33}(OH)_2(CO_3)_{0.155} \cdot 0.54H_2O$ $Mg_{0.6}Al_{0.4}(OH)_2(CO_3)_{0.2} \cdot 0.54H_2O$ $Mg_{0.75}Al_{0.25}(OH)_2(CO_3)_{0.125} \cdot 0.54H_2O$ $Mg_{0.83}Al_{0.17}(OH)_2(CO_3)_{0.085} \cdot 0.54H_2O$ and so forth These hydrotalcite compounds may be natural or synthetic. Main component of the hydrotalcite compound is magnesium, aluminum and so forth. The hydrotalcite compound absorbs halogenated ion, for example, chlorine ion affecting the photographic property of the photosensitive material and making it harmless. Further, it is considered that volatility material and so forth, which affect the photographic property, included in the monomer and the addition agents of the thermoplastic resin is absorbed to stabilize it. Concrete synthesizing method for the hydrotalcite is disclosed in Japanese Patent Publication Nos. 46-2280, 50-30039 and so forth.

In the present embodiment, the above hydrotalcite compounds are especially preferable and crystallographic structure thereof is usable without limitation of crystal particle diameter. As natural hydrotalcite compound, there are manasseite, stichtite, pyroaurite and so forth. These may be used alone or as combination of two kinds or more. Particularly, it is preferable to use it with various antioxidants and fatty acid metal salts in view of improvement of the dispersion property of the light shielding material and the hydrotalcite compound. Moreover, in order to improve processability and physical properties of the injection molded article, average secondary particle diameter is 20 $\mu$m or less, preferably 10 $\mu$m and more preferably 5 $\mu$m. Further, BET specific surface is 50 $m^2/g$, preferably 40 $m^2/g$ and more preferably 30 $m^2/g$.

It is preferable to process the hydrotalcite compound with the surface cladding material as the dispersion property is improved. By covering the surface thereof, the dispersion property or affinity for the resin is improved, further, the injection moldability, the physical strength and so forth are also improved.

The above surface cladding material (1)–(20) may be used. However, especially preferable examples are as follows:

(1) Higher fatty acid metal salt;
soda laurate, potassium laurate, soda oleate, potassium oleate, calcium oleate, magnesium stearate, soda stearate, zinc stearate, potassium stearate, soda palmitate, potassium palmitate, soda caprate, potassium caprate, soda myristate, potassium myristate, soda linoleate and potassium linoleate, (2) Higher fatty acid;
lauric acid, palmitic acid, oleic acid, stearic acid, capric acid, myristic acid and linoleic acid, (3) Organic sulfonic acid metal salt;
dodecylbenzene sulfonic acid calcium and dodecylbenzene sulfonic acid sodium, (4) Coupling agent;
isopropyl tri-isostearoyl titanate, isopropyl tris (dioctylpyrophosphate)titanate, tetraisopropyl bis (dioctylphosphite)titanate, vinyltriethoxy silane, gamma-methacryloxypropyl trimethoxy silane and gamma-glycideoxypropyl trimethoxy silane, (5) Higher fatty acid amide;
(6) Higher fatty ester;
(7) Silicone;
(8) Wax.

Surface covering by the surface cladding material may be performed such that aqueous solution of higher fatty acid alkaline metal salt is added to hot water in which the hydrotalcite compound is suspended, or solution of higher fatty acid or diluting liquid of the coupling agent is dropped in the hydrotalcite compound powder being agitated with a mixing machine, for example, Henschel mixer. Content of the surface cladding material may be selectively changed. However, about 0.01–50 parts by weight for 100 parts by weight of the hydrotalcite compound is suitable. As to the content, 0.05–35 parts by weight is preferable, 0.1–20 parts by weight is more preferable and 0.5–10 pars by weight is most preferable.

A little bit of impurity, for example, metal oxide may be contained. Further, in order to improve dispersion property of the hydrotalcite compound, at least one of higher fatty acid, fatty acid amide lubricant, silicone oil, sorbitan fatty ester such as sorbitan monostearate, glycerine fatty ester such as glycerine monostearate and so forth may be contained in the resin composition as the dispersant. Total content thereof is 0.01–10 wt. %, preferably 0.05–8 wt. %, more preferably 0.08–5 wt. % and most preferably 0.1–3 wt. %. By using them with the hydrotalcite compound, deterioration of the photographic property is prevented, stability of the injection molded article and corrosion prevention effect of the injection molding machine are improved and resin deterioration is prevented. Besides that, transparency is improved, deterioration of physical strength is prevented, occurrence of the lump due to resin discoloration is prevented and coloring trouble is prevented. It is especially preferable to use them with at least one stabilizer selected from among phenol-based antioxidant, phosphorus (phosphite)-based antioxidant and fatty acid metal salt because the deterioration of the photographic property does not occur, and the corrosion prevention effect of injection molding machine and the anti-oxidant effect are improved.

In this case, the following are added in the injection molded article in order to prevent the bad influence from giving for the photographic property of the photosensitive material.

(1) Phenol-based antioxidant of 0.0005–0.5 wt. %, preferably 0.001–0.4 wt. % and more preferably 0.002–0.3 wt. %;

(2) Phosphorus antioxidant of 0.0005–0.5 wt. %, preferably 0.001–0.4 wt. % and more preferably 0.002–0.1 wt. %;

(3) At least one of the hydrotalcite compound and the fatty acid metal salt (metal soap), content of which is 0.001–5 wt. %, preferably 0.005–4 wt. % and more preferably 0.01–3 wt. %.

Total content of (1)+(2)+(3) is 0.0015–6 wt. %, preferably 0.002–5 wt. %, more preferably 0.003–4 wt. % and most preferably 0.005–3 wt. %. Anyway, it is preferable to add the admixture of minimum amount for preventing the resin deterioration in view of deterioration of the photographic property, prevention of the bleedout and inhibition of the cost.

Moreover, it is preferable to use them together with the hydrotalcite compound. Further, the fatty acid metal salt (metallic soap) having a superior effect similar to the hydrotalcite compound is described below. The fatty acid metal salt has effects as the lubricant and the dispersant of the light shielding material as well.

As typical examples of the fatty acid metal salt, there are lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid and so forth which are higher fatty acid, and compounds with a metal of Li, Na, Mg, Ca, Sr, Ba, Zn, Cd, Al, Sn, Pb and so forth. The preferable one is magnesium stearate, calcium stearate, sodium stearate, zinc stearate, calcium oleate, zinc oleate, magnesium oleate and so forth.

Name, molecular formula, state and melting point of the marketed typical fatty acid metal salt are shown in Table 4.

TABLE 4

| Name | Molecular formula | State | Melting point (° C.) |
|---|---|---|---|
| Barium stearate | $Ba(C_{17}H_{35}COO)_2$ | white impalpable powder | 225 or mor |

TABLE 4-continued

| Name | Molecular formula | State | Melting point (° C.) |
|---|---|---|---|
| Barium laurate | $Ba(C_{17}H_{23}COO)_2$ | white impalpable powder | 230 or more |
| Barium ricinoleate | $Ba(C_{17}H_{32}(OH)COO)_2$ | yellow-white powder | 116–124 |
| Barium naphthenate | $Ba(C_nH_{2n-1}O_2)_2$ | yellow viscous solid | — |
| Barium 2-ethylhexoate | $Ba(C_7H_{15}COO)_2$ | yellow viscous solid | — |
| Calcium stearate | $Ca(C_{17}H_{35}COO)_2$ | white impalpable powder | 148–155 |
| Calcium laurate | $Ca(C_{11}H_{23}COO)_2$ | white impalpable powder | 150–158 |
| Calcium ricinoleate | $Ca(C_{17}H_{32}(OH)COO)_2$ | yellow-white powder | 74–82 |
| Zinc stearate | $Zn(C_{17}H_{35}COO)_2$ | white impalpable powder | 117–125 |
| Zinc laurate | $Zn(C_{11}H_{23}COO)_2$ | white impalpable powder | 110–120 |
| Zinc ricinoleate | $Zn(C_{17}H_{32}(OH)COO)_2$ | yellow-white powder | 94–102 |
| Zinc 2-ethylhexoate | $Zn(C_7H_{15}COO)_2$ | colorless viscous liquid | — |
| Lead stearate | $Pb(C_{17}H_{35}COO)_2$ | white impalpable powder | 105–112 |
| Dibasic lead stearate | $2Pbo-Pb(C_{17}H_{35}COO)_2$ | white impalpable powder | decomposed at 280–300 |
| Lead naphthenate | $Pb(C_nH_{2n-1}O_2)_2$ | brown candy-like material | — |
| Tin stearate | $Sn(C_{17}H_{35}COO)_2$ | white powder | 103–108 |
| Magnesium stearate | $Mg(C_{17}H_{35}COO)_2$ | white impalpable powder | 108–115 |

At least one kind of the inorganic nucleating agent and the organic nucleating agent may be added in the injection molded article according to the present embodiment. By adding them, it is possible to improve surface hardness, rigidity, Izod impact strength, wear resistance and so forth. When they are added to the polyolefin resin which is crystalline resin, particularly, homopolyethylene resin, ethylene-α-olefin copolymer resin and propylene-α-olefin copolymer resin, transparency and injection moldability are also improved.

With respect to total content of at least one kind of the inorganic nucleating agent and the organic nucleating agent, 0.001–10 wt. % is preferable, 0.005–8 wt. % is more preferable and 0.01–5 wt. % is most preferable. When the total content is less than 0.001 wt. %, an effect due to adding is not taken and kneading cost increases. When the total content is more than 10 wt. %, an effect due to increasing it is not taken and its cost merely increases. In the case of the organic nucleating agent, smoking increases when the injection molding is performed. Further, the bleedout occurs on the surface of the injection molded article with time so that its appearance becomes bad. Furthermore, it adheres to the photosensitive layer of the photosensitive material as the white powder so that the development of the photosensitive material is impeded.

As the organic nucleating agent being usable for the present embodiment, there are carboxylic acid, dicarboxylic acid, salt and anhydride thereof, salt and ester of aromatic sulfonic acid, aromatic phosphinic acid, aromatic phosphonic acid, aromatic carboxylic acid, other aluminum salt, aromatic phosphoric acid metal salt, alkylalcohol (number of carbon of which is 8–30), condensate of polyvalent alcohol and aldehyde, alkyl amine and so forth. Concretely, there are p-t-butyl benzoic acid aluminum, 1,2,3,4-dibenzylidene sorbitol, di-substituted benzylidene sorbitol compound shown in Chemical Formula 2 (in the formula, $R_1$ and $R_2$ are alkyl, alkoxy or halogen (number of carbon of which is 1–8), m and n are any one of 0 to 3, further, $m+n \geq 1$), calcium of stearyl lactic acid, metal salt of magnesium and so on, compound, which is shown in Chemical Formula 3, of N-(2-hydroxyethyl)-stearylamine and so forth (in the formula, $R_3$ is alkyl group (number of carbon of which is 8–30), k and l are any one of 0–10, further, $k+l \geq 1$), lithium salt of 1,2-hydroxy stearic acid, metal salt of sodium salt, potassium salt, calcium salt, magnesium salt and so forth, alkyl alcohol of stearyl alcohol, lauryl alcohol and so forth, soda benzoate, benzoic acid, sebacic acid and so forth.

[Chemical Formula 2]

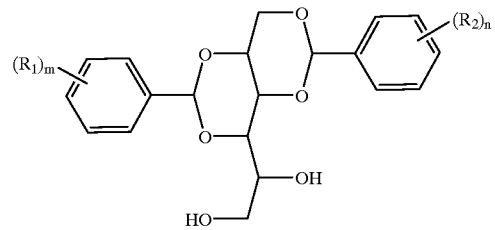

[Chemical Formula 3]

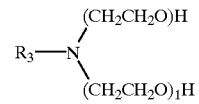

Typical examples of the sorbitol compound which is preferable in the organic nucleating agents are set forth below.

di-(o-methylbenzylidene)sorbitol
o-methylbenzylidene-p-methylbenzylidenesorbitol
di-(o-methylbenzylidene)sorbitol
m-methylbenzylidene-o-methylbenzylidenesorbitol
di-(o-methylbenzylidene)sorbitol
m-methylbenzylidene-p-methylbenzylidenesorbitol
1.3-heptanylidenesorbitol
1.3,2.4-diheptanylidenesorbitol
1.3,2.4-di(3-nonyl-3-pentenylidene)sorbitol
1.3-cyclohexanecarbylidenesorbitol
1.3,2.4-dicyclohexanecarbylidenesorbitol
1.3,2.4-di(p-methylcyclohexanecarbylidene)sorbitol
  Aromatic hybrocarbon groups or derivatives thereof
1.3-benzylidenesorbitol
1.3,2.4-dibenzylidene-D-sorbitol
1.3,2.4-di(m-methylbenzylidene)sorbitol
1.3,2.4-di(p-methylbenzylidene)sorbitol
1.3,2.4-di(p-hexylbenzylidene)sorbitol
1.3,2.4-di(1-naphthalenecarbylidene)sorbitol
1.3,2.4-di(phenylacetylidene)sorbitol
1.3,2.4-di(methylbenzylidene)sorbitol
1.3,2.4-di(ethylbenzylidene)sorbitol 1.3,2.4-di(propylbenzylidene)sorbitol
1.3,2.4-di(methoxybenzylidene)sorbitol
1.3,2.4-di(ethoxybenzylidene)sorbitol
1.3,2.4-di(P-methylbenzylidene)sorbitol
1.3,2.4-di(P-chlorbenzylidene)sorbitol
1.3,2.4-di(P-methoxybenzylidene)sorbitol
1.3,2.4-di(alkylbenzylidene)sorbitol
1.3,2.4-di(methylbenzylidene)sorbitol aluminumbenzoate and so forth The dibenzylidenesorbitol which is especially preferable among the above organic nucleating agent is added in the polyolefin resin, polypropylene-based resin of homopolypropylene resin, propylene.α-olefin copolymer (block type and random type) resin and so forth, polyolefin-based resin of low-density homopolyethylene resin, high-density homopolyethylene resin, straight-chain polyethylene (ethylene.α-olefin copolymer)resin, ethylene propylene copolymer resin and so forth. Particularly, crystalline polyolefin-based resin having high crystallinity index is preferable. The crystallinity index is 50% or more, preferably 70%, more preferably 80% and most preferably 90%.

The molecular-weight distribution of the polyolefin-based resin is 1.1–20, preferably 1.3–15, more preferably 1.5–12 and most preferably 1.8–10 in view of balance of physical strength and moldability. It turned out that admixture effect of the organic nucleating agent is more taken as the molecular-weight distribution is smaller. Accordingly, when the organic nucleating agent is contained, the molecular-weight distribution is 1.1–10, preferably 1.3–8, more preferably 1.5–6 and most preferably 1.8–5. At this time, the molecular-weight distribution is measured by the GPC method. When the molecular-weight distribution is less than 1.1, physical strength and dimensional accuracy are superior, however, injection moldability becomes bad and polymerization becomes difficult. When the molecular-weight distribution is more than 20, the forgoing is reversed. In both cases, it is difficult to put them in practical use.

By containing the above di-substituted benzylidenesorbitol compound in the polyolefin-based resin composition, it is possible to provide the injection molded article used with the photosensitive material in which physical strength, surface strength, surface hardness, rigidity, bleedout resistance, non-odorousness, transparency, photographic property, injection moldability, dimensional accuracy, wear resistance and so forth are superior.

The reason why the polyolefin-based resin composition containing the preferable organic nucleating agent has superior effects is not clear. Benzaldehyde derivative, for example, benzaldehyde which is raw material of conventional dibenzylidenesorbitol, and p-substituted benzaldehyde which is raw material of the dibenzylidenesorbitol derivative, has smell. These remain in the dibenzylidenesorbitol (derivative) by a little after purification. It is considered that this is the cause of foreign odor of the injection molded article. Further, it is considered that the foreign odor is caused by decomposition of the dibenzylidenesorbitol compound due to heating when the injection molding is performed. These aldehyde compounds give bad influence to the photographic property of the photosensitive material (the fog, trouble of sensitivity, coloring and gradation) besides the smell. Therefore, it is preferable to use them with various antioxidants, the fatty acid metal salt and the hydrotalcite compound in order to prevent the bad influence.

The organic nucleating agent may be used alone or used with various inorganic nucleating agent. Further, two or more kinds of the organic nucleating agent may be used together. At least one of the organic and the inorganic nucleating agent may be covered with the lubricant of various fatty acid, fatty compound, silicone and so forth, the dispersant including the surface cladding agent of the coupling agent, plasticizer, surfactant and so forth, wetting agent and so forth. Especially preferable one is the dibenzylidenesorbitol compound, surface of which is covered with at least one of the higher fatty acid, the higher fatty acid compound (higher fatty acid metal salt) and the plasticizer.

As the inorganic nucleating agent, there are, for example, clay group of talc, clay, mica, montmorillonite, bentonite and so forth, inorganic salt of calcium silicate, magnesium silicate, calcium sulfate, barium sulfate, lithium carbonate, sodium carbonate, sodium bicarbonate, potassium bicarbonate, calcium carbonate, magnesium carbonate, lithium hydroxide, sodium hydroxide, potassium hydroxide, calcium hydroxide, magnesium hydroxide, barium hydroxide and so forth, and metallic chloride of sodium oxide, calcium oxide, magnesium oxide, alumina, titanium oxide, iron oxide, zinc oxide and so forth.

Loading of the organic and the inorganic nucleating agent for the resin composition is 0.01–5 wt. %, preferably 0.03–3.5 wt. %, more preferably 0.06–2 wt. % and most preferably 0.1–1 wt. %. When the loading is less than 0.01 wt. %, rigidity, transparency, productivity, heat resistance, hardness and so forth are not improved. When the loading is more than 5 wt. %, transparency, rigidity and so forth are not improved, bleedout and coloring trouble occur and material cost increases.

Among the nucleating agents, 1,3-2,4-di(4-methylbenzylidene)sorbitol which is sorbitol derivative shown in Chemical Formula 4 is most preferable in view of smell, occurrence of aldehyde compound, nucleating effect, shortening of molding cycle, occurrence of molding trouble and so forth,. As marketed examples, there are GELALL MD (trade name) of Shi-Nippon Rika Co., Ltd and so forth.

[Chemical Formula 4]

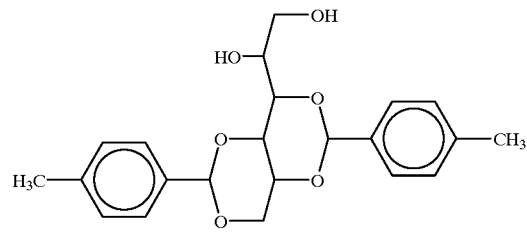

In order to make effective the antioxidant containing in the injection molded article, it is preferable to add an antioxidant synergist. Content of the antioxidant synergist is 0.0015–11 wt. %, preferably 0.002–10 wt. %, more preferably 0.003–9 wt. % and most preferably 0.005–8 wt. %. It is preferable to add the antioxidant synergist of necessary minimum amount in view of influence for the photographic property and the cost.

By using the antioxidant synergist with at least one of the antioxidant, radical trapping agent and the hydrotalcite compound, the heat deterioration and the heat decomposition of the resin and the low-molecular weight admixture (lubricant, antistatic agent, organic nucleating agent, drip-proof agent, compatibilizing agent and so forth) are prevented. Moreover, deterioration of physical strength, change of flowability of the resin, gate blocking of mold tool, short shot and the lump are prevented. Further, occurrence of pyrolysis material (aldehyde or the like) badly affecting the photosensitive material is prevented. As the antioxidant synergist having such effects, there are phosphoric acid, citric acid, phosphoric compound, citric compound and so forth. Especially, phosphoric acid metal salt and citric acid metal salt are preferable.

Similarly to the antioxidant, the radical trapping agent and the antioxidant synergist, it is preferable to use an ultraviolet light absorber for preventing photo-deterioration of the thermoplastic resin of the polyolefin resin, homopolystyrene resin, rubber-including aromatic vinyl resin and so forth. Typical examples of the ultraviolet light absorber being usable for the injection molded article according to the present embodiment are set forth below.
(1) Salicylic Ultraviolet Light Absorber
  Main examples are as follows:
Phenylsalicylate
p-t-Butylphenylsalicylate
p-Octylphenylsalicylate
(2) Benzophenone Ultraviolet Light Absorber
  Main examples are as follows:
2,4-Dihydroxybenzophenone
2-Hydroxy-4-methoxybenzophenone
2-Hydroxy-4-octoxybenzophenone
2-Hydroxy-4-dodecyloxybenzophenone
2,2'-Dihydroxy-4-methoxybenzophenone
2,2'-Dihydroxy-4,4'-dimethoxybenzophenone
2-Hydroxy-4-methoxy-5-sulfobenzophenone
(3) Benzotriazole Ultraviolet Light Absorber
  Main examples are as follows:
2-(2'-Hydroxy-5'-methylphenyl)benzotriazole
2-(2'-Hydroxy-5'-t-butylphenyl)benzotriazole
2-(2'-Hydroxy-3',5'-di-t-butylphenyl)benzotriazole
2-(2'-Hydroxy-3'-t-butyl-5'-methylphenyl)-5-chlorobenzotriazole
2-(2'-Hydroxy-3',5'-di-t-butylphenyl)-5-chlorobenzotriazole
2-(2'-Hydroxy-3',5'-di-t-amylphenyl)benzotriazole
2-(2'-Hydroxy-4'-octoxyphenyl)benzotriazole
2-[2'-Hydroxy-3'-(3",4",5",6"-tetrahydrophthal imidemethyl)-5'-methylphenyl]-benzotriazole
2,2-Methylene-bis[4-(1,1,3,3-tetramethylbutyl)-6-(2H-benzotriazole-2-il)phenol]
(4) Cyanoacrylate Ultraviolet Light Absorber
2-Ethylhexyl-2-cyano-3,3'-di-phenylacrylate
Ethyl-2-cyano-3,3'-diphenylate Loading of the ultraviolet light absorber for 100 parts by weight of the thermoplastic resin is 0.01–10 parts by weight, preferably 0.05–5 parts by weight and more preferably 0.1–3 parts by weight. When the loading is less than 0.01 parts by weight, sufficient effect is not obtained. When the loading is more than 10 parts by weight, the bleedout occurs. Incidentally, two or more kinds of the ultraviolet light absorber may be used together.

In the present embodiment, similarly to the antioxidant, the radical trapping agent and the antioxidant synergist, it is preferable to use an age resister for preventing phenomena of aging. As typical examples, there are naphthylamine of phenyl-β-naphthylamine and so forth, diphenylamine of N-N'-diphenylethylenediamine and so forth, p-phenylenediamine of N,N'-diphenyl-p-phenylenediamine and so forth, hydroquinone derivative of 6-ethoxy-2,2,4-trimethyl-1,2-dihydroquinine and so forth, monophenol of 2,6-di-third-butyl-4-methylphenol and so forth, polyphenol of 2,2'-methylene-bis-(4-ethyl-6-t-butylphenol) and so forth, thiobisphenol of 4,4'-thiobis-(6-t-butyl-3-methylphenol), 2-mercaptobenzimidazole. These are optionally formulated according to the influence for the photographic property and aging characteristics.

Loading of the age resister for 100 parts by weight of the thermoplastic resin is 0.01–10 parts by weight, preferably 0.05–5 parts by weight and more preferably 0.1–3 parts by weight. When the loading is less than 0.01 parts by weight, sufficient effect is not obtained. When the loading is more than 10 parts by weight, the bleedout occurs.

Various addition agents may be added to the thermoplastic resin composition in which the thermoplastic resin polymerized by the single-sight catalyst and having the molecular-weight distribution of 1.1–5 is contained by 30 wt. % or more. Detail of the addition agents are disclosed in "New Pigment Manual" (published by Seibundo Sinkousha Co., Ltd., on Jan. 10, 1977), "New Chemical Index" (published by Kagaku Kogyo Nipposha, on Jul. 23, 1993), "Chemical Merchandise of 12394" (published by Kagaku Kogyo Nipposha, on Jan. 26, 1994), "Plastic Data Handbook" (published by Kogyo Chosakai Co., Ltd., on Apr. 5, 1984, "Practical Plastic Term Dictionary, third edition" (published by Plastic Age Co., Ltd.) and so forth. Almost all of the additives are usable for the injection molded article according to the present embodiment. Typical examples thereof are described below. However, these are not exclusive.
A. First classification
classification based on performance for the needs
  1. Assistant for processing
    a. Processing stabilizer (antioxidant, heat stabilizer) (PVC stabilizer)
    b. Fluid control agent (plasticizer, lubricant)
    c. Shape retaining assistant (parting agent, shrinkage inhibitor)
  2. Compounding modifier
    2-1 Stabilizer (longevity control agent)
      a. Antioxidant
      b. Light resistance stabilizer
      c. Fire retardant
      d. Biostabilizer
      e. Deterioration restoring agent
    2-2 Performance modifier (physical properties control agent)
      a. Impact resistance modifying agent (various elastomers, rubber, L-LDPE resin and so forth)
      b. Filler, Reinforcer
      c. Colorant
      d. Plasticizer
      e. Blowing agent
      f. Crosslinker (organic oxide)
      g. Nucleating agent
    2-3 Function modifier (Function imparting agent)
      a. Conductive agent, Magnetic agent
      b. Antistatic agent
      c. fluorescent whitening agent
    2-4 Kicker
      a. Green degradation
      b. Photolytic degradation
      c. Pyrolysis and so forth
B. Second Classification
  Classification based on attribute of compounding agent
  1. Powder modifier
    a. Reinforcer/Filler
    b. Nucleating agent
    c. Processing assistant
    d. Powder/powder specialty structure
  2. Reaction modifier
    a. Crosslinker b. Macromonomer c. Stabilizer (heat, light, radiation, living organism)

d. Kicker (living organism, light, heat)

3. Interface modifier a. Coupling agent b. Compatibilizing agent c. Plasticizer and solvent, Plasticizer or solvent 4. High-molecular modifier a. Processability modifying agent, Performance modifier b. Polymer alloy, blend (performance modification) and so forth When the above thermoplastic resin composition is used for the injection molded article, there is possibility that silver streak, foaming, weldline, short shot and so forth occur. Accordingly, it is preferable to set the moisture content of the thermoplastic resin composition at 1.0 wt. % or less. The moisture content is measured by ISO 2053-76 method ($105\pm2°$ C., drying for one hour). As to the moisture content, 0.7 wt. % or less is preferable, 0.5 wt. % or less is more preferable and 0.3 wt. % or less is most preferable.

As the injection molded article used with photosensitive material according to the present embodiment, there are, for example, photo film cassette made of resin, photo disc film cartridge, instant film unit, lens-fitted film unit, photo film spool, light shielding container, photo film cassette, light shielding magazine for sheet-like or roll-like photosensitive material, winding spool, photo film cartridge, instant film pack, sheet film magazine, sheet film holder, photo film taking camera, photosensitive material developing unit, and sheet film unit. The present embodiment is available for various injection molded articles which are required to maintain perfect light shielding property and photographic property.

Typical injection molded articles according to the present embodiment are described bellow but these are not exclusive.

(1) Photo disc film cartridge: Japanese Utility Model Laid-open Publication No. 60-21743, etc.

(2) Lens-fitted film unit: Japanese Patent Laid-open Publication Nos. 63-226643, 8-114891, 8-227122, etc.

(3) Photo film spool: Japanese Patent Laid-open Publication Nos. 1-251030, 57-196218, 59-15049, 58-203436, 58-82237, 58-82236, 62-240957, 62-284355, 4-335638, 8-110614, 8-118406, 8-201986, Japanese Utility Model Laid-open Publication Nos. 63-73742, 54-120931, 58-178139 to 178145, Japanese Utility Model Publication Nos. 55-31541, 44-16777, U.S. Pat. No. 1,930,144, British Patent No. 2,199,805, etc.

(4) Photo film (APS and so forth) cassette: Japanese Patent Laid-open Publication Nos. 54-111822, 50-33831, 56-87039, 1-312538, 57-190948, 4-273240, 4-320258, 4-335344, 4-335639, 4-343353, 4-349454, 8-122976, 8-179469, 8-179470, 8-179471, 8-179472, Japanese Patent Publication Nos. 45-6991, 55-21089, Japanese Utility Model Laid-open Publication No. 55-97738, U.S. Pat. Nos. 4,846,418, 4,848,693, 4,887,776, etc.

(5) Photo film cassette container: Japanese Patent Laid-open Publication Nos. 61-250639, 61-73947, 63-121047, 62-291639, Japanese Patent Publication No. 2-38939, Japanese Utility Model Laid-open Publication Nos. 60-153451, 1-113235, 1-152337, Japanese Utility Model Publication Nos. 2-33236, 3-48581, U.S. Pat. Nos. 4,801,011, 4,639, 386, 4,979,351, European Patent Nos. 237,062, 280,065, 298,375, etc.

(6) Winding spool, film-like photosensitive material core, reel: Japanese Utility Model Laid-open Publication No. 60-107848, U.S. Pat. No. 4,809,923, British Patent No. 2,033,873, etc.

(7) Sheet film pack or sheet film unit: Japanese Patent Laid-open Publication Nos. 5-341379, 8-110568, 8-110569, 8-110570, 8-201982, 8-201983, 8-201984, 8-262557, 8-262558, 8-110570, etc.

(8) Photo film cartridge: Japanese Patent Laid-open Publication No. 1-312537, Japanese Utility Model Laid-open Publication Nos. 2-24846, 2-29041, Japanese Utility Model Publication Nos. 56-16610, 60-120448, etc.

(9) photo sheet film case: Japanese Patent Publication No. 2-54934, Japanese Utility Model Laid-open Publication Nos. 54-100617, 64-32343, 1-94258, 2-56139, U.S. Pat. No. 4,779,756, European Patent No. 242,905, etc.

(10) Instant Film pack: Japanese Patent Laid-open Publication Nos. 50-33831, 57-19048, 62-240961, 1-312538, 7-159931, 7-159932, 7-159933, Japanese Patent Publication No. 57-190948, Japanese Utility Model Laid-open Publication Nos. 61-41248, 55-97738, U.S. Pat. Nos. 4,834,306, 4,846,418, 4,887,776, etc.

(11) Photo film cassette made of resin (APS): Japanese Patent Laid-open Publication Nos. 50-33831, 57-190948, 1-312538, Japanese Patent Publication Nos. 45-6991, 55-21089, Japanese Utility Model Laid-open Publication No. 55-97738, U.S. Pat. Nos. 4,834,306, 4,846,418, 4,887, 776, etc.

Moreover, photosensitive materials being available for the injection molded articles are described bellow.

(1) Silver halide photosensitive material (printing film, color or black-and-white photographic paper, color or black-and-white negative film, photographic master paper, DTR photosensitive material, computerized photo-composition film, computerized photo-composition paper, micro film, color or black-and-white positive film, motion picture film, auto-developing photosensitive material, direct positive film and paper, etc.).

(2) Heat development photosensitive material (heat development color photosensitive material, heat development black-and-white photosensitive material which are disclosed in Japanese Patent Publication Nos. 43-4921, 43-4924, Japanese Patent Laid-open Publication Nos. 59-12431, 60-2950, 61-52343, U.S. Pat. No. 4,584,267, "Basis of photo optics, volume of silver salt photograph" pp. 553–555 (1979, issued by CORONA PUBLISHING CO., LTD.), "Search disclosure" (June, 1978, pp. 9–15, RD-17029)).

(3) Photosensitive, heat sensitive recording material (recording material utilizing photothermography disclosed in Japanese Patent Laid-open Publication No. 3-72358).

(4) Diazonium (4-morpholino benzene diazonium micro film, micro film, copying film, printing plate, etc.)

(5) Azido, diazido photosensitive material (photosensitive material including paraazido benzoate, 4,4' diazido stilbene and so on, for example, copying film and printing plate).

(6) Quinone diazido photosensitive material (ortho-quinone diazido, ortho-naphtho quinone azido compound, photosensitive material including benzoquinone (1,2)-diazido-(2)-4-sulfonic acid phenyl ether, for example, printing plate, copying film, contact film).

(7) Photo polymer (photosensitive material including vinyl monomer and so on, for example, printing plate, contact film).

(8) Polyvinyl cinnamate photosensitive material (for example, printing film, IC register).

In the injection molded article according to the present embodiment, the thermoplastic resin polymerized with the single-sight catalyst is used so that it is superior in physical strength and blocking proofness. By containing the lubricant and the antioxidant, lubricity and anti-oxidant property are improved. As the thermoplastic resin is the polyolefin resin, the compatibility is superior, moreover, the injection moldability and the lubricant adding effect are improved. Further, crystal is grown by the nucleating agent to improve the transparency, the impact resistance, the rigidity, the hardness and the dimensional stability. The light shielding property is improved by containing the light shielding material in the other light shielding material. When at least two kinds of the light shielding material having different Mohs hardness, for example, the light shielding material having greater Mohs hardness rather than the carbon black, are used together, the dispersion property of the carbon black is further improved and the light shielding ability may be improved more than 20% (similar light shielding property is obtained if the content of the carbon black is reduced by about 20%). Static trouble is reduced by containing the conductive material. When the syndiotactic polystyrene resin is used, high crystalline and high polymerizability are obtained, the heat resistance is improved and the polymerization is performed at low cost.

Referring to the accompanying drawings, typical injection molded articles according to the present embodiment are described. However, these are not exclusive.

Figure 2:
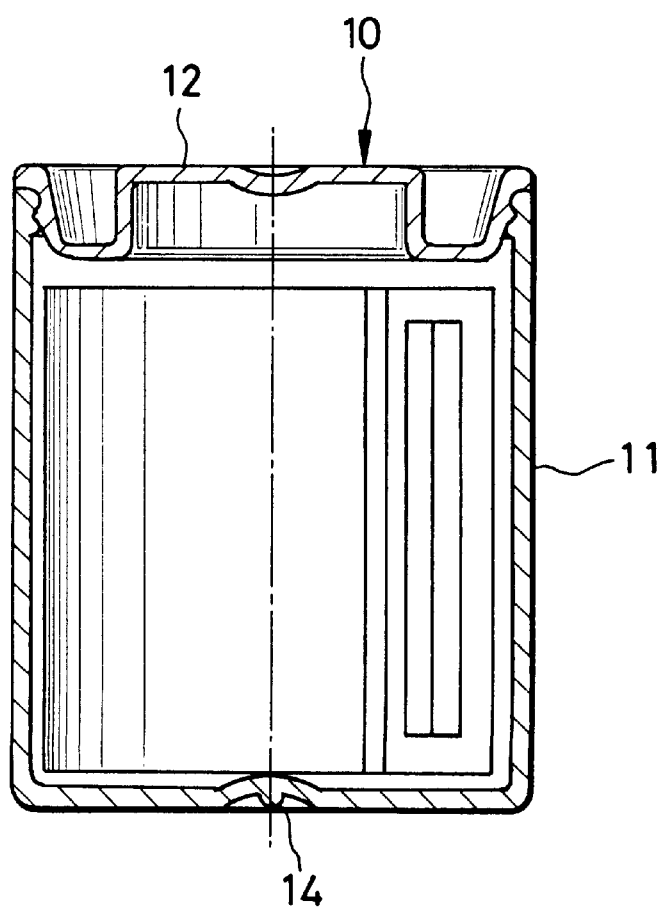
FIG. 2 is a longitudinal sectional view of the film cassette container.

FIG. 1 is a plan view of a lid which constitutes a part of a film cassette container as the injection molded article according to the present invention. FIG. 2 is a longitudinal sectional view of the whole of the film cassette container. The film cassette container 10 comprises a container body 11 and the lid 12 fitted to an upper portion thereof. The container 10 protects a photo film cartridge made of resin, a conventional 135-type photographic film cassette and so forth from dust, moisture and various gases (sulfur dioxide, formalin gas, acetaldehyde gas, sulfur gas, oxygen, cyanogen gas, chlorine gas and so forth) affecting the photographic property. The photo film cartridge is used for Advanced Photo System (hereinafter, APS) and is described later. Incidentally, reference numeral 14 in FIGS. 1 and 2 denotes a gate (resin inlet).

Makeup and characteristics of the thermoplastic resin composition (Example 1a to 6a, Comparative 1a to 6a) used for the lid 12 illustrated in FIG. 1 are shown in Tables 5 and 6.

Ethylene-based resins (LD1, LD2, L-L1, L-L2, M1, M2, M3) shown in Tables 5 and 6 are as follows:

LD1, LD2; Branch-state low-density homopolyethylene resin (produced by a conventional high-pressure radical polymerizing method, hereinafter LDPE resin)

L-L1, L-L2; Ethylene-butene-1 copolymer resin (produced by a polymerizing method using the conventional multi-sight catalyst)

M1, M2; Ethylene-butene-1 copolymer resin (produced by a polymerizing method using the single-sight catalyst according to the present embodiment)

M3; Low-density polyethylene resin (produced by the polymerizing method using the single-sight catalyst)

Incidentally, unit in Tables 5 and 6 is part by weight relative to total resin of 100 parts by weight. With respect to each ethylene-based resin, the melt flow rate (MFR) measured by ASTM D 1238 E condition and the molecular-weight distribution ($Mw_{(AV)}/Mn_{(AV)}$) measured by GPC method are shown in Table 7.

TABLE 5

| | | Example | | | | | |
|---|---|---|---|---|---|---|---|
| | | 1a | 2a | 3a | 4a | 5a | 6a |
| I | | | | | | | |
| | LD1 | 10 | — | — | — | — | — |
| | LD2 | — | — | — | — | — | 20 |
| | L-L1 | — | — | — | — | — | — |
| | L-L2 | — | — | — | 10 | — | 20 |
| | M1 | 90 | — | — | — | — | — |
| | M2 | — | 100 | 100 | 90 | — | — |
| | M3 | — | — | — | — | 100 | 60 |
| II | | | | | | | |
| | Lubricant (erucic amide) | 0.05 | 0.05 | 0.05 | 0.05 | 0.05 | 0.05 |
| | Lubricant (zinc stearate) | 0.10 | 0.10 | 0.10 | 0.10 | 0.10 | 0.10 |
| | Hydrotalcite compound | 0.10 | 0.10 | — | 0.10 | 0.10 | 0.10 |
| | Hindered phenol antioxidant (Ireganox 1010) | 0.05 | 0.05 | 0.05 | 0.05 | 0.05 | 0.05 |
| | Phosphorus antioxidant (triphenylphosphate) | 0.05 | 0.05 | 0.05 | 0.05 | 0.05 | 0.05 |
| | Nonionics (polyoxyethylene-tridecyl) | 0.10 | 0.10 | 0.10 | — | 0.10 | 0.10 |
| | Organic nucleating agent (GELALL MD) | 0.10 | 0.10 | — | 0.10 | 0.10 | 0.10 |
| III | | | | | | | |
| A | Injection moldability | ◎ | ◎ | ○ | ◎ | ◎ | ◎ |
| B | Transparency | ◎ | ◎ | ○ | ◎ | ◎ | ○ |
| C | Dimensional stability | ◎ | ◎ | ○ | ◎ | ◎ | ◎ |
| D | Molding trouble proofness | ◎ | ◎ | ○ | ◎ | ◎ | ◎ |
| E | Moisture resistance | ◎ | ◎ | ○ | ◎ | ◎ | ◎ |
| F | Other superior characteristics | ◎ | ◎ | ◎ | — | ◎ | ◎ |
| G | Photographic property | ◎ | ◎ | ○ | ◎ | ◎ | ○ |

I; Kind of resin, II; Kind of additive III; Characteristics of resin

TABLE 6

| | | Comparative | | | | | |
|---|---|---|---|---|---|---|---|
| | | 1a | 2a | 3a | 4a | 5a | 6a |
| I | LD1 | 100 | — | — | — | — | — |
| | LD2 | — | 100 | — | — | — | — |
| | L-L1 | — | — | 100 | — | — | — |
| | L-L2 | — | — | — | 100 | — | — |
| | M1 | | | | | | |
| | M2 | — | — | — | — | 100 | — |
| | M3 | — | — | — | — | — | 100 |
| II | Lubricant (erucic amide) | 0.05 | — | — | — | — | — |
| | Lubricant (zinc stearate) | 0.10 | 0.10 | 0.10 | 0.10 | — | — |
| | Hydrotalcite compound | 0.10 | — | — | — | — | — |
| | Hindered phenol antioxidant (Ireganox 1010) | 0.05 | 0.05 | 0.05 | 0.05 | — | — |
| | Phosphorus antioxidant (triphenylphosphate) | 0.05 | — | — | — | — | — |
| | Nonionics (polyoxyethylenetri | 0.10 | — | — | 0.10 | 0.10 | 0.10 |

TABLE 6-continued

|  |  |  | Comparative | | | | | |
|---|---|---|---|---|---|---|---|---|
| | | | 1a | 2a | 3a | 4a | 5a | 6a |
| | | decyl) | | | | | | |
| | | Organic nucleating agent (GELALL MD) | 0.10 | — | — | 0.10 | 0.10 | 0.10 |
| III | A | Injection moldability | ● | X | X | X | X | X |
| | B | Transparency | ▲ | ▲ | ▲ | ○ | ◉ | ◉ |
| | C | Dimensional stability | ▲ | ▲ | ▲ | ● | ▲ | ▲ |
| | D | Molding trouble proofness | ● | X | X | X | X | X |
| | E | Moisture resistance | ▲ | ▲ | ▲ | ● | ▲ | ▲ |
| | F | Other superior characteristics | ◉ | — | — | — | — | — |
| | G | Photographic property | ▲ | ▲ | ▲ | ▲ | ● | ● |

I; Kind of resin, II; Kind of additive
III; Characteristics of resin

TABLE 7

| | LD1 | LD2 | L-L1 | L-L2 | M1 | M2 | M3 |
|---|---|---|---|---|---|---|---|
| MFR(g/10 min) | 15 | 20 | 12 | 20 | 20 | 25 | 30 |
| Mw(AV)/Mn(AV) | 8.7 | 5.0 | 4.4 | 3.5 | 3.0 | 2.5 | 2.0 |

Test evaluation of the characteristics of the injection molded article is as follows:

◉; very excellence, ○; excellence, ●; limit of practical use, ▲; necessity of improvement, x; impossibility of practical use.

Test method of the characteristics of the injection molded article is as follows:

(A) The injection moldability is judged on the basis of total suitability, for example, molding cycle, motor loading of the injection molding machine, blocking proofness of the resin pellet and the injection molded article, and carrier ability of the molded article.

(B) The transparency applies to ASTM D 1003.

(C) The dimensional stability is judged on the basis of the difference from the dimension of metal (difference due to molding shrinkage and distortion).

(D) The molding trouble proofness is judged on the basis of occurrence of injection molding trouble, for example, resin discoloration, short shot and burr.

(E) The moisture resistance is judged on the basis of weight increase due to moisture absorbing when the container body 11 shown in FIG. 2 is left for one month in a isothermal constant-humidity chamber of 50° C. and 90% RH after moisture absorbing agent (silica gel) of 5 g is inserted in the container body 11 and the container body 11 is sealed with the lid 12 relative to each test.

(F) The other superior characteristics are judged on the basis of a state when the injection molding has performed or a state of normal temperature (20° C., 60% RH) after keeping for long time (six months) in a low temperature warehouse (10° C.).

(G) The photographic property is judged on the basis of influence for the photographic property (fog, change of the sensitivity, the gradation and the color) with regard to the Fuji color negative film of ISO sensitivity 400.

By the way, upon comparing the Examples (1a–6a) and Comparatives (1a–6a), Examples (1a–6a) are superior because the resin according to the present embodiment and various additives are effectively compounded. It is possible to put each of them in practical use. Examples 1a–6a except 4a and Comparative 1a are superior in the moisture resistance and the antistatic properties. However, Comparatives (1a–6a) have many problems when it is put in practical use. For example, Comparatives 2a, 3a, 5a and 6a have low dimensional stability as the distortion occur. Moreover, Comparative 2a–6a have low molding trouble proofness as the resin discoloration occur. Accordingly, it is impossible to put them in practical use. Further, with respect to Comparatives 2a, 3a, 5a and 6a, the distortion occurs during test of the moisture resistance so that it is necessary to improve them.

Figure 3A:
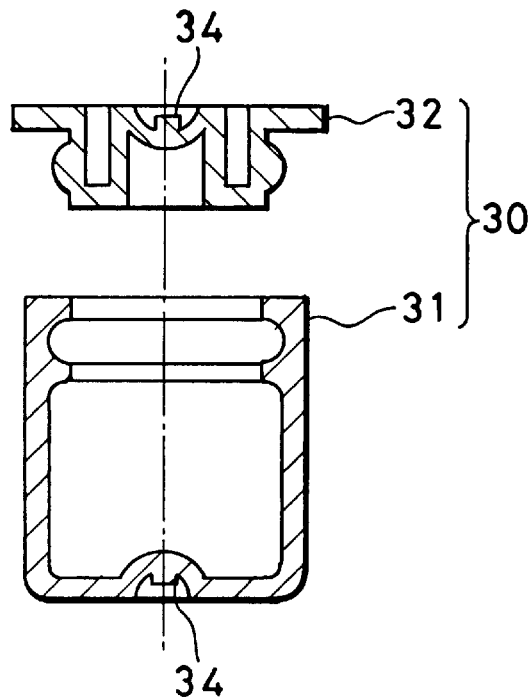
FIGS. 3A and 3B are longitudinal sectional views respectively showing another embodiment of the photographic film container.
Figure 3B:
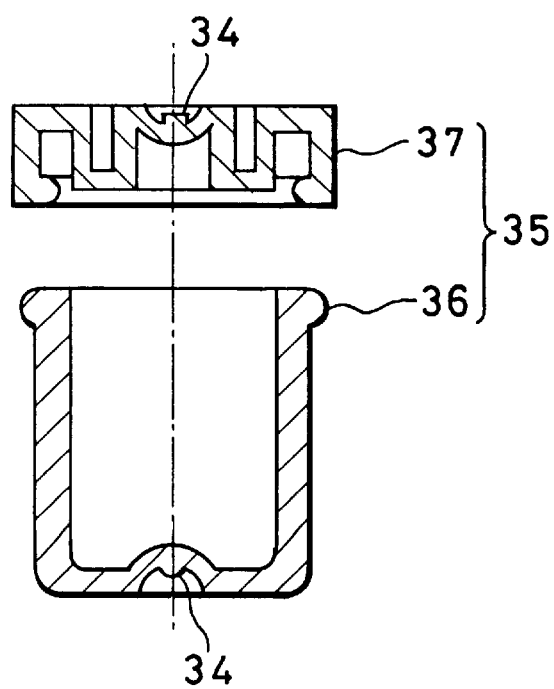

FIGS. 3A and 3B show another structure of the film cassette container. The film cassette container 30 comprises a container body 31 and a lid 32 fitted to an upper portion thereof. The film cassette container 35 comprises a container body 36 and a lid 37 fitted to an upper portion thereof. Incidentally, reference numeral 34 in FIGS. 3A and 3B denotes a gate (resin inlet).

Makeup and characteristics of thermoplastic resin composition (Example 1b to 8b, Comparative 1b to 8b) used for the container body 31 illustrated in FIG. 3A are shown in Tables 8 and 9.

Ethylene-based resins (LD3, L-L3, M4 and M5) and propylene-based resin (M6, M7 and P1) shown in Tables 8 and 9 are as follows:

LD3; High-density homopolyethylene resin (the density of which is 0.951 g/cm$^3$ and 0.958 g/cm$^3$, and produced by a polymerizing method using the conventional multi-sight catalyst, hereinafter HDPE resin)

L-L3; Ethylene-butene-1 copolymer resin (produced by a polymerizing method using a conventional multi-sight catalyst, hereinafter L-LDPE)

M4; Ethylene-butene-1 copolymer resin (produced by a polymerizing method using the single-sight catalyst according to the present embodiment, hereinafter L-LDPE)

M5; High-density homopolyethylene resin (produced by the polymerizing method using the single-sight catalyst, hereinafter HDPE)

M6; Propylene.ethylene random copolymer resin (produced by the polymerizing method using the single-sight catalyst)

M7; Homopolypropylene resin (produced by the polymerizing method using the single-sight catalyst)

P1; Propylene.ethylene random copolymer resin (produced by the polymerizing method using the conventional multi-sight catalyst)

Incidentally, unit in Tables 8 and 9 is part by weight relative to total resin of 100 parts by weight. With respect to each ethylene-based resin, the melt flow rate (MFR) measured by ASTM D 1238 E condition (only P1 is measured by L condition) and the molecular-weight distribution (MW$_{(AV)}$/Mn$_{(AV)}$) measured by GPC method are shown in Table 10.

TABLE 8

| | | Example | | | | | | | |
|---|---|---|---|---|---|---|---|---|---|
| | | 1b | 2b | 3b | 4b | 5b | 6b | 7b | 8b |
| I | LD3 | — | — | — | — | — | — | — | — |
| | L-L3 | — | — | — | — | — | — | — | — |
| | M4 | 60 | 40 | — | — | — | — | — | — |
| | M5 | — | 60 | — | — | — | — | — | — |
| | M6 | 40 | — | 100 | 100 | 100 | 100 | 70 | — |
| | M7 | — | — | — | — | — | — | 30 | 100 |
| | P1 | — | — | — | — | — | — | — | — |
| II | Lubricant (oleic amide) | 0.05 | 0.05 | 0.05 | 0.05 | 0.05 | 0.05 | 0.05 | 0.05 |
| | Lubricant (zinc stearate) | 0.05 | 0.05 | 0.05 | 0.10 | — | 0.05 | 0.05 | 0.05 |
| | Lubricant (calcium stearate) | 0.05 | 0.05 | 0.05 | — | 0.10 | 0.05 | 0.05 | 0.05 |
| | Hydrotalcite compound) | 0.1 | 0.1 | 0.1 | 0.1 | 0.1 | — | 0.1 | 0.1 |
| | Hindered phenol antioxidant (Ireganox 1010) | 0.05 | 0.05 | 0.05 | 0.05 | 0.05 | 0.05 | 0.05 | 0.05 |
| | Phosphorus antioxidant (triphenylphosphate) | 0.05 | 0.05 | 0.05 | 0.05 | 0.05 | 0.05 | 0.05 | 0.05 |
| | Nonionics (fatty monoglyceride) | 0.1 | 0.1 | 0.1 | 0.1 | 0.1 | 0.1 | 0.1 | 0.1 |
| | Organic nucleating agent (GELALL MD) | 0.1 | 0.1 | 0.1 | 0.1 | 0.1 | 0.1 | 0.1 | 0.1 |
| III | H Photographic property | ○ | ○ | ⊚ | ⊚ | ○ | ○ | ⊚ | ⊚ |
| | I Transparency | ⊚ | ○ | ⊚ | ⊚ | ⊚ | ⊚ | ⊚ | ○ |
| | J Molding trouble proofness | ⊚ | ○ | ⊚ | ⊚ | ○ | ○ | ⊚ | ⊚ |
| | K Appearance | ⊚ | ○ | ⊚ | ⊚ | ⊚ | ○ | ⊚ | ⊚ |
| | L Injection moldability | ⊚ | ⊚ | ⊚ | ⊚ | ⊚ | ⊚ | ⊚ | ⊚ |
| | M Moisture resistance | ⊚ | ⊚ | ⊚ | ⊚ | ⊚ | ⊚ | ⊚ | ⊚ |

I; Kind of resin, II; Kind of additive
III; Characteristics of resin

TABLE 9

| | | Comparative | | | |
|---|---|---|---|---|---|
| | | 3a | 4a | 5a | 6a |
| I | LD3 | — | — | — | — |
| | L-L3 | 100 | 100 | — | — |
| | M4 | — | — | 100 | — |
| | M5 | — | — | — | — |
| | M6 | — | — | — | — |
| | M7 | — | — | — | — |
| | P1 | — | — | — | 100 |
| II | Lubricant (oleic amide) | — | 0.05 | — | — |
| | Lubricant (zinc stearate) | — | 0.05 | — | — |
| | Lubricant (calcium stearate) | 0.15 | 0.05 | 0.15 | 0.15 |
| | Hydrotalcite compound | — | — | — | — |
| | Hindered phenol antioxidant (Ireganox 1010) | 0.1 | 0.05 | 0.1 | 0.1 |
| | Phosphorus antioxidant (triphenylphosphate) | — | 0.05 | — | — |
| | Nonionics (fatty monoglyceride) | — | 0.1 | — | — |
| | Organic nucleating agent (GELALL MD) | — | 0.1 | — | — |
| III | H Photographic property | ● | ○ | ● | ● |
| | I Transparency | X | ▲ | X | ● |
| | J Molding trouble proofness | X | X | X | ▲ |
| | K Appearance | X | ▲ | X | ▲ |
| | L Injection moldability | X | ○ | X | X |
| | M Moisture resistance | ▲ | ○ | ▲ | ▲ |

I; Kind of resin, II; Kind of additive
III; Characteristics of resin

TABLE 10

| | LD3 | L-L3 | M4 | M5 | M6 | M7 | P1 |
|---|---|---|---|---|---|---|---|
| MFR(g/10 min) | 28 | 20 | 16 | 25 | 30 | 25 | 25 |
| Mw(AV)/Mn(AV) | 6.2 | 4.7 | 2.8 | 3.8 | 2.2 | 2.5 | 5.8 |

Test evaluation of the characteristics of the injection molded article is as follows:

⊚; very excellence, ○; excellence, ●; limit of practical use, ▲; necessity of improvement, ×; impossibility of practical use.

Test method of the characteristics is as follows:

(H) The photographic property is judged on the basis of influence for the photographic property (fog, change of the sensitivity, the gradation and the color) with regard to the Fuji color negative film of ISO sensitivity 400.

(I) The transparency is judged on the basis of a distance which is impossible to distinguish parallel lines, width of which is 0.5 mm, illustrated on a white paper at an interval of 2 mm when the container body 31 is separated from the parallel line. The transparency is greater as the distance is longer.

(J) The molding trouble proofness is judged on the basis of occurrence of injection molding trouble, for example, resin discoloration, short shot and burr.

(K) The appearance is judged on the basis of coloring trouble, gloss and occurrence of flaw observed by watching the container body 31.

(L) The injection moldability is judged on the basis of total suitability, for example, molding cycle, motor loading of the injection molding machine, blocking proofness of the resin pellet and the injection molded article, and carrier ability of the molded article.

(M) The moisture resistance is judged on the basis of weight increase due to moisture absorbing when the container body 11 shown in FIG. 2 is left for one day in a isothermal constant-humidity chamber of 50° C. and 90% RH after moisture absorbing agent (silica gel) of 5 g is inserted in the container body 11 and the container body 11 is sealed with the lid 12 relative to each test.

Upon comparing the Examples (1b–8b) and Comparatives (1b–8b), Examples (1b–8b) are superior for all tests of (H) to (M) so that it is possible to put them in practical use. Comparatives (1b–4b) have many problems when they are put in practical use. For example, with respect to Comparative 1b, the distortion occurs during test so that the moisture resistance becomes bad.

Figure 12:
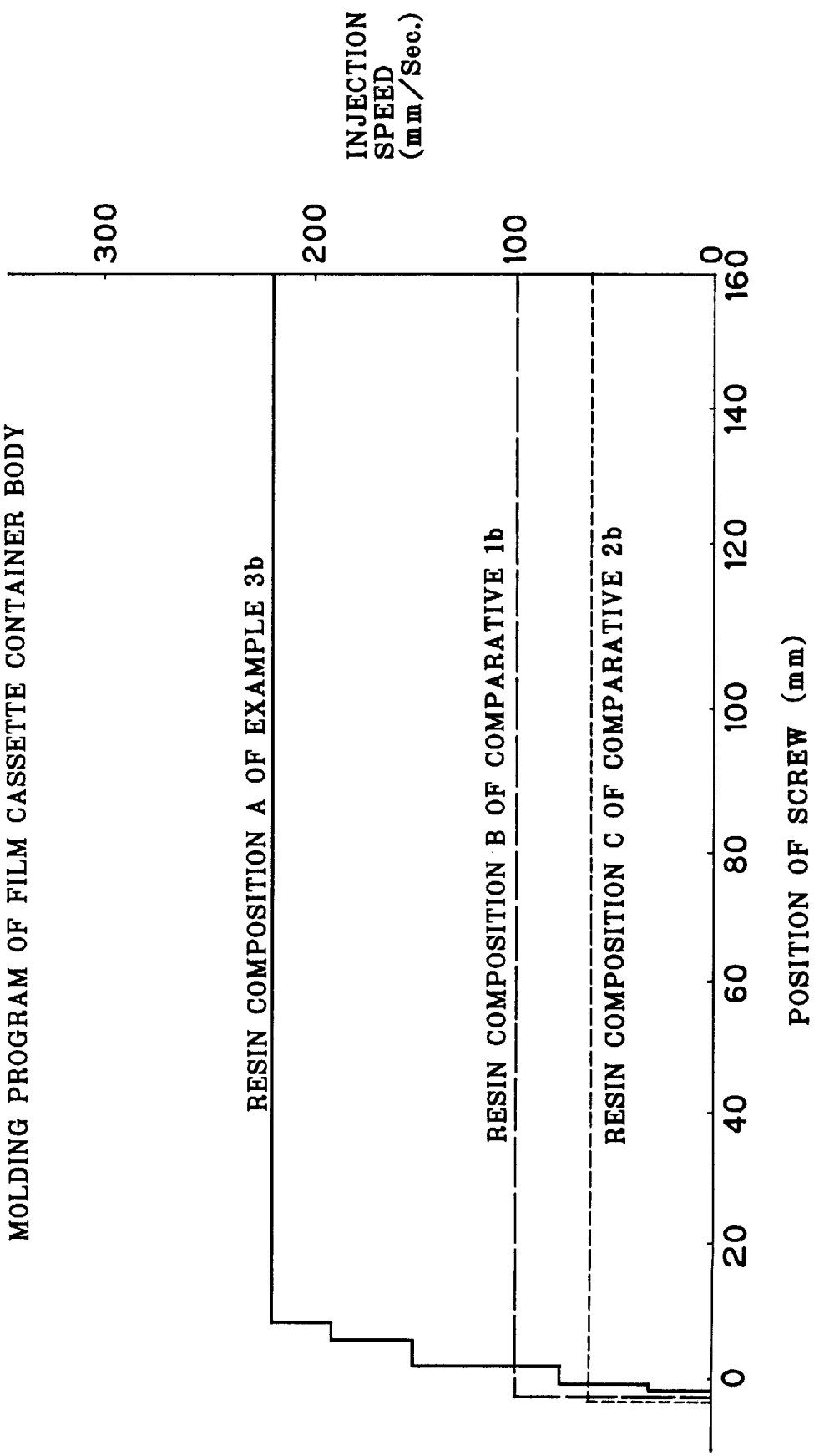
FIG. 12 is an explanatory illustration showing molding program of a container body of the film cassette container.

The injection molding of the container body was performed, using the resin composition A of Example 3b and the resin composition B and C of Comparatives 1b and 2b. Further, the injection molding was performed in accordance with a molding program shown in FIG. 12 and by using a molding machine NESTAR (trade name, manufactured by Sumitomo Juki, clamping pressure is 150 ton). Wall temperature of die was 260° C. After melted resin was injected in the die cavity and pressed for 0.6 sec at a pressure of 40 Kg/cm², the injection molded article is cooled and taken out. Its consequence was observed by a metal microscope.

The melted resin is loaded in the cavity from the gate (resin inlet) provided around a center of the bottom of the container body. The loading is carried out by multi-speed control (loading speed to the cavity (injection speed) is high at first and the resin is inserted at minimum injection speed in the end). By the multi-speed control, the molding troubles (short shot, weld line and burr) are prevented and successive injection molding may be capable. The injection speed and the injection time of the resin compositions A–C are set forth below.

|  | (Injection speed) | (Injection time) |
| --- | --- | --- |
| The resin composition A | about 220 mm/sec | about 0.5 sec |
| The resin composition B | about 100 mm/sec | about 1.6 sec |
| The resin composition C | about 60 mm/sec | about 2.6 sec |

By the way, upon observing the inner wall of the container body after injection molding, it was good quality relative to the resin composition A of Example 3b. In contrast, as to the resin compositions B and C of Comparatives 1b and 2b, many weld lines and flow marks occurred.

Figure 4:
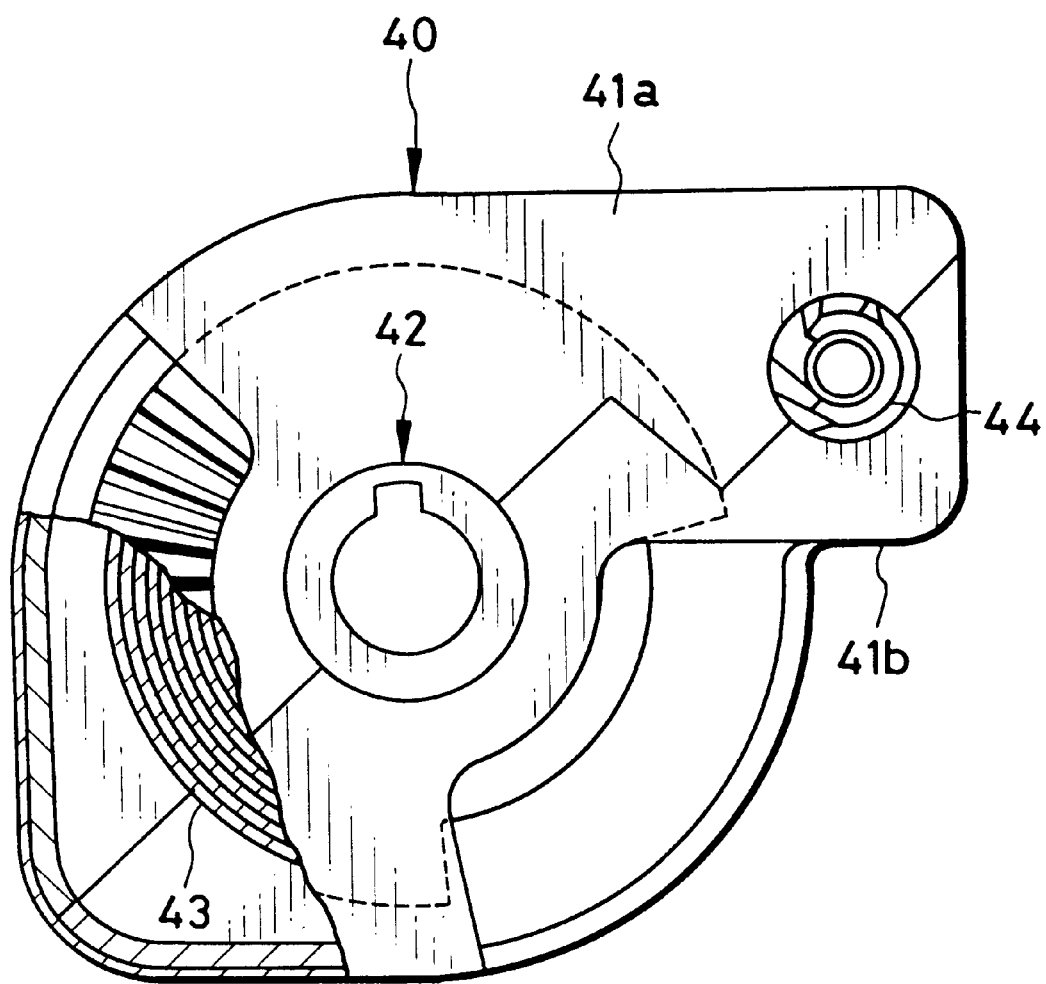
FIG. 4 is a schematic illustration of a photo film cartridge (APS) as the injection molded article according to the present invention.
Figure 5:
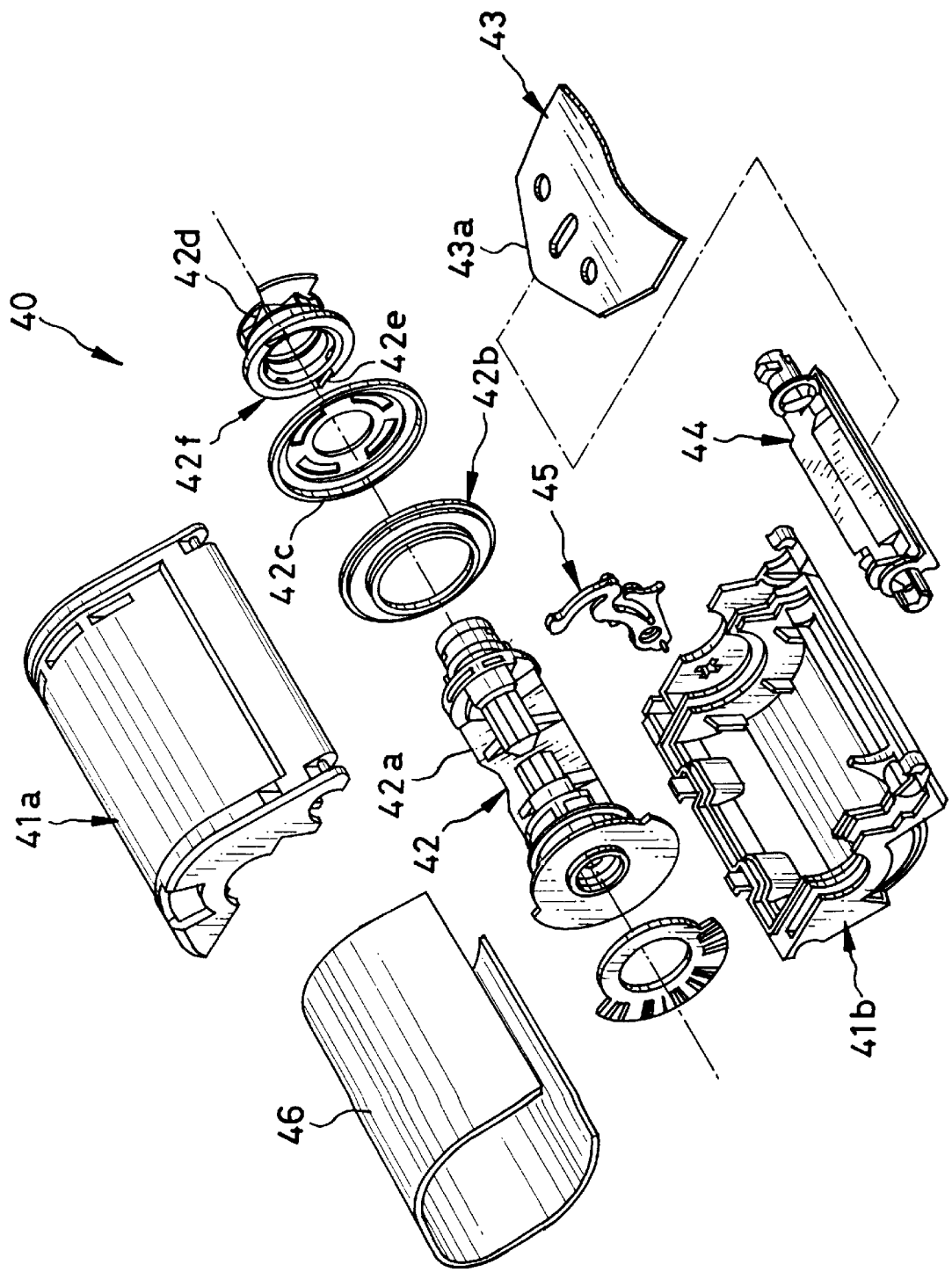
FIG. 5 is an exploded perspective view of the photo film cartridge (APS)

FIG. 4 is a schematic illustration of a photo film cartridge made of resin for APS and FIG. 5 is an exploded perspective view thereof. The photo film cartridge contains a photographic film up to a leading edge thereof. Its greatest feature is that the advancement of the photographic film is capable by rotating a spool.

The photographic film cassette 40 comprises an upper case 41a, a lower case 41b, a spool 42 and a photographic film 43. The upper case 41a and the lower case 41b constitute a cartridge body and the spool 42 is rotatably attached therein. An end edge 43a of the photographic film 43 engages the spool 42 and the photographic film 43 is wound around the spool 42. Each of parts except the photographic film 43 is the injection molded article according to the present embodiment. A pair of discs 42b and 42c are fixed to a spool shaft 42a of the spool 42. Outer peripheries of the discs 42b and 42c are bended in opposing direction each other. The bended portions hold a most outer peripheral surface of the film 43 to prevent winding slack of the film 43. Further, a holding ring 42f which is integrally formed with a retaining tooth 42d and a retaining claw 42e is fixed to the spool shaft 42a. The retaining tooth 42b is for stopping the rotation of the spool shaft 42a. The retaining claw 42e rotates the disc 42c in same direction with the spool 42 only when the spool 42 rotates in film advancing direction (clockwise direction in FIG. 4).

A light shielding lid 44 and a lock lever 45 are attached to the lower case 41b. The light shielding lid 44 positions in a film passage formed at a joint of the upper case 41a and the lower case 41b when they are combined. The light shielding lid 44 is rotatable between a light shielding position wherein the film passage is light-tightly closed and an open position wherein the film passage is opened. The lock lever 45 inhibits the rotation of the spool shaft 42a by engaging with the retaining tooth 42d when the light shielding lid 44 is set at the light shielding position. The lock lever 45 permits the rotation of the spool shaft 42a by releasing the engagement with the retaining tooth 42d when the light shielding lid 44 rotates to the open position. Reference numeral 46 denotes a label seal which is adhered to the upper case 41a and the lower case 41b after they were combined.

The thermoplastic resin composition (Examples 1C–5C and Comparatives 1C and 2C) used for the photo film cartridge illustrated in FIGS. 4 and 5 are shown in Table 11.

The styrene-based resins (PS1, PS2, M6 and M9) described in Table 11 are as follows:

PS1; Homopolystyrene resin (produced by the conventional radical polymerizing method, hereinafter GPPS)

PS2; Styrene butadiene copolymer resin (produced by the conventional radical polymerizing method, hereinafter HIPS)

M8; Homopolystyrene resin (produced by the polymerizing method using the single-sight catalyst according to the present embodiment)

M9; Styrene.butadiene copolymer resin (produce by the polymerizing method using the single-sight catalyst)

Incidentally, unit of Table 11 is part by weight relative to the total resin of 100 parts by weight.

TABLE 11

| | | Example | | | | | Comparative | |
|---|---|---|---|---|---|---|---|---|
| | | 1c | 2c | 3c | 4c | 5c | 1c | 2c |
| I | PS1 | — | — | — | — | — | — | 100 |
| | PS2 | — | — | — | — | — | 100 | — |
| | M8 | 100 | — | — | — | 70 | — | — |
| | M9 | — | 100 | 100 | 100 | 30 | — | — |
| II | Carbon black | 0.4 | 0.5 | 0.5 | 0.4 | 0.4 | 0.5 | 0.5 |
| | Titanium oxide | 0.1 | — | — | 0.1 | 0.1 | — | — |
| | Zinc stearate | 0.1 | 0.1 | 0.1 | 0.1 | 0.1 | — | 0.1 |
| | Silicone lubricant | 1 | 1 | 1 | 1 | 1 | — | 1 |
| | Nonionic antistatic agent | 0.2 | 0.2 | 0.2 | 0.2 | 0.2 | — | — |
| | Hindered phenol antioxidant | 0.05 | 0.05 | 0.05 | 0.05 | 0.05 | — | 0.05 |
| | Polyethylene wax | 0.1 | 0.1 | 0.1 | 0.1 | 0.1 | — | 0.1 |
| | Styrene ethylene butadiene block copolymer resin | 0 | 10 | — | — | — | — | — |
| III | MFR (ASTM D 1238, G condition) (g/10 min) | 6.3 | 6.3 | 7.8 | 7.8 | 6.6 | 6.3 | 5.3 |
| | Bending elastic modulus (ASTM D 790) (100 kg/cm$^2$) | 265 | 265 | 248 | 248 | 258 | 265 | 243 |
| | Izod impact strength with notch (ASTM D 256) (kg · cm/cm) | 9.6 | 9.6 | 8.2 | 8.2 | 8.9 | 9.6 | 5.6 |
| | Molecular-weight distribution (GPC method) | 2.2 | 2.2 | 2.8 | 2.8 | 2.5 / 2.8 | 2.2 | 3.8 |
| N | Photographic property | ⊚ | ⊚ | ⊚ | ⊚ | ⊚ | ○ | ● |
| O | Injection Moldability | ⊚ | ⊚ | ⊚ | ⊚ | ⊚ | ▲ | ▲ |
| P | Heat resistance | ⊚ | ⊚ | ⊚ | ⊚ | ⊚ | ⊚ | ▲ |
| Q | Dispersion property of carbon black | ⊚ | ⊚ | ○ | ⊚ | ⊚ | ▲ | ● |
| R | Appearance | ⊚ | ⊚ | ○ | ⊚ | ⊚ | ● | ○ |
| S | Resistance to chemicals | ⊚ | ⊚ | ⊚ | ⊚ | ⊚ | ⊚ | × |
| T | Light shielding ability | ⊚ | ⊚ | ○ | ⊚ | ⊚ | ▲ | ○ |
| U | Dust anti-adhesion property | ○ | ○ | ○ | ○ | ○ | × | ▲ |
| V | Recycling suitability | ○ | ⊚ | ○ | ○ | ○ | ○ | ▲ |

I; Kind of resin, II; Kind of additive,
III; Characteristics of resin

With respect to the molecular-weight distribution of Example 5c, a value in case of including M8 is shown at upper row and a value in case of including M9 is shown at lower row.

Test evaluation of the characteristics of the injection molded article is as follows:

⊚; very excellence, ○; excellence, ●; limit of practical use, ▲; necessity of improvement, ×; impossibility of practical use.

Test method of the characteristics of the injection molded article shown in Table 11 is as follows:

(N) The photographic property is judged on the basis of influence for the photographic property (fog, change of the sensitivity, the gradation and the color) with regard to the Fuji color negative film of ISO sensitivity 400.

(O) The injection moldability is judged on the basis of total suitability, for example, molding cycle, motor loading of the injection molding machine, blocking proofness of the resin pellet and the injection molded article, and carrier ability of the molded article.

(P) The heat resistance is judged on the basis of temperature at which the distortion starts.

(Q) The dispersion property of the carbon black is judged by observing a thin-wall leaf cut by microtome with the electron microscope.

(R) The appearance is judged on the basis of gloss, unevenness of gloss, flaw, silver streak, weldline, flow mark which are observed by watching the photo film cartridge.

(S) The resistance to chemicals is judged by observing a state of surface after dipping in toluene, xylene, benzene, gasoline and acetone at 23° C. for seven days.

(T) The light shielding ability is judged on the basis of the photographic fog of the color negative film having ISO sensitivity 400 after it was developed. The color negative film is developed after it was illuminated by light of 80,000 Lux in a state that the film is overlapped with a sheet rolled in 50 μm.

(U) The dust anti-adhesion property is judged on the basis of amount of cigarette ash adhered to the photo film cartridge when it is located apart from the cigarette ash by 5 cm after rubbing five times with a Teflon (trade name) cloth. The amount of the cigarette ash is observed by watching.

(V) The recycling suitability is judged on the basis of deterioration of the physical properties and the appearance when it is recycled five times.

Figure 6:
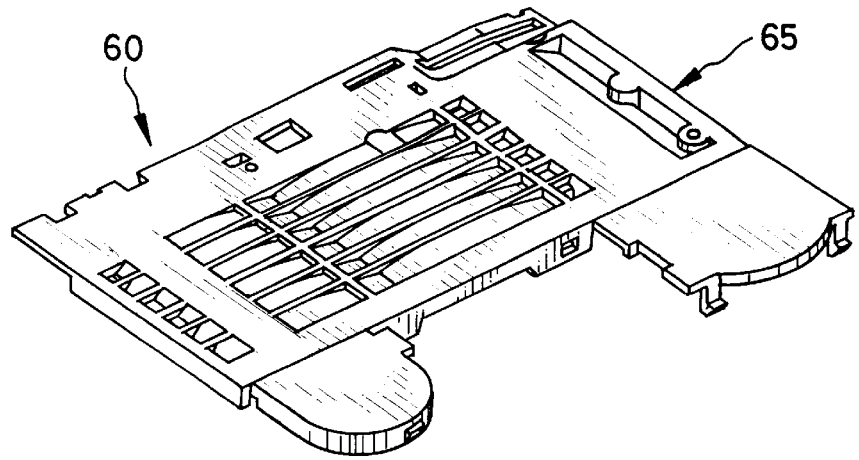
FIG. 6 is an exploded perspective view of a lens-fitted film unit as the injection molded article according to the present invention.

FIG. 6 shows an exploded perspective view of a lens-fitted film unit as the injection molded article according to the present invention. The lens-fitted film unit is sold in a state that the photographic film is loaded beforehand. Good recycling and reuse properties besides superior heat resistance and impact resistance are obtained by using the resin composition according to the present embodiment for almost all parts of the lens-fitted film unit.

In the lens-fitted film unit 60, a front cover 62 is attached so as to cover a front face of a main body 61 including a simple photographing mechanism, a film winding stop mechanism and so forth. A cartridge 50 and a roll-like photographic film 63 drawn out therefrom are respectively contained in a cartridge chamber 61a and a film roll chamber 61b which are formed in the main body 61. A rear cover 65 is attached to a rear side of the main body 61 to close the cartridge chamber 61a and the film roll chamber 61b light-tightly. In the present embodiment, the photo film cartridge 50 (APS) made of resin is contained. However, well-known conventional 135-type photographic film cassette may be used. Further, a winding shaft may be provided in the film roll chamber 61b.

The styrene-based resin (PS2, M9) shown in Table 11 and constituting the thermoplastic resin composition (Example 4C and Comparative 2C) used for the lens-fitted film unit shown in FIG. 6 is same with the styrene-based resin used in the embodiment of the photographic film cassette.

Figure 7:
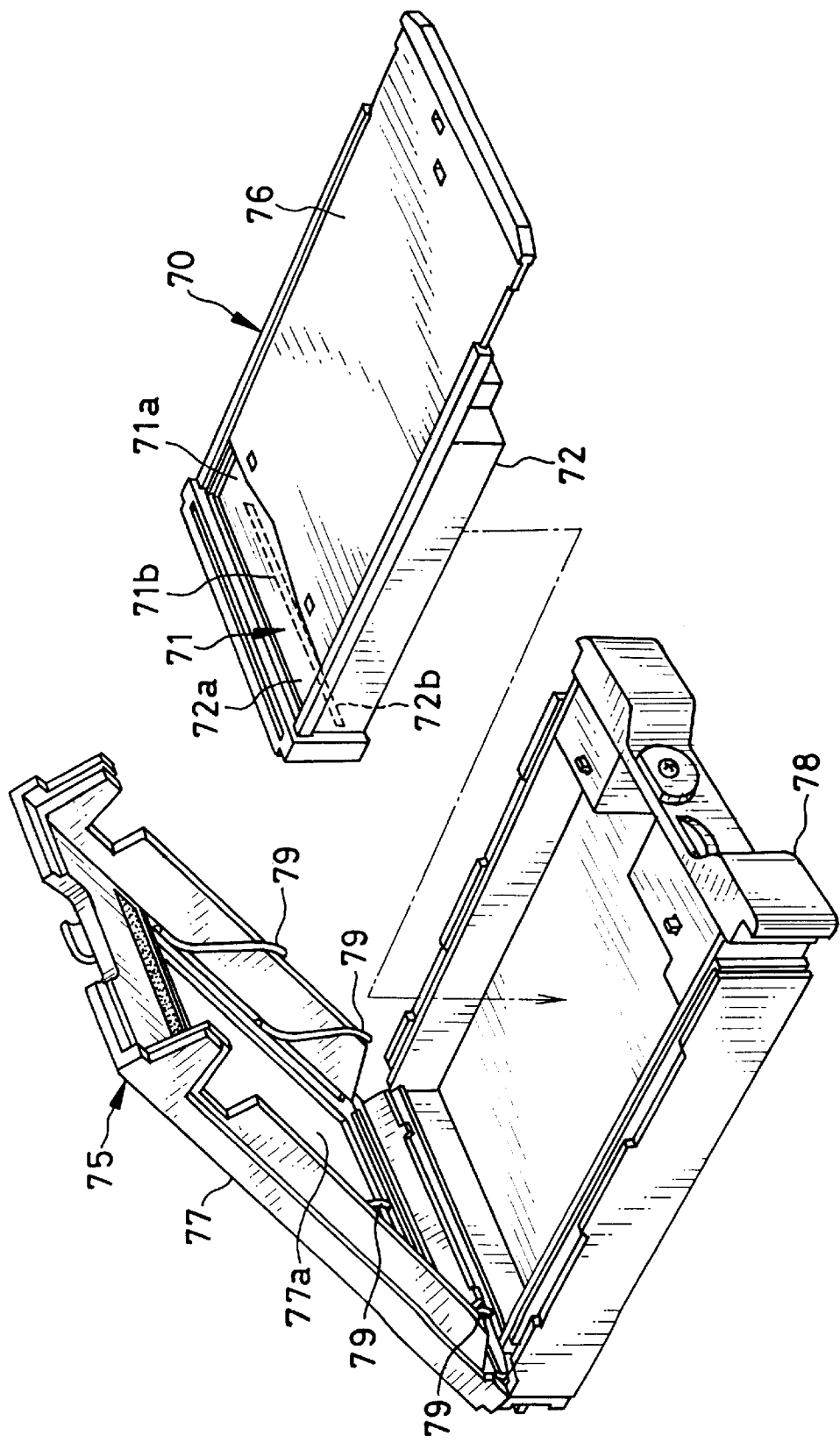
FIG. 7 is a perspective view of a film pack and a pack holder as the injection molded article according to the present invention.

Hereinafter, another examples of the injection molded article according to the present embodiment are described. FIG. 7 is a perspective view of a film pack containing a plurality of sheet-like photographic films and a pack holder used for the film pack. The film pack 70 contains a plurality of sheet film units 71 wherein a sheet film 71b is contained in a sheath 71a. The sheet film units are stacked in a pack body 72 made of resin. The film pack 70 is loaded in a pack holder 75 attached to a camera. The pack body 72 is provided with an opening 72a to perform exposure for top of stacked sheet film and a pull lid 76 for closing the opening 72a. Further, The pack body 72 is provided with a spring member (not shown) for pressing the sheet film unit 71 from the back side thereof toward the opening 72a.

Upon loading the film pack 70 into the pack holder 75 and closing a holder cover 77 of the pack holder 75, the opening 72a of the pack body 72 emerges from an exposure aperture 77a formed in the holder cover 77. When the pull lid 76 of the film pack 70 is pulled until predetermined position, top of the sheet film unit 71 is pushed out from the opening 72a and moved to an exposure position so as to cover the exposure aperture 77a of the holder cover 77.

Upon returning the pull lid 76 to original position, the pull lid 76 is inserted between top of the sheet film unit 71 and next one. After that, photographing operation is carried out and the pull lid 76 is pulled. At this time, an inner frame 78 attached in the pack holder 75 is drawn out in a state that the inner frame keeps the pack body 72. The exposed sheet film unit 71 stops at the exposure position so that the exposed sheet film unit 71 is pressed toward the back inner wall of the pack holder 75 by means of four plate springs 79 provided on an inner wall of the holder cover 77.

Successively, upon returning the pull lid 76 to the original position, the pack body 72 is returned to an original position in the pack holder 75 with the inner frame 78. At this time, exposed sheet film unit 71 enters the pack body 72 from an opening 72b formed in a side wall of the pack body 72. The opening 72b is located at lower portion of the side wall relative to moving direction of the pack body 72. Accordingly, the exposed sheet film unit is contained at end of stacked sheet film units 71. Above-described operation is repeated so that all sheet film units 71 contained in the pack body 72 are successively exposed.

Figure 8:
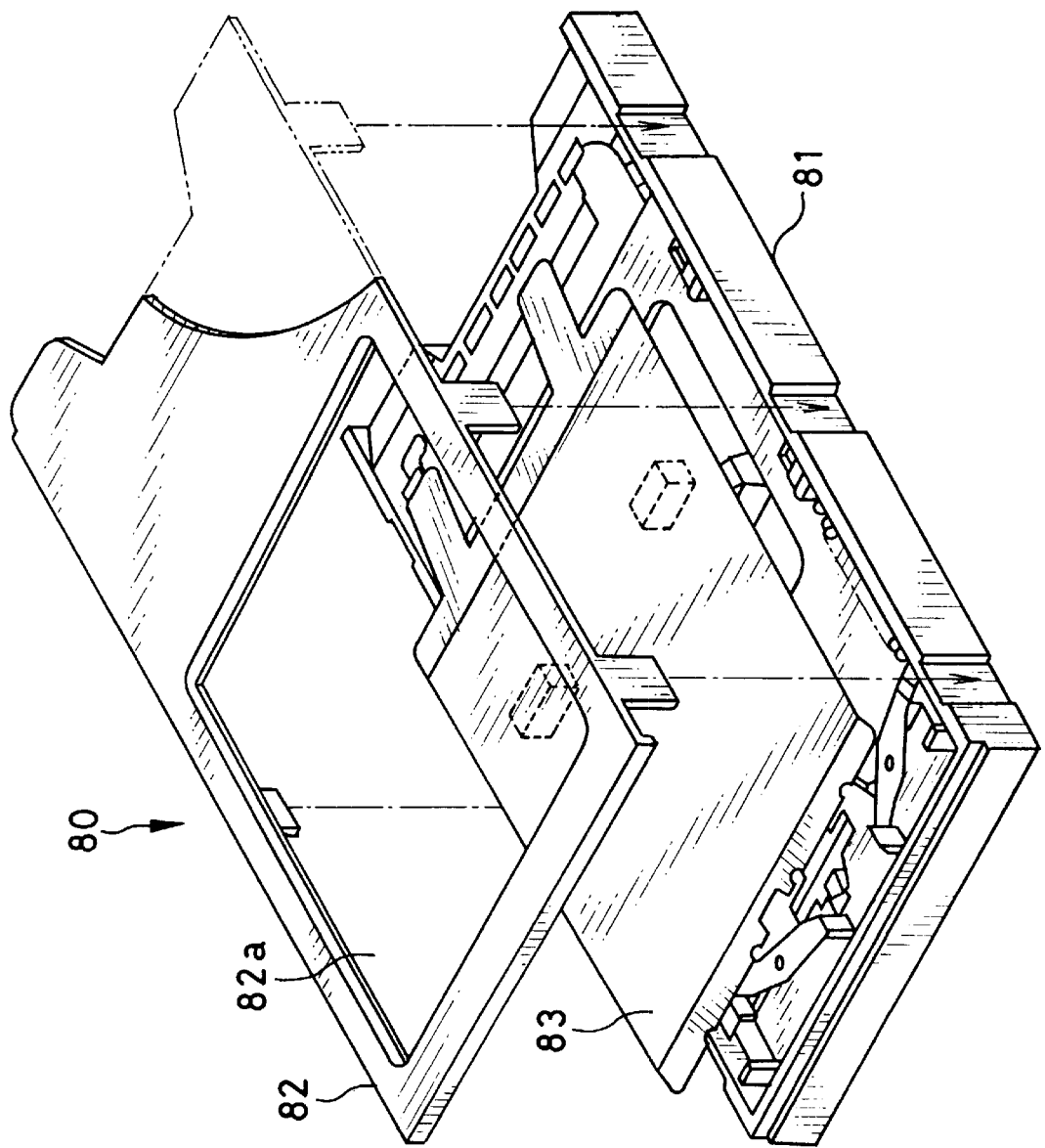
FIG. 8 is a perspective view of a sheet film holder as the injection molded article according to the present invention.

FIG. 8 shows a sheet film holder as the injection molded article according to the present invention. The sheet film holder 80 contains a plurality of sheet-like films which are stacked on a pressure plate 83 of a pack body 81 made of resin. A cover member 82 provided with an opening 82a is attached to an upper portion of the pack body 81. The most upper sheet film unit is pressed to the opening 82a by means of the pressure plate 83.

Figure 9:
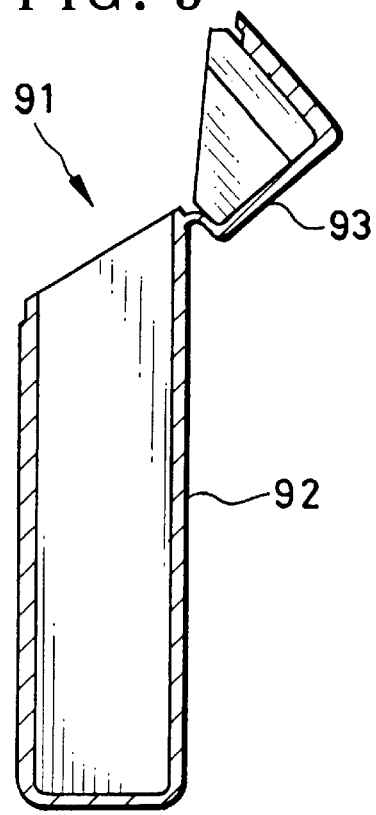
FIG. 9 is a sectional view of a photographic film case as the injection molded article according to the present invention.

FIG. 9 is a sectional view of an integral-type photo sheet film case as an injection molded article according to the present invention. The photo sheet film case contains, for example, micro film. The photo sheet film case 91 is an integral mold of a case body 92 and a case lid 93.

Figure 10:
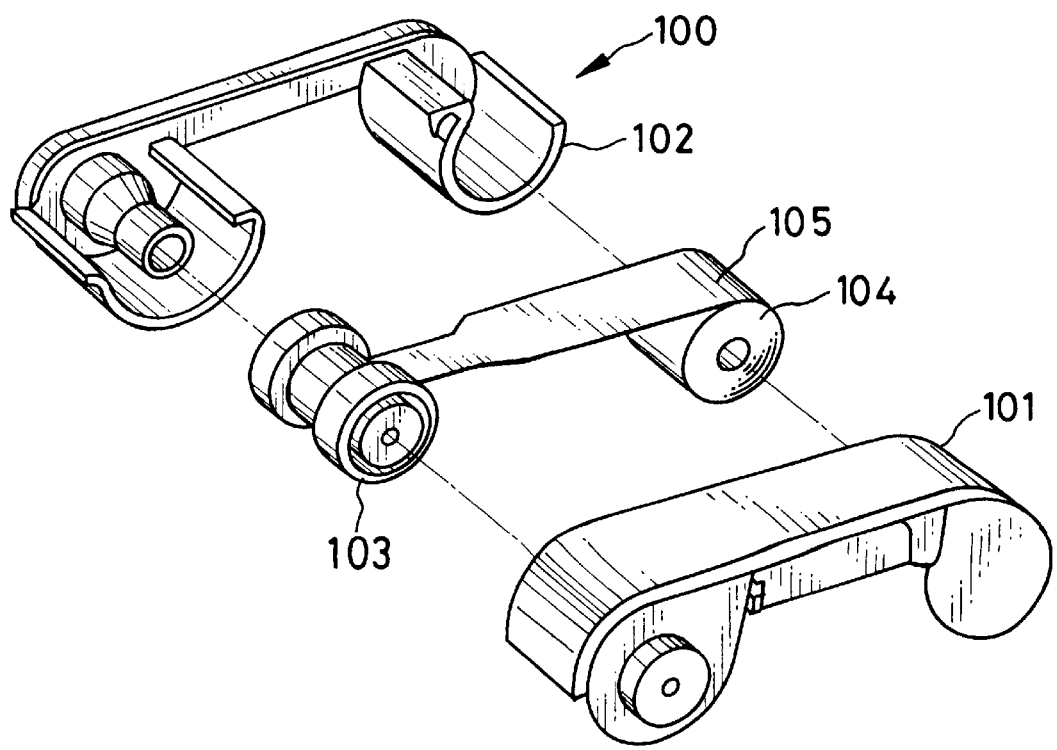
FIG. 10 is an exploded perspective view of a photographic film unit as the injection molded article according to the present invention.

FIG. 10 is an exploded perspective view of a photo film cartridge 100 as the injection molded article according to the present invention. This is a cartridge type in which 110-type photo film 104 is loaded. The photo film cartridge 100 is constituted of a bottom case 101, a top case 102, a cartridge spool 103 loaded thereinto, the photographic film 104 and a light shielding paper 105 wound together with the photographic film 104.

Figure 11:
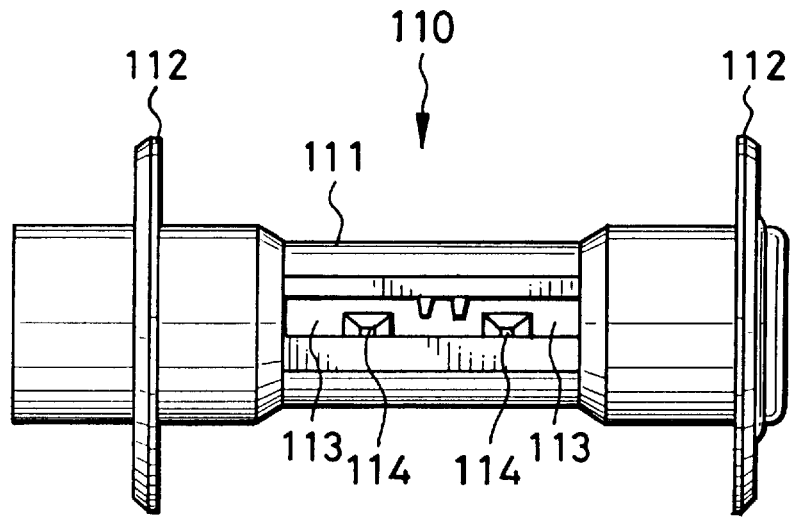
FIG. 11 is a front view of a photographic film spool as the injection molded article according to the present invention.

FIG. 11 is a front view of a photo film spool as the injection molded article according to the present invention. The photo film spool 110 is an integral mold constituted of a core 111 and a pair of flanges 112 provided at both sides of the core 111. The core 111 is provided with a slit 113 along an axial direction thereof. One end of a photo film is inserted into the slit 113 and engages with a engaging claw 114 provided on an inner surface of the slit 113. The photo film is wound around the core 111 as a roll. As for the injection molded article, the thermoplastic resin composition including at least one kind of the nucleating agent and at least one kind of the light shielding material is preferable. When the nucleating agent is included in the thermoplastic resin composition, it is possible to improve the transparency, the impact resistance, the rigidity, the hardness, the dimensional stability and so forth. Moreover, when the light shielding material is loaded, the fog on the photosensitive material does not occur and occurrence of change of sensitivity is reduced. As to the light shielding material, it is preferable to include at least two kinds having different shape and at least two kinds having different Mohs hardness. Further, it is also preferable to reduce static electricity trouble by including the conductive material in the thermoplastic resin composition. Furthermore, it is preferable to improve the heat resistance and polymerize at low cost by using the syndiotactic polystyrene resin for the thermoplastic resin.

Next, the second embodiment is described below.

The syndiotactic polymer has extremely high crystalline in comparison with a polymer having the other combination style. Further, the syndiotactic polymer has high melting point, high hardness, large specific gravity and great physical strength. In the present embodiment, as the injection molding material, the thermoplastic resin composition including crystalline syndiotactic polystyrene resin by 50 wt. % or more is used. The syndiotactic polystyrene resin has melt flow rate (measured under ASTM D 1238-88 D condition; temperature is 200° C. and piston loading is 5 kg) of 1–50 g/10 min. Accordingly, the injection moldability and the dimensional accuracy are excellent and the physical strength, the heat resistance, the resistance to chemicals, the wear resistance and the resistance to scuffing are improved. From among the syndiotactic polystyrene resins, the resin, in which the styrene monomer is polymerized with the single-sight catalyst and the melting point measured by GPC method is 220–300° C., is selected to be used so that the heat resistance is improved without lowering the physical strength of the injection molded article. Thus, the distortion of the injection molded article due to heat and impact is prevented so that occurrence of trouble lowering the photographic property of the photosensitive material, for example, photographic fog, flaw, adhesion of wastage and so forth, is prevented.

The syndiotactic polystyrene resin according to the present embodiment is styrene-based polymer resin having syndiotactic structure and stereoregularity of 70% or more, preferably 80% or more, and more preferably 85% or more relative to racemidiad. Besides, the styrene-based polymer resin having the stereoregularity of 30% or more, preferably 40% or more, and more preferably 50% or more relative to racemipentahead is also available. Concretely, there are stereoregular polystyrene resin, poly(alkylstyrene)resin, poly(halogenated styrene)resin, poly(halogenated alkylstyrene)resin, poly(alkoxystyrene)resin, poly(vinyl benzoate)resin, copolymer resin thereof, mixture thereof and copolymer resin including structural unit thereof.

As typical examples of the poly(alkylstyrene)resin, there are poly(methylstyrene)resin, poly(ethylstyrene)resin, poly(propylstyrene)resin, poly(butylstyrene)resin, poly(phenylstyrene)resin, poly(vinylstyrene)resin and so forth. As typical examples of the poly(halogenated styrene)resin, there are poly(chlorostyrene)resin, poly(bromostyrene)resin, poly(fluorostyrene)resin and so forth. As typical examples of the poly(alkoxystyrene)resin, there are poly(methoxystyrene)resin, poly(ethoxystyrene)resin and so forth. Among these, the poly(styrene)resin and the poly(methylstyrene)resin are particularly preferable and the poly(styrene)resin is most preferable.

As the syndiotactic polystyrene resin, copolymer resin may be used besides the above homopolymer resin. When the impact resistance is required, the copolymer resin is more preferable.

As typical examples of comonomer component of the copolymer resin, besides the monomer constituting the above styrene-based polymer resin, there are olefinmonomer of ethylene, propylene, butene, hexene, octene and so forth; dienemonomer of butadiene, isoprene and so forth; cyclic olefinmonomer; cyclic dienemonomer; polar vinylmonomer of methyl methacrylate, maleic anhydride, acrylonitrile and so forth. Among these, the ones in which the styrene is main component and synthetic rubber, alkylstyrene, hydrogenated polystyrene and halogenated polystyrene are copolymerized therewith are preferable. Particularly, butadiene rubber, isoprene rubber, isobutylene rubber, para-methylstyrene, meta-methylstyrene, para-tertiary butylstyrene, para-chlorostyrene and hydrogenated polystyrene are preferable. As to these, the butadiene rubber, para-methylstyrene and para-tertiary butylstyrene are especially preferable.

Amount of the comonomer is 30 mol % or less, preferably 20 mol % or less, more preferably 15 mol % or less, further preferably 10 mol % or less and most preferably 7 mol % or less. When the amount is more than 30 mol %, rigidity is insufficient and bad influences (the fog, trouble of sensitivity and coloring) are given to the photosensitive material. Further, its cost increases so that practical use becomes difficult.

The syndiotactic polystyrene resin may be blended with the other thermoplastic resin. As a preferable thermoplastic resin component for the blend, there are the above syndiotactic polystyrene resin, the styrene-based polymer resin having an atactic structure, general homopolystyrene resin, conventional high-impact polystyrene resin, rubber-including polystyrene resin, unsaturated carboxylic graft modification thermoplastic resin and polystyrene resin-based compatibilizing agent. These are preferable in view of the compatibility. Particularly preferable one is the polystyrene resin having syndiotactic structure, the polystyrene resin having atactic structure, the conventional non-crystalline homopolystyrene resin, the synthetic rubber-including high-impact polystyrene resin and the unsaturated carboxylic graft modification thermoplastic resin.

The content of these is 50 wt. % or less, preferably 40 wt. % or less, more preferably 30 wt. % or less and most preferably 20 wt. % or less. If the content of the syndiotactic polystyrene resin is less than 50 wt. %, it is impossible to provide the injection molded article having superior characteristics regarding to the heat resistance, the resistance to chemicals, the wear resistance and so forth.

Weight-average molecular weight of the syndiotactic polystyrene resin according to the present invention is 20,000–1,000,000, preferably 50,000–900,000, more preferably 100,000–800,000, further preferably 150,000–700,000 and most preferably 200,000–600,000. Molecular-weight distribution (weight-average molecular weight Mw/number-average molecular weight Mn) is 1.1–10, preferably 1.3–8, more preferably 1.5–6, further preferably 1.7–5 and most preferably 1.9–4 in order to keep the above superior characteristics and the dimensional accuracy.

Such syndiotactic polystyrene resin may be produced by polymerizing the styrene monomer described below with the catalyst which is, for example, titanium compound and condensation product of water and trialkylaluminum. Moreover, compound constituted of titanium compound and anion in which cation and plural groups combine to element may be used as the catalyst. The most preferable polymerizing method for the present invention is the method in that the styrene monomer is polymerized, using the single-sight catalyst (typical one is metallocene catalyst).

As a typical example of the single-sight catalyst, there is a catalyst including a reaction product of at least one kind of metallocene of transition metal and alumoxan. The transition metal is selected from a group of titanium, zirconium, hafnium and vanadium. As typical examples of metallocene component of the transition metal, there are
bis(cyclopentadienyl)zirconium chloride,
bis(cyclopentadienyl)zirconium dichloride,
bis(cyclopentadienyl)titanium dichloride,
bis(cyclopentadienyl)hafnium dichloride,
bis(methylcyclopentadienyl)zirconium dichloride
bis(methylcyclopentadienyl)titanium dichloride,
bis(butylcyclopentadienyl)zirconium dichloride,
bis(pentamethylcyclopentadienyl)zirconium dichloride,
methylenebis(butylcyclopentadienyl)zirconium dichloride
and so forth.

As producing method of the styrene monomer, there are destructive distillation method of silicic acid, reduction dehydration method of acetophenone, dehydrochlorination method of ethyl chloride benzol, dehydration method of phenyl alcohol, synthesis and dehydrogenation method of ethyl benzol and so forth. Among these, the synthesis and dehydrogenation method of ethyl benzol is most preferable because bad influence is not given to the photographic property of the photosensitive material and its price is low. This producing method is used after ethyl benzol(ethyl benzene) was synthesized from benzene and ethylene, styrene monomer was produced by dehydrogenation of the ethylbenzol, and refining (degree of purity is 98% or more, ethyl benzol as impurity is included by 1% or less) was performed.

In order to obtain the injection molded article having high heat resistance, superior wear resistance and superior resistance to scuffing, it is preferable to set the temperatures of the resin and the die at high degree when injection molding is performed. The syndiotactic polystyrene resin has high melting point in comparison with the other resin so that it is possible to raise the resin temperature when the injection molding is performed. In the present embodiment, the resin temperature during injection molding is 230–350° C. and the mold temperature is 50–200° C. Thus, the flowability of the resin increases so that the injection moldability is improved. Moreover, the physical strength increases so that the wear resistance and the resistance to scuffing are superior. Further, it is possible to obtain the injection molded article being superior in the resistance to chemicals and the heat resistance. Furthermore, the injection moldability and the dimensional accuracy are improved. Catalyst residue affecting the photographic property of the photosensitive material is made harmless and rust proof effect for a screw, a cylinder and the die of the injection molding machine is taken. When the light shielding material is added, it is especially preferable to add the fatty acid metal salt lubricant by 0.01–10 wt. %. The fatty acid metal salt lubricant acts to improve the dispersion property of the light shielding material as well.

As for the photo film cartridge made of resin, the photo film spool, the lens-fitted film unit, the instant film unit, the sheet film pack, the sheet film holder, the camera and so forth which are used for the injection molded article requiring to keep the perfect light shielding ability, the thermoplastic resin composition including the syndiotactic polystyrene resin of 50 wt. % or more and the light shielding material of 0.05–40 wt. % is used as the molding material. At this time, the syndiotactic polystyrene resin has melt flow rate of 1–50 g/10 min. After drying the thermoplastic resin until moisture amount thereof becomes 0.50 wt. % or less, the resin temperature is set at 230–350° C. to perform the injection molding. Thus, it is possible to obtain the injection molded article in which occurrence of the silver streak, the foaming, the weld line, the short shot and so forth is prevented. At this time, it is preferable to add at least one kind of the various lubricants by 0.01–10 wt. %. The lubricant acts to improve the flowability and the injection moldability. In order to improve the physical strength, the light shielding ability and the injection moldability, it is most preferable to add the silicone lubricant. Alternatively, in order to improve the photographic property, the rust proof property and the dispersion property of the light shielding material, it is most preferable to add the fatty acid metal salt lubricant.

Typical examples of the light shielding material which is one of the requisites of the present embodiment are set forth in the first embodiment.

Among the light shielding materials, the inorganic compound is preferable because it does not affect the photographic property and is stable at 150° C. or more. Especially, carbon black, titanium oxide, graphite and black iron oxide which are inert substrate are preferable in view of heat resistance and light resistance.

As classified examples based on the raw material of the carbon black, there are gas black, furnace black, channel black, anthra black, acetylene black, ketchen carbon black, thermal black, lamp black, animal black, vegetable black and so forth. Among these carbon blacks, the furnace carbon black is preferable in view of the light shielding property, the cost, physical properties and so forth. The acetylene carbon black, the ketchen carbon black and the conductive furnace carbon black (Vulcan XC-72, trade name, and so forth) are also preferable in view of the antistat effect, although the cost thereof is high. Moreover, it is preferable to mix the former and the latter at need.

With respect the preferable carbon blacks, they are set forth in the first embodiment. Marketed carbon blacks are also set forth in the first embodiment.

With respect to the other preferable light shielding materials, they are set forth in the first embodiment.

As to the content of the light shielding material, it is set forth in the first embodiment.

In view of the influence for the photographic property and the injection moldability, it is preferable to use the resin composition including the light shielding material after drying the volatile component (almost moisture) of the resin composition to 0.50 wt. % or less. As to the volatile component, 0.40 wt. % or less is preferable, 0.30 wt. % or less is more preferable and 0.20 wt. % or less is most preferable. Incidentally, drying of the resin composition is performed by heating, vacuuming or heating vacuuming (for example, at 70° C., for three hours).

In view of the dispersion property of the light shielding material, the flowability of the resin, the occurrence of the volatile material, inhibition of the moisture absorption and so forth, it is preferable to use the surface cladding material together with the light shielding material. The typical surface cladding materials are set forth in the first embodiment.

The lubricant is one of requisites of the present embodiment. Marketed typical lubricants are set forth in the first embodiment.

Among the lubricants, the polymethylphenylsiloxane and the dimethylpolysiloxane mainly composed of straight-chain diorganopolysiloxane are preferable. Further, the dimethylpolysiloxane having the viscosity of 50–100,000 centistoke at 23° C. is more preferable in view of the influence for the photographic property, the physical strength, the light shielding property, the lubricity, injection moldability and so forth. The dimethylpolysiloxane having the viscosity of 5,000–50,000 centistoke at 23° C. is most preferable. When the viscosity at 23° C. is less than 50 centistoke, bad influence is given to the photographic property and the bleedout occurs so that it is difficult to put it in practical use. When the viscosity is more than 100,000 centistoke, it is difficult to manufacturing it and its cost increases, further, handling becomes difficult due to high viscosity.

In the above lubricants, the fatty acid metal salt lubricant is preferable in view of the influence of the photographic property, the rust proof effect for the screw, the cylinder and the die of the injection molding machine, occurrence of the lump and so forth. The lubricity effect of the fatty acid metal salt is small, however, it neutralizes the catalyst residue and the halogen compound. Further, it acts to improve the dispersion property of the light shielding material. Content of the lubricant is 0.01–10 wt. %, preferably 0.03–5 wt. %, more preferably 0.05–3 wt. % and most preferably 0.09–1.5 wt. %.

Next, in the present embodiment, it is preferable to add the antioxidant in the injection molded article. With respect to the antioxidant, it is described in the first embodiment. Incidentally, the content and so forth of the antioxidant are similar to that of the first embodiment.

In order to keep the antistatic properties of the injection molded article, it is preferable to add the surfactant-based antistatic agent. With regard to the surfactant, it is described in the first embodiment.

It is preferable to contain the hydrotalcite compound in the injection molded article. In the injection molded article according to the present embodiment, at least one of the hydrotalcite compound and the fatty acid metal salt is added in order to neutralize catalyst residue, to absorb the halide for making the material affecting the photographic property harmless and to prevent resin discoloration or the like. The content thereof is 0.001–10.0 wt. %, preferably 0.005–5.0 wt. %, more preferably 0.01–3.0 wt. % and most preferably 0.02–1.5 wt. %. When the content is less than 0.001 wt. %, adding effect is not taken and kneading cost increases. When the content is more than 10.0 wt. %, the adding effect is not taken, further, the weldline and the lump occur and its cost increases.

With respect to the hydrotalcite compound, it is set forth in the first embodiment.

Particularly, when at least one stabilizer selected from among the phenol-based antioxidant, the phosphorus antioxidant and the fatty acid metal salt is used with the hydrotalcite compound, the photographic property of the photosensitive material is hardly made worse. Further, the rust proof effect of the injection molding machine and the anti-oxidant effect of the resin are taken. In this case, the following are added in the resin composition in order to prevent the bad influence from giving for the photographic property of the photosensitive material.

(1) Phenol-based antioxidant of 0.0005–0.5 wt. %, preferably 0.001–0.4 wt. % and more preferably 0.002–0.3 wt. %;

(2) Phosphorus-based antioxidant of 0.0005–0.5 wt. %, preferably 0.001–0.4 wt. % and more preferably 0.002–0.1 wt. %;

(3) At least one of the hydrotalcite compound and the fatty acid metal salt (metal soap), content of which is 0.001–10.0 wt. %, preferably 0.005–5.0 wt. %, more preferably 0.01–3 wt. % and most preferably 0.02–1.5 wt. %.

Total content of (1)+(2)+(3) is 0.0015–10.0 wt. %, preferably 0.002–5.0 wt. %, more preferably 0.003–4.0 wt. % and most preferably 0.005–3.0 wt. %. Anyway, it is preferable to add the admixture of minimum amount for preventing the resin deterioration in view of deterioration of the photographic property, prevention of the bleedout and inhibition of the cost.

The injection molded article according to the present embodiment is required to keep the quality of the photosensitive material in good state for long time. Further, there is possibility that the injection molded article is left under the sun light. Accordingly, it is preferable to add the ultraviolet light absorber in the resin composition to prevent the photo-deterioration. With respect to the ultraviolet light absorber, it is described in the first embodiment.

In the thermoplastic resin composition including the crystalline syndiotactic polystyrene resin of 50 wt. % or more, various addition agents may be added. The addition agent is described in the first embodiment in detail.

The present embodiment is available to various injection molded articles which are described in the first embodiment.

Referring to the accompanying drawings, typical injection molded articles according to the present embodiment are described. However, these are not exclusive.

The injection molded articles shown in FIGS. 1 to 11 are already described in the first embodiment so that the description thereof is omitted.

Figure 13A:
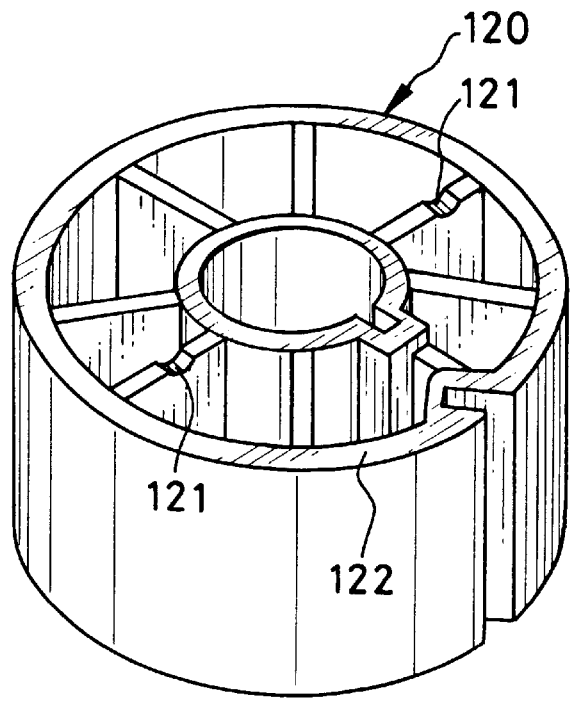
FIGS. 13A and 13B are perspective view of a core for film-like photosensitive material as the injection molded article according to the present invention.
Figure 13B:
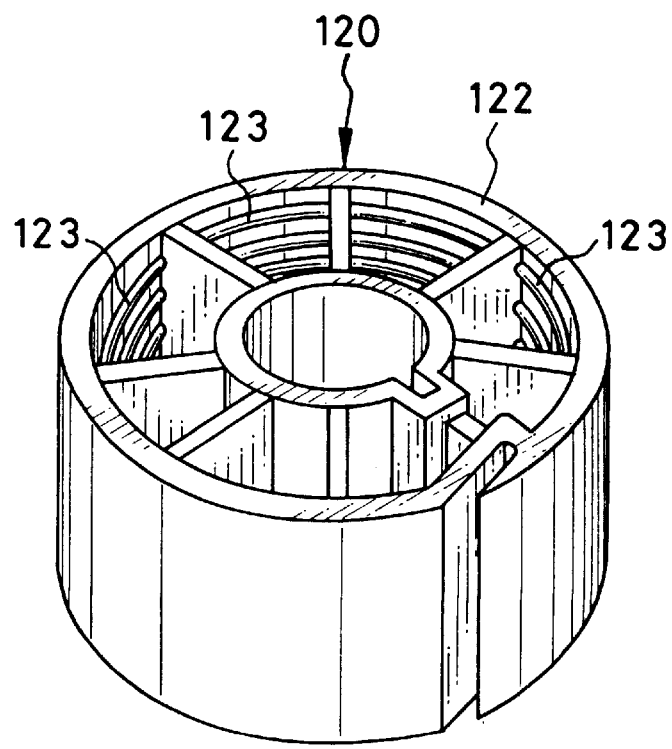

FIGS. 13(A) and 13(B) show a core for film-like photosensitive material as the injection molded article according to the present invention. The core 120 is wound with a motion picture film or the like. FIG. 13(A) shows a state in that a gate 121 is positioned at top. FIG. 13(B) shows a state in that the gate 121 is positioned at bottom. A plurality of circular ridges 123, height of which is 0.02–0.7 mm, are provided on an inner surface of an outer cylinder 122 of the core 120 to improve injection moldability, physical strength and appearance of the core 120. The core 120 is formed with the resin composition according to the present embodiment as a single piece.

Figure 14:
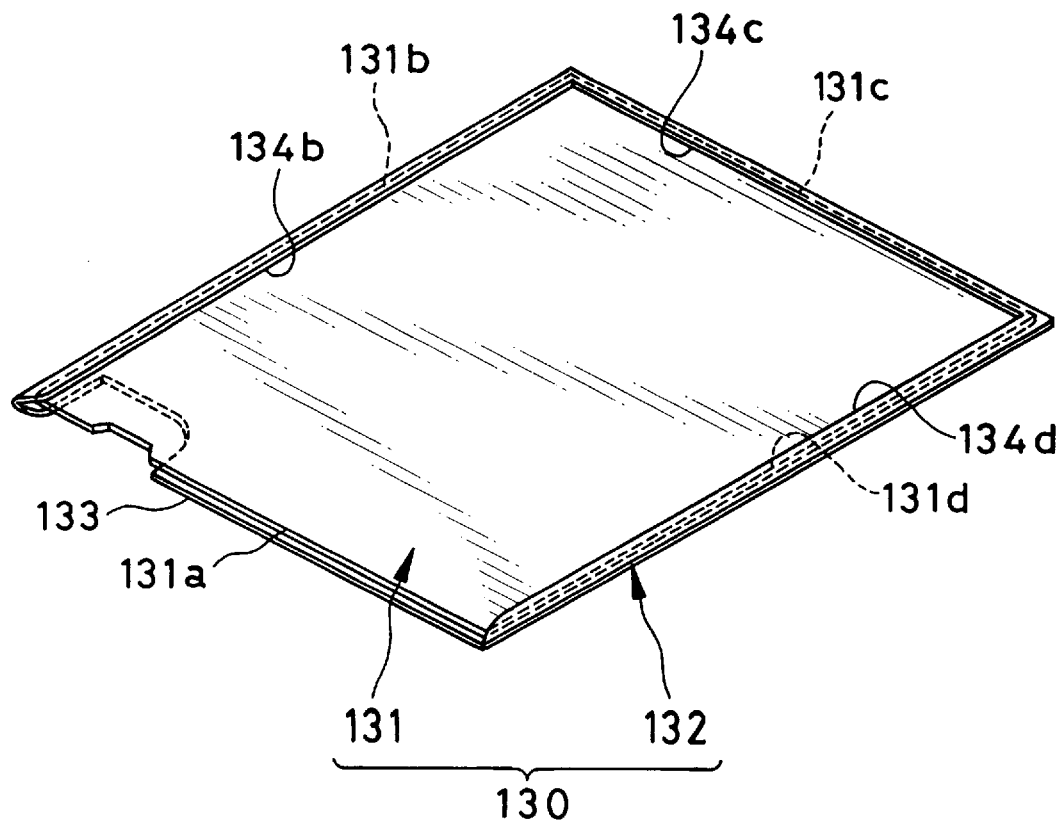
FIG. 14 is a perspective view of a sheet film unit as the injection molded article according to the present invention.

FIG. 14 shows a sheet film unit as the injection molded article. The sheet film unit 130 is constituted of a sheet film 131 and a film sheath 132 containing the sheet film 131. The film sheath 132 comprises a bottom portion 133 supporting a base face of the sheet film 131 and edge portions 134b, 134c and 134d respectively surrounding three edges 131b, 131c and 131d except a short edge 131a. In the sheet film unit 130, the present embodiment is available to the film sheath 132.

Figure 15:
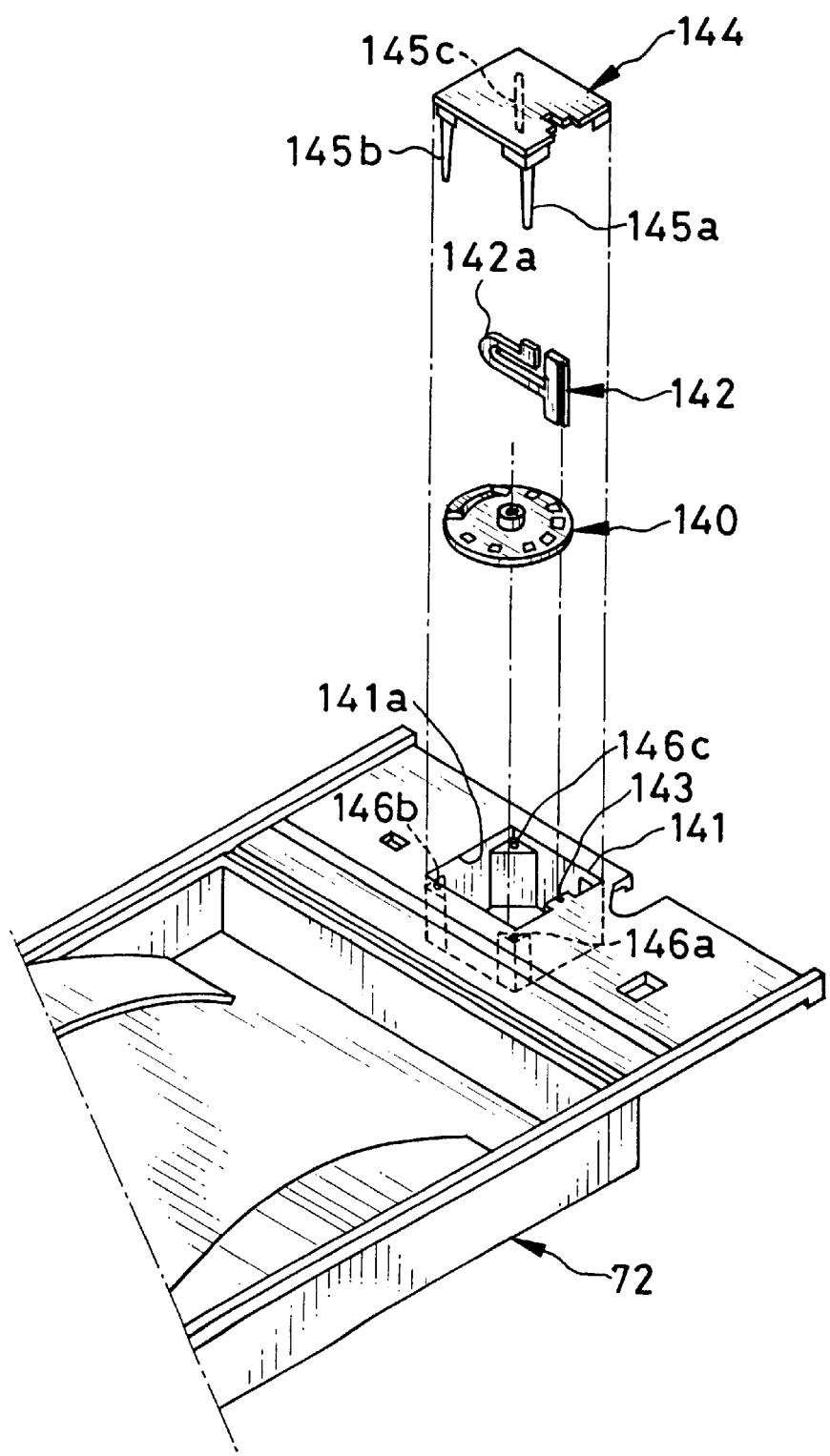
FIG. 15 is a partially exploded perspective view of a pack body shown in FIG. 7.

As shown in FIG. 15, the pack body 72 of the film pack 70 is provided with a counter chamber 141 at an end portion of the pull lid 76 drawing side. A disk-like counter indicator 140 is rotatably contained in the counter chamber 141. From above portion of the counter indicator 140, a supporting plate 142 having a spring member 142a is fitted into a guide groove 143 provided in the counter chamber 141. Further, an opening 141a of the counter chamber 141 is covered with a cover plate 144. The cover plate 144 is fixed in a state that the opening 141a is sealed by fitting projections 145a, 145b and 145c into holes 146a, 146b and 146c formed in the counter chamber 141. The projections 145a, 145b and 145c are provided at three corners of the cover plate 144. On the surface of the counter indicator 140, numerals (not shown) showing a photographable number are printed. The counter indicator 140 is rotated so as to advance the numeral step by step every operation of the pull lid 76.

As to the film pack 70 and the pack holder 75 shown in FIGS. 7 and 15, the pack body 72, the pull lid 76, the holder cover 77, the counter indicator 140, the supporting plate 142 and the cover plate 144 are the injection molded article of a single piece. The present embodiment is available to these.

EXAMPLES

As the molding material of the injection molded article according to the present embodiment, nine kinds of the thermoplastic resin compositions, which are represented by R1 to R9, were constructed. Makeup and characteristics of the thermoplastic resin compositions are shown in Table 12.

TABLE 12

| | | Thermoplastic resin composition | | | | | | | | |
|---|---|---|---|---|---|---|---|---|---|---|
| | | R1 | R2 | R3 | R4 | R5 | R6 | R7 | R8 | R9 |
| Kind of resin | | Syndiotactic polystyrene resin | | | | | | | | |
| Addition | A1 | 0.60 | 0.60 | 0.60 | 0.60 | 0.60 | 0.60 | 0.60 | 0.60 | 0.60 |
| agent | A2 | 0.20 | 0.20 | 0.20 | 0.20 | — | 0.20 | 0.20 | — | — |
| | A3 | 1.00 | 1.00 | 1.00 | 1.00 | 1.00 | — | 1.00 | 1.00 | — |

TABLE 12-continued

|  |  | Thermoplastic resin composition | | | | | | | | |
|---|---|---|---|---|---|---|---|---|---|---|
|  |  | R1 | R2 | R3 | R4 | R5 | R6 | R7 | R8 | R9 |
|  | A4 | 0.20 | 0.20 | 0.20 | 0.20 | — | 0.20 | — | — | — |
|  | A5 | 0.20 | 0.20 | 0.20 | 0.20 | 0.20 | 0.20 | 0.20 | — | — |
|  | A6 | 0.10 | 0.10 | 0.10 | — | 0.10 | 0.10 | 0.10 | — | — |
|  | A7 | — | — | 0.50 | 0.50 | 0.50 | 0.50 | — | — | — |
|  | A8 | — | — | 0.50 | 0.50 | 0.50 | 0.50 | — | — | — |
|  | A9 | — | — | 0.10 | 0.10 | 0.10 | 0.10 | — | — | — |
| Characte- | C1 | 272 | | | | 258 | | | | |
| ristics | C2 | 27000 | | | | 23800 | | | | |
| of resin | C3 | 10.3 | | | | 8.2 | | | | |
|  | C4 | 116 | | | | 155 | | | | |
|  | C5 | 1.01 | | | | 1.08 | | | | |
|  | C6 | 7.5 | | | | 6.8 | | | | |

Incidentally, the syndiotactic polystyrene resin as the raw material of the thermoplastic resin compositions R1 to R9 is the resin in which the styrene monomer is polymerized by using the metallocene catalyst of zirconium which is the single-sight catalyst. Moreover, the unit of the load of each addition agent shown in Table 12 is part by weight relative to the resin of 100 parts by weight.

Characters A1 to A9 shown in Table 12 are as follows:

A1; oil furnace carbon black (light shielding material)

A2; calcium stearate (fatty acid metal salt lubricant)

A3; dimethylpolysiloxane having the viscosity of 20,000 centistoke at 23° C. (silicone lubricant)

A4; hydrotalcite compound

A5; polyethylene wax (surface cladding material)

A6; antistatic agent(ELECTROSTRIPPER, trade name, manufactured by Kao)

A7; hindered phenol-based antioxidant

A8; phosphorus-based antioxidant

A9; hindered amine ultraviolet light absorber.

Moreover, characters C1 to C6 and the measuring method of each characteristic in Table 12 are as follows:

C1; melting point (°C.), DSC method

C2; bending elastic modulus (kg/cm$^2$), ASTM D 790

C3; Izod impact strength (kg.cm/cm) with notch, ASTM D 256

C4; thermal distortion temperature (°C.), ASTM D648

C5; specific gravity, JIS K 7112

C6; melt flow rate (g/10 min), ASTM D 1238 G condition (temperature is 200° C., piston loading is 5 kg)

Next, two kinds of the thermoplastic resin composition conventionally used as the molding material were constructed. Makeup and characteristics of the conventional thermoplastic resin composition r1 and r2 are shown in Table

TABLE 13

|  | Conventional thermoplastic resin composition | |
|---|---|---|
|  | r1 | r2 |
| Kind of resin | Non-crystalline butadiene rubber reinforcement high-impact polystyrene resin | Non-crystalline homopolystyrene resin |

TABLE 13-continued

|  |  | Conventional thermoplastic resin composition | |
|---|---|---|---|
|  |  | r1 | r2 |
| Addition | A1 | 0.60 | 0.60 |
| agent | A2 | — | — |
|  | A3 | 1.00 | 1.00 |
|  | A4 | — | — |
|  | A5 | — | — |
|  | A6 | — | — |
|  | A7 | — | — |
|  | A8 | — | — |
|  | A9 | — | — |
| Characte- | C1 | — | — |
| ristics | C2 | 25500 | 33000 |
| of resin | C3 | 6.1 | 1.2 |
|  | C4 | 78 | 83 |
|  | C5 | 1.05 | 1.05 |
|  | C6 | 7.2 | 7.5 |

Incidentally, non-crystalline butadiene rubber reinforcing high-impact polystyrene resin (hereinafter HIPS resin) as the raw material of the resin composition r1 is the resin in which the polybutadiene rubber is graft-polymerized to the styrene monomer by the successive bulk polymerization method. Moreover, non-crystalline homopolystyrene resin (hereinafter GPPS resin) as the raw material of the resin composition r2 is the resin in which the styrene monomer is polymerized by the successive bulk polymerization method.

Next, the upper and the lower cases 41a and 41b, the light shielding lid 44, and the spool shaft 42a shown in FIG. 5 were injection-molded by using each of the thermoplastic resins R1 to R9. Samples S1 to S9 of the photo film cartridge 40 constituted of these parts were assembled and evaluated about the physical strength, the heat resistance, the influence for the photographic property of the film, the resistance to chemicals and so forth of the injection molded article. For comparison, conventional samples s1 and s2 of the photo film cartridge 40 were made by using the conventional thermoplastic resin composition r1 and r2. The samples s1 and s2 were evaluated similarly to the samples S1 to S9. At this time, as to the resistance to chemicals, each sample was steeped in the chemical of 23° C. for seven days, and after that, the change of properties of each sample was confirmed.

Evaluation result of the molded article is shown in Table 14. In Table 14, mark ⊚ represents very excellence, mark ○ represents excellence, mark ● represents limit of practical use, mark ▲ represents necessity of improvement, and mark × represents impossibility of practical use.

TABLE 14

| | Sample article | | | | | | | | | Conventional article | |
|---|---|---|---|---|---|---|---|---|---|---|---|
| | S1 | S2 | S3 | S4 | S5 | S6 | S7 | S8 | S9 | s1 | s2 |
| Molding condition | M1 | M2 | | | | | | | | M3 | M4 |
| Photographic property | ○ | ○ | ◎ | ◎ | ○ | ◎ | ○ | ● | ● | ▲ | ● |
| Heat resistance | ◎ | ◎ | ◎ | ◎ | ◎ | ◎ | ◎ | ◎ | ◎ | X | X |
| Wear resistance | ◎ | ◎ | ◎ | ◎ | ◎ | ● | ◎ | ◎ | ● | ▲ | X |
| Resistance to scuffing | ◎ | ◎ | ◎ | ◎ | ◎ | ● | ◎ | ◎ | ● | ▲ | X |
| Dispersion property of light shielding material | ◎ | ◎ | ◎ | ◎ | ○ | ◎ | ○ | ● | ● | ● | ● |
| Antistatic properties | ◎ | ◎ | ◎ | ● | ◎ | ◎ | ◎ | ● | ● | ● | ● |
| Appearance | ○ | ○ | ◎ | ◎ | ○ | ○ | ◎ | ○ | ● | ● | ▲ |
| Film advancement | ◎ | ◎ | ◎ | ◎ | ◎ | ● | ◎ | ◎ | ● | ● | ▲ |
| Camera suitability | ◎ | ◎ | ◎ | ○ | ◎ | ○ | ◎ | ◎ | ○ | X | X |
| X Resistance to toluene | ○ | ○ | ○ | ○ | ○ | ○ | ○ | ○ | ○ | X | X |
| Resistance to ethyl acetate | ○ | ○ | ○ | ○ | ○ | ○ | ○ | ○ | ○ | X | X |
| Resistance to ethane dichloride | ○ | ○ | ○ | ○ | ○ | ○ | ○ | ○ | ○ | X | X |
| Resistance to benzene | ○ | ○ | ○ | ○ | ○ | ○ | ○ | ○ | ○ | X | X |
| Resistance to gasoline | ○ | ○ | ○ | ○ | ○ | ○ | ○ | ○ | ○ | X | X |
| Resistance to light oil | ◎ | ◎ | ◎ | ◎ | ◎ | ◎ | ◎ | ◎ | ◎ | ▲ | ▲ |
| Resistance to acetone | ○ | ○ | ○ | ○ | ○ | ○ | ○ | ○ | ○ | X | X |
| Total evaluation | ◎ | ◎ | ◎ | ● | ○ | ○ | ○ | ● | ● | ▲ | X |

X: Resistance to chemicals

Characters M1 to M4 of molding condition in Table 14 are as follows:

M1; Injection molding was performed under the condition that the resin temperature is 300° C., the mold temperature is 150° C. and the injection pressure is 900 kg/cm², after moisture amount of the resin composition was dried to 0.05 wt. %.

M2; Injection molding was performed under the condition that the resin temperature is 285° C., the mold temperature is 100° C. and the injection pressure is 700 kg/cm², after moisture amount of the resin composition was dried to 0.06 wt. %.

M3; Injection molding was performed under the condition that the resin temperature is 200° C., the mold temperature is 40° C. and the injection pressure is 320 kg/cm², after moisture amount of the resin composition was dried to 0.05 wt. %.

M4; Injection molding was performed under the condition that the resin temperature is 210° C., the mold temperature is 40° C. and the injection pressure is 330 kg/cm², after moisture amount of the resin composition was dried to 0.07 wt. %.

As understood from Table 14, the sample S3 including all of the addition agents A1 to A9 obtains very superior result relative to all evaluation. Accordingly, the sample S3 is most preferable as the injection molded article. Moreover, from the evaluation result of the samples S2, S5 and S7, it is understood that the injection molded article which does not give the bad influence for the photographic property and is superior in the physical strength is obtained without adding the antioxidant, the ultraviolet light absorber and the hydrotalcite compound.

On the other hand, as to the sample S6 in which the silicone lubricant was not added, sufficient lubricity was not obtained on the surface of the injection molded article and the film advancement became worse. Moreover, the resin did not become rigid state so that the sufficient wear resistance and the resistance to scuffing were not obtained. Accordingly, in the present embodiment, it is preferable to add at least one of the fatty acid metal salt lubricant and the silicone lubricant in view of the film advancement, the wear resistance and the resistance to scuffing. As to the samples S4, S8 and S9 in which the antistatic agent was not added, the lubricity was lowered. Further, the flowability of the resin was lowered and the weld line occurred strongly so that the appearance became worse. Accordingly, it was not preferable to put them in practical use.

Upon comparing the evaluation result of the samples S1 and S2 with the evaluation result of the conventional samples s1 and s2, it is understood that the physical strength, the wear resistance, the resistance to scuffing of the injection molded article are improved by using the syndiotactic polystyrene resin as the molding material. Moreover, the dispersion property of the light shielding material for the resin was improved so that the flowability of the resin was not damaged. Accordingly, it is possible to prevent occurrence of the weld line and improve the appearance of the injection molded article. Further, as the syndiotactic polystyrene resin has high thermal distortion temperature and is superior in the heat resistance in comparison with the non-crystalline HIPS resin and the GPPS resin which are conventional used, the deterioration of the photographic property due to thermal distortion of the injection molded article may be prevented.

Next, eight kinds of the injection molded articles A to H were injection-molded by using the thermoplastic resin compositions R1 to R9, and the suitability for the practical use was evaluated by judging the quality of the injection molded articles totally. Moreover, for comparison, the injection molded articles A to H were injection-molded by using the conventional thermoplastic resin compositions r1 and r2, and similarly, the suitability of these for the practical use was evaluated. Incidentally, the injection molding condition of the thermoplastic resin compositions R1–R9, r1 and r2 was similar to that of the above samples S1–S9, s1 and s2.

The injection molded articles A to H are as follows:

A; Photo film spool (refer to FIG. 11),

B; Photo film cartridge (refer to FIG. 10),

C; Lens-fitted film unit (refer to FIG. 6),

D; Core for the film-like photosensitive material (refer to FIG. 13),

E; Sheet film unit (refer to FIG. 14),

F; Sheet film pack (refer to FIG. 7),

G; Film pack holder (refer to FIG. 7),

H; Counter indicator of the sheet film pack (refer to FIG. 15).

The evaluation result of the suitability for practical use is shown in Table 15.

TABLE 15

|  |  | Thermoplastic resin composition | | | | | | | | | Conventional one | |
|---|---|---|---|---|---|---|---|---|---|---|---|---|
|  |  | R1 | R2 | R3 | R4 | R5 | R6 | R7 | R8 | R9 | r1 | r2 |
| Molding condition |  | M1 | | | M2 | | | | | | M3 | M4 |
| Injection molded article | A | ◎ | ◎ | ◎ | ◎ | ◎ | ● | ○ | ○ | ● | ● | ▲ |
|  | B | ◎ | ◎ | ◎ | ◎ | ◎ | ○ | ○ | ○ | ○ | ● | ▲ |
|  | C | ◎ | ◎ | ◎ | ◎ | ◎ | ◎ | ○ | ● | ● | ▲ | X |
|  | D | ○ | ○ | ○ | ○ | ○ | ◎ | ○ | ○ | ◎ | ● | X |
|  | E | ◎ | ◎ | ◎ | ○ | ◎ | ○ | ○ | ○ | ○ | ○ | ▲ |
|  | F | ◎ | ◎ | ◎ | ● | ○ | ● | ○ | ● | ● | ▲ | X |
|  | G | ○ | ○ | ◎ | ○ | ◎ | ● | ○ | ● | ● | X | X |
|  | H | ◎ | ◎ | ◎ | ◎ | ◎ | ● | ◎ | ◎ | ● | ▲ | X |

Next, the upper and the lower cases 41a and 41b, the spool shaft 42a and the light shielding lid 44 shown in FIG. 5 were injection-molded by using the thermoplastic resin composition R1 as the molding material under the condition that the resin temperature was 300° C., the mold temperature was 150° C. and the injection pressure was 900 kg/cm². At this time, the resin was not dried, accordingly, the moisture amount was still 0.62 wt. %. With regard to these injection molded articles, the silver streak, the weld line and the gas scorch occurred so that the improvement was required. Thus, after the thermoplastic resin composition R1 was dried at 120° C., for three hours and the moisture amount thereof became to 0.03 wt. %, the injection molding was performed under the similar condition. In this case, the silver streak, the weld line, the gas scorch and so forth did not occur and the injection molded articles having good appearance were obtained.

Moreover, the injection molding was performed by using the thermoplastic resin composition R2 as the molding material under the condition that the resin temperature was 285° C., the mold temperature was 100° C. and the injection pressure was 700 kg/cm². At this time, the resin was not dried, accordingly, the moisture amount was still 0.96 wt. %. With regard to these injection molded articles, the silver streak, the weld line, the gas scorch, the short shot and so forth occurred strongly so that the injection molded articles being unsuitable for practical use were obtained. Thus, after the thermoplastic resin composition R2 was dried at 85° C., for five hours and the moisture amount thereof became to 0.11 wt. %, the injection molding was performed under the similar condition. In this case, the molding troubles did not occur and the injection molded articles having good appearance were obtained.

In view of the foregoing, it is confirmed that the molding troubles, for example, the gas scorch, the silver streak and the weld line are prevented and the injection molded article having good appearance is obtained by performing the drying process for the thermoplastic resin composition as the molding material and regulating the moisture amount of the resin composition.

Next, in order to confirm the recycling property of the injection molded article according to the present embodiment, the deterioration of the physical strength was confirmed relative to recycled injection molded article in which the thermoplastic resin composition R3 was used as the molding material. As to the recycled injection molded article, the injection molding and the recycling of 100% were repeated five times. The injection molding was performed under the condition that the resin temperature was 285° C., the mold temperature was 100° C. and the injection pressure was 700 kg/cm², after the resin composition was dried until the moisture amount thereof became 0.06 wt. % or less. As the injection molded articles, the upper and the lower cases 41a and 41b, the light shielding lid 44 and the spool shaft 42a were molded. Moreover, the deterioration of the physical strength was evaluated on the basis of an undermining amount relative to a characteristic value of the new injection molded article, after the tensile strength, the bending elastic modulus and the Izod impact strength with notch were measured. Further, the recycled injection molded articles of the upper and the lower cases 41a and 41b, the light shielding lid 44 and the spool shaft 42a were assembled to recycle the photo film cartridge 40. After that, the heat resistance, the wear resistance and the resistance to scuffing thereof were evaluated, and it was confirmed whether the bad influence was give to the photographic property of the photo film or not.

As to the recycled injection molded articles of the upper and the lower cases 41a and 41b, the light shielding lid 44 and the spool shaft 42a formed in such a way, the tensile strength, the bending elastic modulus and the Izod impact strength with notch were measured. In this case, the deteriorations of 18%, 6% and 19% were confirmed in comparison with the new injection molded articles. However, each characteristic value of the recycled injection molded article was more than that of the new injection molded article in which the conventional non-crystalline polystyrene resin was used. Accordingly, it was confirmed that the injection molded article according to the present embodiment had sufficient physical strength for recycling. Moreover, the recycled photo film cartridge 40 constituted of the recycled injection molded articles was superior in the heat resistance, the resistance to chemicals, the wear resistance and the resistance to scuffing. Further the photographic property of the photo film was good. From the above consequence, it is confirmed that the injection molded article according to the present embodiment is superior in the recycling property.

As stated above, in the present embodiment, the physical strength, the heat resistance, the resistance to chemicals, the wear resistance and the resistance to scuffing of the injection molded article may be improved by using the thermoplastic resin composition in which the crystalline syndiotactic polystyrene resin is included by 50 wt. % or more. The syndiotactic polystyrene resin has high melting point, high hardness and the melt flow rate of 1–50 g/10 minutes. Further, by using the syndiotactic polystyrene resin in which the styrene monomer is polymerized by using the single-sight catalyst and the melting point of which is 220–310° C., the heat resistance is improved without lowering the physical strength of the injection molded article. Thus, the distortion of the injection molded article due to heat and impact is prevented. Moreover, occurrence of trouble lowering the photographic property of the photosensitive material, for example, photographic fog, flaw, adhesion of wear wastage are prevented.

By including the silicone lubricant and/or the fatty acid metal salt lubricant of 0.01–10 wt. % in the thermoplastic resin composition as the molding material, the injection moldability, the dimensional accuracy and the light shielding ability are improved and the molding trouble is reduced. Moreover, the photographic property is kept in good state.

Further, by using the thermoplastic resin composition in which the syndiotactic polystyrene resin having the melt flow rate of 1–50 g/10 minutes and the melting point of 220–310° C. is included by 50 wt. % or more, the injection molded article being superior in the physical strength, the heat resistance and the resistance to chemicals is obtained without damaging the injection moldability. At this time, the resin temperature and the mold temperature during the injection molding are respectively 230–350° C. and 50–200° C.

Furthermore, by using the thermoplastic resin composition in which the syndiotactic polystyrene resin having the melt flow rate of 1–50 g/10 minutes is included by 50 wt. % or more and the light shielding material is included by 0.05–40 wt. %, the gas scorch, the silver streak, the foaming, the weld line, the short shot and so forth are prevented and the appearance of the injection molded article is kept in good state. Moreover, the physical strength, the heat resistance and the light shielding property are kept. At this time, the resin composition is dried until the moisture amount thereof becomes 0.05 wt. % or less and the injection molding is performed in a state that the resin temperature is 230–350° C.

Next, the third embodiment is described below.

The injection molded article according to the present embodiment is made of the thermoplastic resin composition in which the thermoplastic resin having the narrow molecular-weight distribution is included. The thermoplastic resin is polymerized by using the single-sight catalyst comprising at least one kind of the metallocene complexes which are zirconium, titanium, hafnium and vanadium. The molecular-weight distribution of the thermoplastic resin is 1.1–5.0. More than 30 wt. % of the injection molded article is constituted of the thermoplastic resin polymerized with the single-sight catalyst and having the molecular-weight distribution of 1.1 to 5.0.

With respect to the single-sight catalyst, it is defined and described in the first embodiment. As the single-sight catalyst has uniform property of the active point, it is possible to obtain the thermoplastic resin by gas phase producing process wherein the solvent is not used. In such thermoplastic resin, unnecessary component of low molecular weight and low density is not included.

As to the molecular-weight distribution of the thermoplastic resin, it is described in the first embodiment. The content of the thermoplastic resin is also described in the first embodiment.

As the thermoplastic resin having the narrow molecular-weight distribution, the polyolefin resin is preferable. More preferable one is the ethylene-α-olefin copolymer resin and the various poly propylene resins. The most preferable one is the syndiotactic polystyrene resin which is the crystalline resin. Further, it is preferable that the melt flow rate of the thermoplastic resin is 3–100 g/10 minutes.

Moreover, preferable polyolefin resin is at least one kind of the homopolyethylene resin and the ethylene-α-olefin copolymer resin. In the ethylene-α-olefin copolymer resin, α-olefin, carbon number of which is 3–20, is included by 0.01–30 wt. %, preferably, the α-olefin, carbon number of which is 3–13, is included by 0.05–20 wt. %. The melt flow rate (measured under ASTM D-1238-88 E condition, E condition: the temperature is 190° C. and the piston loading is 2.16 kg) is 3–100 g/10 minutes.

Another preferable polyolefin resin is at least one kind of the homopolypropylene resin and propylene-α-olefin copolymer resin. The melt flow rate (measured under ASTM D-1238-88 L condition, L condition: the temperature is 230° C. and the piston loading is 2.16 kg) is 3–100 g/10 minutes.

As to the melt flow rate of the thermoplastic resin, it is described in the first embodiment. The density and the melting point thereof are also described in the first embodiment.

When the polyethylene resin which is one of the polyolefin resins is used for the injection molded article requiring the rigidity, the heat resistance, the wear resistance, the oil resistance and the solvent resistance, for example, the container body of the photo film cassette, photo film cartridge for APS film, the camera, the spool, the lens-fitted film unit, the sheet film holder, the sheet film pack, and the instant film unit, its density is 0.941–0.985 g/cm$^3$, preferably 0.945–0.980 g/cm$^3$, more preferably 0.950–0.975 g/cm$^3$, and most preferably 0.955–0.970 g/cm$^3$. The melting point of the polyethylene resin used for the injection molded article which is utilized under the sun light of outdoor is 110° C. or more, preferably 115° C. or more, more preferably 120° C. or more, and most preferably 125° C. or more in view of the heat resistance.

Particularly, the ethylene-α-olefin copolymer resin polymerized by using the single-sight catalyst and including the α-olefin, carbon number of which is 3–20, by 0.01–30 wt. % is different from the ethylene-α-olefin copolymer resin polymerized by using the conventional multi-sight catalyst (for example, Ziegler catalyst) relative to crystallization process during refrigeration of molten polymer. In the ethylene-α-olefin copolymer resin polymerized with the multi-sight catalyst, high-density component crystallizes at first and becomes a crystalline nucleus to grow up. Accordingly, a thickness of lamella is determined in accordance with the high-density component so that the transparency lowers.

In contrast, as the ethylene-α-olefin copolymer resin consists of uniform-density component in which the high-density component is not included, the crystalline nucleus generates uniformly and grows uniformly. Accordingly, thickness of the lamella becomes thin so that the transparency is improved. This is most preferable for the transparent container body containing the photo film cassette. The haze measured under ASTM D-1003 becomes one second or less of the ethylene-α-olefin copolymer resin polymerized with the conventional multi-sight catalyst. When the various nucleating agents are added by 0.001–10 wt. %, the haze becomes one third. This is preferable.

Typical examples of the metallocene complex of the zirconium, the titanium, the hafnium and the vanadium are described below. However, these are not exclusive.

Bis(cyclopentadienyl)zirconium monochloride monohydride,
Bis(cyclopentadienyl)zirconium monobromide monohydride,
Bis(cyclopentadienyl)methylzirconium hydride,
Bis(cyclopentadienyl)ethylzirconium hydride,
Bis(cyclopentadienyl)cyclohexyl zirconium hydride,
Bis(cyclopentadienyl)phenyl zirconium hydride,
Bis(cyclopentadienyl)benzyl zirconium hydride,
Bis(cyclopentadienyl)neopentyl zirconium hydride,
Bis(cyclopentadienyl)zirconium dichloride,
Bis(cyclopentadienyl)zirconium dibromide,
Bis(cyclopentadienyl)methyl zirconium monochloride,
Bis(cyclopentadienyl)ethyl zirconium monochloride,
Bis(cyclopentadienyl)cyclohexyl zirconium monochloride,
Bis(cyclopentadienyl)phenyl zirconium monochloride,
Bis(cyclopentadienyl)benzyl zirconium monochloride,
Bis(cyclopentadienyl)zirconium dimethyl,
Bis(cyclopentadienyl)zirconium diphenyl,
Bis(cyclopentadienyl)zirconium dibenzyl,
Bis(cyclopentadienyl)methoxy zirconium chloride,
Bis(cyclopentadienyl)ethoxy zirconium chloride,
Bis(cyclopentadienyl)butoxy zirconium chloride,
Bis(cyclopentadienyl)methyl zirconium ethoxide,
Bis(cyclopentadienyl)ethyl zirconium ethoxide,
Bis(cyclopentadienyl)phenyl zirconium ethoxide,
Bis(cyclopentadienyl)ethoxy zirconium, Bis(cyclopentadienyl)butoxy zirconium,
Bis(methylcyclopentadienyl)zirconium dichloride,
Bis(methylcyclopentadienyl)zirconium monochloride monohydride
Bis(methylcyclopentadienyl)zirconium methylchloride,
Bis(methylcyclopentadienyl)zirconium dimethyl,
Bis(pentamethylcyclopentadienyl)zirconium dichloride,
Bis(pentamethylcyclopentadienyl)zirconium methylchloride,
Bis(pentamethylcyclopentadienyl)zirconium dimethyl,
Bis(normal-butyl cyclopentadienyl)zirconium dichloride,
Bis(normal-butyl cyclopentadienyl)zirconium methylchloride,
Bis(cyclopentadienyl)titanium dichloride,
Bis(cyclopentadienyl)titanium diphenyl,
Bis(cyclopentadienyl)titanium methylchloride,
Bis(cyclopentadienyl)titanium dimethyl,
Bis(methylcyclopentadienyl)titanium diphenyl,
Bis(methylcyclopentadienyl)titanium dichloride,
Bis(methylcyclopentadienyl)titanium methylchloride,
Bis(methylcyclopentadienyl)titanium dimethyl,
Bis(pentamethylcyclopentadienyl)titanium dichloride,
Bis(pentamethylcyclopentadienyl)titanium diphenyl,
Bis(pentamethylcyclopentadienyl)titanium methylchloride,
Bis(pentamethylcyclopentadienyl)titanium dimethyl,
Bis(normal-butyl cyclopentadienyl)titanium dichloride,
Bis(normal-butyl cyclopentadienyl)titanium diphenyl,
Bis(cyclopentadienyl)hafnium dichloride,
Methylenebis(methylcyclopentadienyl)hafnium dichloride,
Methylenebis(butylcyclopentadienyl)hafnium dichloride,
Bis(methylcyclopentadienyl)hafnium dichloride,
Bis(butylcyclopentadienyl)hafnium dichloride,
Bis(pentamethylcyclopentadienyl)hafnium dichloride,
Bis(indenyl)zirconium dichloride.

Among these, the metallocene complex of the zirconium is most preferable.

It is possible to polymerize by the solution, the slurry or the gas phase method. However, the gas phase method is most preferable because the catalyst residue is a little and energy usage is small. As to the remaining amount of the zirconium, the titanium, the hafnium and the vanadium, 50 ppm or less is preferable, 40 ppm or less is more preferable, 30 ppm or less is further preferable and 20 ppm or less is most preferable in view of prevention of bad influence for the photographic property. It is preferable to leach and reduce these components by various alcohols in view of the improvement of the photographic property. However, in this case, the cost increases.

In the injection molded article according to the present embodiment, various thermoplastic resins may be included in accordance with the purpose of use besides the thermoplastic resin polymerized by using the single-sight catalyst and having the molecular-weight distribution of 1.1–5.0. As to the various thermoplastic resins, they are described in the first embodiment.

The injection molded article according to the present embodiment includes at least one kind of the lubricant and the hydrotalcite compound by 0.01–10 wt. %. As to the lubricant and the hydrotalcite compound, they are described in the first embodiment. Similarly to the first embodiment, the hydrotalcite compound may be added by 0.001–5.0 wt. %, preferably by 0.005–4.0 wt. %, more preferably by 0.01–3.0 wt. % and most preferably by 0.02–2.0 wt. %. Particularly, when the hydrotalcite compound is used together with the fatty acid metal salt, the dispersion property is improved. Further, the photographic property of the photosensitive material is kept in good condition and occurrence of the lump is reduced.

In the injection molded article according to the present embodiment, the antioxidant is added. Content, effect, typical examples and so forth of the antioxidant are described in the first embodiment. Besides, the typical marketed antioxidants are described below.

(1) Phenol-based Antioxidants

SUMILIZER BHT (trade name, manufactured by Sumitomo Chemical), IRGANOX 1076 (trade name, manufactured by Ciba Geigy), MARK AO-50 (trade name, manufactured by Adeca Argus), SUMILIZER BP-76 (trade name, manufactured by Sumitomo Chemical), TOMINOX SS (trade name, manufactured by Yoshitomi), IRGANOX 565 (trade name, manufactured by Ciba Geigy), IONOX WSP (trade name, manufactured by ICI), SANTONOX (trade name, manufactured by Monsanto), SUMILIZER WX R (trade name, manufactured by Sumitomo Chemical), ANTAGECRYSTAL (trade name, manufactured by Kawaguchi), IRGANOX 1035 (trade name, manufactured by Ciba Geigy), ANTAGE W-400 (trade name, manufactured by Kawaguchi), NOCLIZER NS-6 (trade name, manufactured by Ohuchi Shinko), IRGANOX 1425 WL (trade name, manufactured by Ciba Geigy), MARK AO-80 (trade name, manufactured by Adeca Argus), SUMILIZER GA-80 (trade name, manufactured by Sumitomo Chemical), TOPANOL CA (trade name, manufactured by ICI), MARK AO-30 (trade name, manufactured by Adeca Argus), MARK AO-20 (trade name, manufactured by Adeca Argus), IRGANOX 3114 (trade name, manufactured by Ciba Geigy), MARK AO-330 (trade name, manufactured by Adeca Argus), IRGANOX 1330 (trade name, manufactured by Ciba Geigy), CYANOX 1790 (trade name, manufactured by ACC), IRGANOX 1010 (trade name, manufactured by Ciba Geigy), MARK AO-60 (trade name, manufactured by Adeca Argus), SUMILIZER BP-101 (trade name, manufactured by Sumitomo Chemical), and TOMINOX TT (trade name, manufactured by Yoshitomi).

(2) Phosphorus-based Antioxidants

IRGAFOS 168 (trade name, manufactured by Ciba Geigy), MARK 2112 (trade name, manufactured by Adeca Argus), WESTON 618 (trade name, manufactured by Vorg-Warner), MARK PEP-8 (trade name, manufactured by Adeca Argus), ULTRANOX 626 (trade name, manufactured by Vorg-Warner), MARK PEP-24G (trade name, manufactured by Adeca Argus), MARK PEP-36 (trade name, manufactured by Adeca Argus), and HCA (trade name, manufactured by Sanko).

(3) Thioether-based Antioxidants

DLTDP "YOSHITOMI" (trade name, manufactured by Yoshitomi), SUMILIZER TPL (trade name, manufactured by Sumitomo Chemical), ANTIOX L (trade name, manufactured by Nippon Oil), DMTD "YOSHITOMI" (trade name, manufactured by Yoshitomi), SUMILIZER TPT (trade name, manufactured by Sumitomo Chemical), ANTIOX M (trade name, manufactured by Nippon Oil), DSTP "YOSHITOMI" (trade name, manufactured by Yoshitomi), SUMILIZER TPS (trade name, manufactured by Sumitomo Chemical), ANTIOX S (trade name, manufactured by Nippon Oil), SEENOX 412S (trade name, manufactured by Sipro), MARK AO-412S (trade name, manufactured by Adeca Argus), SUMILIZER TP-D (trade name, manufactured by Sumitomo Chemical), MARK AO-23 (trade name, manufactured by Adeca Argus), SANDSTAB P-EPQ (trade name, manufactured by Sand), IRGAFOS P-BPQ FF (trade name, manufactured by Ciba Geigy), IRGANOX 1222 (trade name, manufactured by Ciba Geigy), MARK 329K (trade name, manufactured by Adeca Argus), WESTON 399 (trade name, manufactured by Vorg-Warner), MARK 260 (trade name, manufactured by Adeca Argus), and MARK 522 (trade name, manufactured by Adeca Argus).

(4) Metal Deactivator

NAUGARD XL-1 (trade name, manufactured by Uniroyal), MARK CDA-1 (trade name, manufactured by Adeca Argus), MARK CDA-6 (trade name, manufactured by Adeca Argus), IRGANOX MD-1024 (trade name, manufactured by Ciba Geigy), and CUNOX (trade name, manufactured by Mitsui Toatsu).

The present embodiment is available for the various injection molded articles set forth in the first embodiment. Details of the injection molded articles are taught in Japanese Patent Laid-Open publication No. 8-118394.

In the injection molded article according to the present embodiment, at least one kind of various addition agents besides the forgoing may be added within a range that the bad influence is not given to the photographic property and the effect of the present embodiment is not damaged. At least one kind of the various addition agents may be added in the specific thermoplastic resin composition according to the present invention. Such addition agents are disclosed in, for example, Japanese Patent Laid-Open Publication Nos. 6-67356 and 8-118394. Such agents are described below.

When the light shielding property is required, at least one kind of the light shielding materials may be added in the injection molded article by 0.1–60 wt. %. As to the light shielding materials, they are described in the first embodiment.

As to the light shielding material (the carbon black, the aluminum powder, the inorganic pigment having the refractive index of 1.50 or more, the inorganic pigment having the specific gravity of 3.4 or more and the inorganic pigment having the oil absorption of 50 ml/100 g are especially preferable), it is preferable to cover the surface thereof with the surface cladding material in order to improve the dispersion property and the resin flowability, and in order to prevent occurrence of the micro grit and the volatility material, deterioration of rate of the moisture absorption and, dirt of the injection molding machine. As to the surface cladding material, it is described in the first embodiment.

At this time, the surface covering amount of the surface cladding material is 0.001–50 parts by weight for 100 parts by weight of the light shielding material which is the carbon black, the titanium oxide, the aluminum powder and so forth. As to the covering amount, 0.005–40 parts by weight is preferable, 0.01–30 parts by weight is more preferable and 0.05–20 parts by weight is most preferable. When the covering amount is less than 0.001 parts by weight, covering effect is hardly taken. When the covering amount is more than 50 parts by weight, occurrence of the bleedout Increases and slip between the resin and screw occurs. As a consequence of that, a discharging amount thereof changes so that scatter of thickness of the injection molded article increases. Thus, it is impossible to put that in practical use.

It is preferable to add at least one kind of nucleating agents in the injection molded article by 0.001–10 wt. %. Kind, effect, content and so forth of the nucleating agent are described in the first embodiment. As the nucleating agent, there are also disclosed in, for example, Japanese Patent Laid-Open Publication No. 6-67356.

Among the benzylidene sorbitol compounds, the organic nucleating agent having the molecular weight of 350–500 and the melting point of 180–270° C. is most preferable. As to the melting point, 200–260° C. is preferable and 210–250° C. is more preferable. As concrete examples, there are 1,3-2,4-di(4-methylbenzylidene)sorbitol (refer to Chemical Formula 4), bis(P-methylbenzylidene)sorbitol (refer to Chemical Formula 5), and bis(P-ethylbenzylidene)sorbitol (refer to Chemical Formula 6).

As marketed examples, there are GELALL MD and GELALL DH (trade name) of Shi-Nippon Rika Co., Ltd, NC-4 (trade name) of Mitsui Toatsu Co., Ltd, and so forth. When the melting point is less than 180° C., the pyrolysis is tend to be caused due to heat deterioration and the aldehyde compound affecting the photographic property of the photosensitive material is generated. On the other hand, when the melting point is more than 270° C., it is necessary to raise the resin temperature in order to take the nucleating effect. Thus, the heat deterioration of the resin increases.

[Chemical Formula 5]

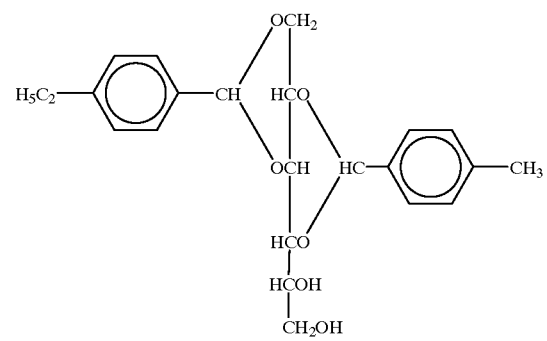

[Chemical Formula 6]

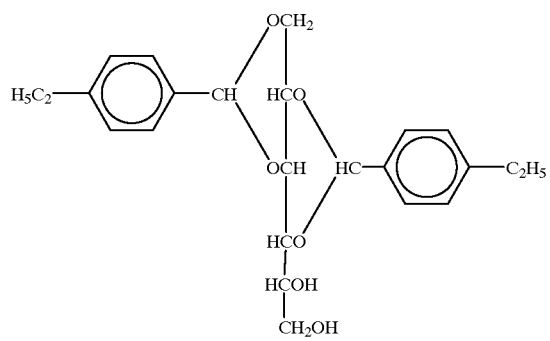

Among the above organic nucleating agents, especially preferable one is described in the first embodiment. As to the inorganic nucleating agent, it is also described in the first embodiment.

In order to make effective the antioxidant, the antioxidant synergist may be included in the injection molded article according to the present embodiment. Content, effects, examples and so forth of the antioxidant synergist are described in the first embodiment.

In order to absorb the harmful ultraviolet ray, to prevent the photo-deterioration, to improve the light shielding ability and to prevent fading of the colorant, it is preferable to use various ultraviolet light absorbers for the thermoplastic resin. As the ultraviolet light absorber, one disclosed in Japanese Patent Laid-Open Publication No. 8-118394 may be used. The most preferable ultraviolet light absorber is the organic compound in which fluorescent property is not possessed at all or is scarcely possessed. Typical examples, content and so forth thereof are described in the first embodiment.

In the present embodiment, it is preferable to use the age resister in order to prevent the deterioration of the thermoplastic resin. Typical example, content and so forth thereof are described in the first embodiment.

It is preferable to add the surfactant in the injection molded article according to the present invention. By adding the surfactant, the dispersion property and the moldability of the hydrotalcite compound, the light shielding material and the nucleating agent are improved. Further, it is possible to prevent occurrence of white powder due to blooming of the lubricant, to improve the drip proofness and 5 to keep the antistatic properties. As the surfactant, one disclosed in Japanese Patent Laid-Open Publication No. 6-67356 may be used.

The deodorizer and the fragrance imparting agent may be added in the injection molded article according to the 10 present embodiment. As the deodorizer and the fragrance imparting agent, one disclosed in Japanese Patent Laid-Open Publication No. 8-118394 may be used.

In the thermoplastic resin composition according to the present embodiment, other various addition agents may be added. As to the various addition agents, they are described in the first embodiment.

By the way, when the specified thermoplastic resin composition is used for the injection molded article, there is possibility that silver streak, foaming, weldline, short shot and so forth occur. Accordingly, it is preferable to set the moisture content of the thermoplastic resin composition at 1.0 wt. % or less. The moisture content is measured by ISO 2053-76 method (105±2° C., drying for one hour). As to the moisture content, 0.7 wt. % or less is preferable, 0.5 wt. % or less is more preferable, 0.3 wt. % or less is further preferable and 0.1 wt. % or less is most preferable. In the case of the thermoplastic resin including the material, such as carbon black which is easy to absorb the moisture, drying is performed at 70° C. for more than one hour. As to the drying time, three hours or more is preferable and five hours or more is particularly preferable.

Referring to the accompanying drawings, examples of the injection molded article according to the present embodiment are described below.

The injection molded articles shown in FIGS. 1 to 11 are already described in the first embodiment so that the description thereof is omitted.

A: Example of the Lid (cap) for the Photo Film Cassette Container

The lid for the photo film container shown in FIG. 1 was manufactured. Ethylene-based resins (LD1', LD2', L-L1', L-2', M1', M2' and M3') shown in Tables 16 to 18 are the following resins. The ethylene-based resin constitutes the thermoplastic resin composition (Examples 1a to 6a, Comparatives 1a to 6a) used for injection molding of the lid. Tables 16 to 18 show the melt flow rate (MFR) and the molecular-weight distribution (Mw/Mn) of each resin, makeup of each thermoplastic resin composition and characteristics of obtained injection molded article.

Test evaluation of the characteristics of the injection molded article is as follows:

⊚; very excellence, ○; excellence, ●; limit of practical use, Δ; necessity of improvement, ×; impossibility of practical use.

Test method of the characteristics of the injection molded article is as follows:

(A) The injection moldability is judged on the basis of total suitability, for example, molding cycle, motor loading of the injection molding machine, blocking proofness of the resin pellet and the injection molded article, and carrier ability of the molded article.

(B) The transparency applies to ASTM D 1003.

(C) The dimensional stability is judged on the basis of the difference from the metal dimension (difference due to molding shrinkage and distortion).

(D) The molding trouble proofness is judged on the basis of occurrence of injection molding trouble, for example, resin discoloration, short shot and burr.

(E) The moisture resistance is judged on the basis of weight increase due to moisture absorbing when the container body 11 shown in FIG. 2 is left for one month in a isothermal constant-humidity chamber of 50° C. and 90% RH after moisture absorbing agent (silica gel) of 5 g is inserted in the container body 11 and the container body 11 is sealed with the lid 12 relative to each test.

(F) The other superior characteristics are judged on the basis of a state when the injection molding has performed or a state of normal temperature (20° C., 60% RH) after keeping for long time (six months) in a low temperature warehouse (10° C.).

(G) The photographic property is judged on the basis of influence for the photographic property (fog, change of the sensitivity, the gradation, and the color) with regard to the Fuji color negative film of ISO sensitivity 400.

TABLE 16

(unit: wt. %)

| | | Example | | | | | |
|---|---|---|---|---|---|---|---|
| | | 1a | 2a | 3a | 4a | 5a | 6a |
| I | LD1' | 10 | 0 | 0 | 0 | 0 | 20 |
| | LD2' | 0 | 0 | 0 | 10 | 0 | 0 |
| | L-L1' | 0 | 0 | 0 | 0 | 0 | 0 |
| | L-L2' | 0 | 0 | 0 | 0 | 0 | 0 |
| | M1' | 89.45 | 0 | 0 | 0 | 0 | 0 |
| | M2' | 0 | 99.45 | 99.65 | 89.55 | 0 | 0 |
| | M3' | 0 | 0 | 0 | 0 | 99.45 | 79.45 |
| II | Lubricant (oleic amide) | 0.05 | 0.05 | 0.05 | 0.05 | 0.05 | 0.05 |
| | Lubricant (calcium stearate) | 0.10 | 0.10 | 0.10 | 0.10 | 0.10 | 0.10 |
| | Hydrotalcite compound | 0.10 | 0.10 | 0 | 0.10 | 0.10 | 0.10 |
| | Hindered phenol antioxidant (Ireganox 1010) | 0.05 | 0.05 | 0.05 | 0.05 | 0.05 | 0.05 |
| | Phosphorus antioxidant (dialkylphosphate) | 0.05 | 0.05 | 0.05 | 0.05 | 0.05 | 0.05 |
| | Nonionics (glycerine fatty ester) | 0.10 | 0.10 | 0.10 | 0 | 0.10 | 0.10 |
| | Organic nucleating agent (GELALL MD) | 0.10 | 0.10 | 0 | 0.10 | 0.10 | 0.10 |
| III | A Injection moldability | ○ | ⊚ | ○ | ⊚ | ⊚ | ⊚ |
| | B Transparency | ⊚ | ⊚ | ○ | ⊚ | ○ | ○ |
| | C Dimensional stability | ⊚ | ⊚ | ⊚ | ⊚ | ⊚ | ⊚ |
| | D Molding trouble proofness | ⊚ | ⊚ | ○ | ● | ⊚ | ⊚ |
| | E Moisture resistance | ⊚ | ⊚ | ⊚ | ⊚ | ⊚ | ⊚ |
| | F Other superior characteristics | ⊚ | ⊚ | ⊚ | — | ⊚ | ⊚ |
| | G photographic property | ○ | ○ | ○ | ○ | ○ | ○ |

I; Kind of resin, II; Kind of additive
III; Characteristics of resin

TABLE 17

(unit: wt. %)

|   |   | Comparative | | | | | |
|---|---|---|---|---|---|---|---|
|   |   | 1a | 2a | 3a | 4a | 5a | 6a |
| I | LD1' | 99.95 | 0 | 0 | 0 | 0 | 0 |
|   | LD2' | 0 | 99.85 | 0 | 0 | 0 | 0 |
|   | L-L1' | 0 | 0 | 99.85 | 0 | 0 | 0 |
|   | L-L2' | 0 | 0 | 0 | 99.85 | 0 | 0 |
|   | M1' | 0 | 0 | 0 | 0 | 0 | 0 |
|   | M2' | 0 | 0 | 0 | 0 | 99.80 | 0 |
|   | M3' | 0 | 0 | 0 | 0 | 0 | 99.80 |
| II | Lubricant (oleic amide) | 0.05 | 0 | 0 | 0 | 0 | 0 |
|   | Lubricant (calcium stearate) | 0.10 | 0.10 | 0.10 | 0.10 | 0 | 0 |
|   | Hydrotalcite compound | 0.10 | 0 | 0 | 0 | 0 | 0 |
|   | Hindered phenol antioxidant (Ireganox 1010) | 0.05 | 0.05 | 0.05 | 0.05 | 0 | 0 |
|   | Phosphorus antioxidant (dialkylphosphate) | 0.05 | 0 | 0 | 0 | 0 | 0 |
|   | Nonionics (glycerine fatty ester) | 0.10 | 0 | 0 | 0.10 | 0.10 | 0.10 |
|   | Organic nucleating agent (GELALL MD) | 0.10 | 0 | 0 | 0.10 | 0.10 | 0.10 |
| III | A Injection moldability | ○ | X | X | X | X | X |
|   | B Transparency | Δ | Δ | Δ | ◎ | ◎ | ◎ |
|   | C Dimensional stability | X | Δ | Δ | Δ | ● | ● |
|   | D Molding trouble proofness | ● | X | X | X | X | X |
|   | E Moisture resistance | X | Δ | Δ | Δ | ● | ● |
|   | F Other superior characteristics | ◎ | — | — | — | — | — |
|   | G Photographic property | ○ | Δ | Δ | Δ | Δ | Δ |

I; Kind of resin, II; Kind of additive
III; characteristics of resin

|   | LD1' | LD2' | L-L1' | L-L2' | M1' | M2' | M3' |
|---|---|---|---|---|---|---|---|
| MFR (g/10 min) (ASTM D1238 E condition) | 12 | 25 | 10 | 22 | 16 | 23 | 35 |
| Mw/Mn (GPC method) | 8.2 | 4.7 | 3.8 | 3.2 | 2.8 | 2.6 | 2.3 |

Ethylene-based resins (LD1', LD2', L-L1', L-L2', M1', M2', M3') shown in Tables 16, 17 and 18 are as follows:

LD1'; Branch-state low-density homopolyethylene resin (produced by a conventional high-pressure radical polymerizing method and having the density (ASTM D 1505) of 0.921 g/cm$^3$, hereinafter LDPE resin.)

LD2'; Branch-state low-density homopolyethylene resin (produced by a conventional high-pressure radical polymerizing method and having the density of 0.919 g/cm$^3$, hereinafter LDPE resin.)

L-L1'; Ethylene-butene-1 copolymer resin (produced by a polymerizing method using the conventional multi-sight catalyst and having the density of 0.920 g/cm$^3$.)

L-L2'; Ethylene-butene-1 copolymer resin (produced by a polymerizing method using the conventional multi-sight catalyst and having the density of 0.919 g/cm$^3$.)

M1'; Ethylene-butene-1 copolymer resin (produced by a polymerizing method using the single-sight catalyst and having the density of 0.920 g/cm$^3$. The single-sight catalyst is constituted of the zirconium metallocene complex including the bis(cyclopentadienyl)zirconium dichloride. Content of butene-1 is 3 mol % and remaining amount of the zirconium is 20 ppm or less.)

M2'; Ethylene-butene-1 copolymer resin (produced by a polymerizing method using the above single-sight catalyst and having the density of 0.915 g/cm$^3$. Content of butene-1 is 7 mol % and remaining amount of the zirconium is 20 ppm or less.)

M3'; Low-density polyethylene resin (produced by the polymerizing method using the above single-sight catalyst and having the density of 0.922 g/cm$^3$.)

Incidentally, for the M1, the M2 and the M3, alumino oxan is used as a cocatalyst.

B: Examples of the Photo Film Cassette Container Body

The photo film cassette container body shown in FIG. 3A was manufactured. The ethylene-based resin (LD3', LD4', L-L3', L-L4', M4', M5', M6' and M7') and the propylene-based resin (M8' and P1') shown in Table 19 are the following resins. Each resin constitutes the thermoplastic resin composition (Examples 1b to 9b, Comparatives 1b to 10b) used for the container body. Tables 19 to 20 show characteristics of each resin, makeup of the thermoplastic resin composition, and characteristics of the obtained injection molded article.

TABLE 19

Example (unit: wt. %)

|   | 1b | 2b | 3b | 4b | 5b | 6b | 7b | 8b | 9b |
|---|---|---|---|---|---|---|---|---|---|
| LD3' | — | — | — | — | — | — | — | — | — |
| LD4' | — | — | — | — | — | — | — | — | — |
| L-L3' | — | — | — | — | — | — | — | — | — |
| L-L4' | — | — | — | — | — | — | — | — | 40 |
| M4' | 99.2 | 99.2 | 99.25 | — | — | — | — | — | — |
| M5' | — | — | — | 99.2 | — | — | — | — | — |
| M6' | — | — | — | — | 99.2 | — | — | — | — |
| M7' | — | — | — | — | — | 99.2 | — | — | 59.2 |
| M8' | — | — | — | — | — | — | 99.2 | 99.2 | — |
| P1' | — | — | — | — | — | — | — | — | — |
| Lubricant (oleic amide) | 0.05 | 0.05 | 0.05 | 0.05 | 0.05 | 0.05 | 0.05 | 0.05 | 0.05 |

TABLE 19-continued

| | Example (unit: wt. %) | | | | | | | | |
|---|---|---|---|---|---|---|---|---|---|
| | 1b | 2b | 3b | 4b | 5b | 6b | 7b | 8b | 9b |
| Lubricant (calcium stearate) | 0.20 | 0.20 | 0.20 | 0.20 | 0.20 | 0.20 | 0.20 | 0.20 | 0.20 |
| Antioxidant A | 0.05 | — | 0.05 | 0.05 | 0.05 | 0.05 | 0.05 | 0.05 | 0.05 |
| Antioxidant B | — | 0.05 | 0.05 | — | — | — | — | — | — |
| Antioxidant C | 0.05 | 0.05 | — | 0.05 | 0.05 | 0.05 | 0.05 | 0.05 | 0.05 |
| Antioxidant D | 0.05 | 0.05 | — | 0.05 | 0.05 | 0.05 | 0.05 | 0.05 | 0.05 |
| Hydrotalcite compound | 0.1 | 0.1 | 0.1 | 0.1 | 0.1 | 0.1 | 0.1 | 0.1 | 0.1 |
| Surfactant A | 0.1 | 0.1 | 0.1 | 0.1 | 0.1 | 0.1 | 0.1 | 0.1 | 0.1 |
| Surfactant B | 0.1 | 0.1 | 0.1 | 0.1 | 0.1 | 0.1 | 0.1 | 0.1 | 0.1 |
| Organic nucleating agent A | 0.1 | 0.1 | 0.1 | 0.1 | 0.1 | 0.1 | 0.1 | — | 0.1 |
| Organic nucleating agent B | — | — | — | — | — | — | — | 0.1 | — |
| [Test method] | | | | | | | | | |
| H  Photographic property | ◎ | ◎ | ○ | ◎ | ◎ | ◎ | ◎ | ◎ | ○ |
| I  Transparency | ○ | ○ | ● | ○ | ● | ● | ◎ | ◎ | ○ |
| J  Molding trouble proofness | ◎ | ○ | ● | ○ | ○ | ● | ◎ | ◎ | ○ |
| K  Appearance | ◎ | ○ | ○ | ◎ | ○ | ● | ◎ | ◎ | ○ |
| L  Injection moldability | ◎ | ◎ | ◎ | ○ | ◎ | ◎ | ◎ | ◎ | ○ |
| M  Moisture resistance | ◎ | ◎ | ◎ | ○ | ◎ | ◎ | ◎ | ◎ | ◎ |
| N  Drip proofness | ○ | ○ | ○ | ○ | ○ | ○ | ○ | ○ | ○ |
| O  Antistatic property | ○ | ○ | ○ | ○ | ○ | ○ | ○ | ○ | ○ |

TABLE 20

| | Comparative (unit: wt. %) | | | | | | | | | |
|---|---|---|---|---|---|---|---|---|---|---|
| | 1b | 2b | 3b | 4b | 5b | 6b | 7b | 8b | 9b | 10b |
| LD3' | 100 | 99.2 | 99.45 | — | — | — | — | — | — | 74.45 |
| LD4' | — | — | — | 99.45 | — | — | — | — | — | — |
| L-L3' | — | — | — | — | 99.45 | — | — | — | — | — |
| L-L4' | — | — | — | — | — | 99.45 | — | — | — | — |
| M4' | — | — | — | — | — | — | — | — | — | — |
| M5' | — | — | — | — | — | — | — | — | — | 25 |
| M6' | — | — | — | — | — | — | 99.8 | — | — | — |
| M7' | — | — | — | — | — | — | — | 99.65 | — | — |
| M8' | — | — | — | — | — | — | — | — | — | — |
| P1' | — | — | — | — | — | — | — | — | 99.35 | — |
| Lubricant (oleic amide) | — | 0.05 | — | — | — | — | — | 0.05 | — | — |
| Lubricant (calcium stearate) | — | 0.20 | 0.20 | 0.20 | 0.20 | 0.20 | — | 0.20 | 0.20 | 0.20 |
| Antioxidant A | — | 0.05 | 0.05 | 0.05 | 0.05 | 0.05 | 0.05 | — | 0.05 | 0.05 |
| Antioxidant B | — | — | — | — | — | — | 0.05 | — | — | — |
| Antioxidant C | — | 0.05 | — | 0.05 | 0.05 | 0.05 | — | — | 0.05 | — |
| Antioxidant D | — | 0.05 | — | 0.05 | 0.05 | 0.05 | — | — | 0.05 | — |
| Hydrotalcite compound | — | 0.1 | — | — | — | — | — | — | — | — |
| Surfactant A | — | 0.1 | 0.1 | 0.1 | 0.1 | 0.1 | — | — | 0.1 | 0.1 |
| Surfactant B | — | 0.1 | 0.1 | 0.1 | 0.1 | 0.1 | — | — | 0.1 | 0.1 |

TABLE 20-continued

| | | Comparative (unit: wt. %) | | | | | | | | | |
|---|---|---|---|---|---|---|---|---|---|---|---|
| | | 1b | 2b | 3b | 4b | 5b | 6b | 7b | 8b | 9b | 10b |
| Organic nucleating agent A | | — | 0.1 | 0.1 | 0.1 | 0.1 | 0.1 | 0.1 | 0.1 | 0.1 | 0.1 |
| Organic nucleating agent B | | — | — | — | — | — | — | — | — | — | — |
| [Test method] | | | | | | | | | | | |
| H | Photographic property | X~Δ | ● | Δ | Δ | Δ | Δ | ● | Δ | Δ | Δ |
| I | Transparency | Δ | Δ | Δ | X | ● | ○ | ● | ● | ◎ | Δ |
| J | Molding trouble proofness | *1 X | *1 Δ~● | *1 X~Δ | *1 X | *1 X | *1 X *3 | *1 X *3 | *1 X | Δ *3 | Δ |
| K | Appearance | *2 X | *2 Δ | *2 X~Δ | *2 X | *2 X | *2 X *3 | *2 X *3 | *2 X | Δ *3 | Δ |
| L | Injection moldability | X | Δ | X~Δ | Δ | X | X | X | ◎ | Δ | Δ |
| M | Moisture resistance | X *3 | Δ~● | Δ *3 | Δ *3 | X *3 | X *3 | X *3 | ◎ | Δ *3 | Δ |
| N | Drip proofness | Δ | ○ | ○ | ○ | ○ | ○ | Δ | Δ | ○ | ○ |
| O | Antistatic property | Δ | ○ | ○ | ○ | ○ | ○ | Δ | Δ | ○ | ○ |

*1; Resin discoloration trouble (black dot-like substance)
*2; Black dot-like coloring trouble
*3; Distortion Test evaluation of the characteristics of the injection molded article is as follows:

◎; very excellence, ○; excellence, ●; limit of practical use, ▲; necessity of improvement, ×; impossibility of practical use.

Test method of the characteristics is as follows:

(H) The photographic property is judged on the basis of influence for the photographic property (fog, change of the sensitivity, the gradation and the color) with regard to the Fuji color negative film of ISO sensitivity 400.

(I) The transparency is judged on the basis of a distance which is impossible to distinguish parallel lines, width of which is 0.5 mm, illustrated on a white paper at an interval of 2 mm when the container body 31 is separated from the parallel line. The transparency is greater as the distance is longer.

(J) The molding trouble proofness is judged on the basis of occurrence of injection molding trouble, for example, resin discoloration, short shot and burr.

(K) The appearance is judged on the basis of coloring trouble, gloss and occurrence of flaw observed by watching the container body 31.

(L) The injection moldability is judged on the basis of total suitability, for example, molding cycle, motor loading of the injection molding machine, blocking proofness of the resin pellet and the injection molded article, and carrier ability of the molded article.

(M) The moisture resistance is judged on the basis of weight increase due to moisture absorbing when the container body 11 shown in FIG. 2 is left for one day in a isothermal constant-humidity chamber of 50° C. and 90% RH after moisture absorbing agent (silica gel) of 5 g is inserted in the container body 11 and the container body 11 is sealed with the lid 12 relative to each test.

(N) The drip proofness is judged on the basis of a state that drop of water is adhered on a side wall of the container body when the container body is left in a room of 30° C. after keeping it at 10° C. for one month. At this time, the photo film cassette is packaged with the container body and the container lid.

(O) The antistatic property is judged by watching an amount of dust adhered to the container body when it is injection-molded.

Upon comparing the Examples (1b–9b) and Comparatives (1b–10b), Examples (1b–9b) are superior for all tests of (H) to (M) so that it is possible to put them in practical use. Comparatives (1b–10b) have many problems when they are put in practical use. For example, with respect to Comparatives 1b and 5b–7b, the distortion occurs during test and the moisture resistance becomes bad so that it is difficult to put them in practical use.

LD3'; High-density homopolyethylene resin (the MFR, the density and the molecular-weight distribution of which are respectively 10 g/10 min, 0.956 g/cm³ and 6.3, and produced by a polymerizing method using the conventional multi-sight catalyst, hereinafter HDPE resin.)

LD4'; High-density homopolyethylene resin (the MFR, the density and the molecular-weight distribution of which are respectively 10 g/10 min, 0.967 g/cm$^3$ and 4.2, and produced by a polymerizing method using the conventional multi-sight catalyst, hereinafter HDPE resin.)

L-L3'; Ethylene-butene-1 copolymer resin (the MFR, the density and the molecular-weight distribution of which are respectively 6 g/10 min, 0.946 g/cm$^3$ and 5.7, and produced by a polymerizing method using a conventional multi-sight catalyst. At this time, content of the butene-1 is 1.0 mol %.)

L-L4'; Ethylene-butene-1 copolymer resin (the MFR, the density and the molecular-weight distribution of which are respectively 10 g/10 min, 0.941 g/cm$^3$ and 4.5, and produced by a polymerizing method using a conventional multi-sight catalyst. At this time, content of the butene-1 is 1.8 mol %.)

As the multi-sight catalyst, the Ziegler catalyst (mixture of triethyl aluminum and titanium tetrachloride) is used. Remaining amount of the titanium contained in the resin is 35 ppm or more.

M4'; Ethylene-butene-1 copolymer resin (the MFR, the density and the molecular-weight distribution of which are respectively 22 g/10 min, 0.956 g/cm$^3$ and 3.2, and produced by a polymerizing method using the single-sight catalyst according to the present embodiment. At this time, content of the butene-1 is 0.1 mol %.)

M5'; Ethylene-butene-1 copolymer resin (the MFR, the density and the molecular-weight distribution of which are respectively 16 g/10 min, 0.950 g/cm$^3$ and 2.7, and produced by a polymerizing method using the single-sight catalyst according to the present embodiment. At this time, content of the butene-1 is 0.6 mol %.)

M6'; High-density homopolyethylene resin (the MFR, the density and the molecular-weight distribution of which are respectively 18 g/10 min, 0.958 g/cm$^3$ and 3.6, and produced by the polymerizing method using the single-sight catalyst.)

M7'; High-density homopolyethylene resin (the MFR, the density and the molecular-weight distribution of which are respectively 28 g/10 min, 0.963 g/cm$^3$ and 2.8, and produced by the polymerizing method using the single-sight catalyst.)

M8'; Propylene.ethylene random copolymer resin (the MFR, the density and the molecular-weight distribution of which are respectively 25 g/10 min, 0.89 g/cm$^3$ and 3.6, and produced by the polymerizing method using the single-sight catalyst.)

With respect to the M4'–M8', a catalyst constituted of the alumino oxan is used as a cocatalyst of the zirconium metallocene complex. In each resin, remaining amount of the zirconium is 20 ppm or less.

P1'; Propylene.ethylene random copolymer resin (the MFR, the density and the molecular-weight distribution of which are respectively 12 g/10 min, 0.89 g/cm$^3$ and 5.8, and produced by the polymerizing method using the conventional multi-sight catalyst which is Ziegler-.Natta catalyst. In the resin, remaining amount of the titanium is 55 ppm.)

C: Examples of the Photo Film Cassette Made of Resin

The upper case and the lower case of the photo film cassette shown in FIGS. 4 and 5 were manufactured. The styrene-based resins (PS1', PS2', M9' and M10') shown in Table 21 are the following resins. The styrene-based resin constitutes the thermoplastic resin composition (Examples 1C–7C, Comparative 1c–2c) used for the upper case and the lower case. Table 21 shows characteristics of each resin, makeup of the thermoplastic resin composition, and characteristics of obtained injection molded article.

TABLE 21

(unit: wt. %)

| | Example | | | | | | | Comparative | |
|---|---|---|---|---|---|---|---|---|---|
| | 1C | 2C | 3C | 4C | 5C | 6C | 7C | 1c | 2c |
| PS1' | — | — | 37.9 | — | — | — | — | 38.3 | 73.3 |
| PS2' | — | — | — | 60 | — | — | 67.9 | 60 | — |
| M9' | 30 | — | — | 37.9 | — | — | — | — | — |
| M10' | 67.9 | 97.9 | 60 | — | 98.1 | 98.1 | 30 | — | 25 |
| Carbon black | 0.4 | 0.4 | 0.4 | 0.4 | 0.5 | 0.5 | 0.4 | 0.5 | 0.5 |
| Titanium oxide | 0.1 | 0.1 | 0.1 | 0.1 | — | — | 0.1 | — | — |
| Lubricant (polyethylene wax) | 0.1 | 0.1 | 0.1 | 0.1 | — | — | 0.1 | — | — |
| Lubricant (dimethylpoly siloxane) | 1 | 1 | 1 | 1 | 1 | 1 | 1 | 1 | 1 |
| Lubricant (zinc stearate) | 0.1 | 0.1 | 0.1 | 0.1 | — | 0.1 | 0.1 | — | — |
| Lubricant (calcium stearate) | — | — | — | — | 0.1 | — | — | 0.1 | 0.1 |
| Antioxidant A | 0.05 | 0.05 | 0.05 | 0.05 | — | — | — | 0.05 | 0.05 |
| Antioxidant B | — | — | — | — | 0.05 | 0.05 | — | — | — |
| Antioxidant C | 0.05 | 0.05 | 0.05 | 0.05 | — | — | 0.05 | 0.05 | 0.05 |
| Antioxidant D | — | — | — | — | 0.05 | 0.05 | 0.05 | — | — |
| Hydrotalcite | 0.1 | 0.1 | 0.1 | 0.1 | — | — | 0.1 | — | — |

TABLE 21-continued (unit: wt. %)

|  |  | Example | | | | | | | Comparative | |
|---|---|---|---|---|---|---|---|---|---|---|
|  |  | 1C | 2C | 3C | 4C | 5C | 6C | 7C | 1c | 2c |
| | compound | | | | | | | | | |
| | Surfactant A | 0.1 | 0.1 | 0.1 | 0.1 | 0.1 | 0.1 | 0.1 | — | — |
| | Surfactant B | 0.1 | 0.1 | 0.1 | 0.1 | 0.1 | 0.1 | 0.1 | — | — |
| [Test method] | | | | | | | | | | |
| P | Photographic property | ⊚ | ⊚ | ○ | ● | ● | ○ | ● | △ | △ |
| Q | Injection moldability | ○ | ○ | ○ | ○ | ○ | ○ | ○ | ○ | ○ |
| R | Heat resistance | ⊚ | ⊚ | ○ | ● | ⊚ | ⊚ | ● | △ | ● |
| S | Dispersion property of carbon black | ⊚ | ⊚ | ⊚ | ⊚ | ● | ○ | ⊚ | ● | ● |
| T | Appearance | ⊚ | ⊚ | ⊚ | ⊚ | ● | ○ | ⊚ | ● | ● |
| U | Resistance to chemicals | ⊚ | ⊚ | ○ | ● | ⊚ | ⊚ | ● | × | △ |
| V | Light shielding ability | ⊚ | ⊚ | ⊚ | ⊚ | ○ | ⊚ | ⊚ | ● | ● |
| W | Dust adhesion proofness | ○ | ○ | ○ | ○ | ○ | ○ | ○ | △ | △ |
| X | Recycle suitability | ○ | ○ | ○ | ○ | ○ | ○ | ○ | ● | ● |

In Table 21, test evaluation of the characteristics of the injection molded article is as follows:

⊚; very excellence, ○; excellence, ●; limit of practical use, △; necessity of improvement, ×; impossibility of practical use.

Test method of the characteristics of the injection molded article shown in Table 21 is as follows:

(P) The photographic property is judged on the basis of influence for the photographic property (fog, change of the sensitivity, the gradation and the color) with regard to the Fuji color negative film of ISO sensitivity 400.

(Q) The injection moldability is judged on the basis of total suitability, for example, molding cycle, motor loading of the injection molding machine, blocking proofness of the resin pellet and the injection molded article, and carrier ability of the molded article.

(R) The heat resistance is judged on the basis of temperature at which the distortion starts.

(S) The dispersion property of the carbon black is judged by observing a thin-wall leaf cut by microtome with the electron microscope.

(T) The appearance is judged on the basis of gloss, unevenness of gloss, flaw, silver streak, weldline, flow mark which are observed by watching the photo film cartridge.

(U) The resistance to chemicals is judged by observing a state of surface after dipping in toluene, xylene, benzene, gasoline and acetone at 23° C. for seven days.

(V) The light shielding ability is judged on the basis of the photographic fog of the color negative film having ISO sensitivity 400 after it was developed. The color negative film is developed after it was illuminated by light of 80,000 Lux in a state that the film is overlapped with a sheet rolled in 50 μm.

(W) The dust anti-adhesion property is judged on the basis of amount of cigarette ash adhered to the photo film cartridge when it is located apart from the cigarette ash by 5 cm after rubbing five times with a Teflon (trade name) cloth. The amount of the cigarette ash is observed by watching.

(X) The recycling suitability is judged on the basis of deterioration of the physical properties and the appearance when it is recycled five times.

PS1'; Homopolystyrene resin (the MFR, the density and the molecular-weight distribution of which are respectively 10 g/10 min, 1.05 g/cm$^3$ and 2.2, and produced by the conventional radical polymerizing method, hereinafter GPPS)

PS2'; Styrene.butadiene copolymer resin (the MFR, the density and the molecular-weight distribution of which are respectively 6.5 g/10 min, 1.05 g/cm$^3$ and 2.2, and produced by the conventional radical polymerizing method, hereinafter HIPS. At this time, content of butadiene rubber is 9 wt. %.)

M9'; Homopolystyrene resin (the MFR, the density and the molecular-weight distribution of which are respectively 12 g/10 min, 1.06 g/cm$^3$ and 2.1, and produced by the polymerizing method using the single-sight catalyst according to the present embodiment.)

M10'; Styrene butadiene copolymer resin (the MFR, the density and the molecular-weight distribution of which are respectively 11 g/10 min, 1.06 g/cm$^3$ and 1.8, and produced by the polymerizing method using the single-sight catalyst. At this time, content of the butadiene rubber is 9 wt. %.)

D: Examples of the Lens-fitted Film Unit

The front cover and the rear cover of the lens-fitted film unit shown in FIG. 6 were manufactured. The thermoplastic resin composition used for these is similar to the styrene-based resin composition used in Example 1C and Comparative 1c of the photo film cassette shown in Table 21.

Test result is also similar to that. Example 1C is superior in essential characteristics for the lens-fitted film unit, namely, it is superior in the photographic property, the heat resistance, the dispersion property of the carbon black, the appearance, the resistance to chemicals, light shielding ability and so forth. Example 1C has excellent characteristics in comparison with Comparative 1c.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An injection molded article used with a photosensitive material, said injection molded article being made of a thermoplastic resin composition, said thermoplastic resin composition comprising:

a thermoplastic resin of 30 wt. % or more, said thermoplastic resin having molecular weight distribution of 1.1–5.0 and being polymerized by using a single-sight catalyst;

a lubricant of 0.01–10 wt. %; and an antioxidant of 0.001–1.0 wt. %;

wherein said thermoplastic resin is selected from the group consisting of a polystyrene resin, a high impact polystyrene resin, a styrene-acrylonitrile copolymer resin, a styrene-acrylonitrile-butadiene copolymer resin, a propylene-α-olefin copolymer resin, a high-density polyethylene, an ethylene-α-olefin copolymer resin, a polyethylene terephthalate resin, a polybutylene terephthalate resin, a polyethylene naphthalate resin, a polyacetal resin, a polycarbonate resin and a polyvinyl chloride resin.

2. An injection molded article according to claim 1, wherein said single-sight catalyst includes at least one metallocene complex comprising zirconium, titanium, hafnium or vanadium.

3. An injection molded article according to claim 2, wherein an amount of said zirconium, said titanium, said hafnium and said vanadium contained in said molded article is 50 ppm or less.

4. An injection molded article according to claim 1, wherein at least one inorganic nucleating agent or organic nucleating agent is included in said thermoplastic resin composition by 0.001–10 wt. %.

5. An injection molded article according to claim 1, wherein at least one hydrotalcite compound is included in said thermoplastic resin composition by 0.01–10 wt. %.

6. An injection molded article according to claim 1, wherein a light shielding material is included in said thermoplastic resin composition by 0.05–60 wt. %, said light shielding material having all sulfur (ASTM D-1619) of 0.9% or less, free sulfur content (JIS K-6350) of 50 ppm or less, hydrogen cyanide (determined by 4-pyridine carboxylic acid pyrazolone light absorbing analytical method) of 20 ppm or less, and refractive index (measured by oil immersion method of Larsen) of 1.50 or more.

7. An injection molded article according to claim 1, wherein said lubricant consists of at least one kind of silicone-based lubricant, fatty acid amide-based lubricant or fatty acid metal salt-based lubricant.

8. An injection molded article according to claim 1, wherein at least one thermoplastic elastomers is included in said thermoplastic resin composition.

9. An injection molded article according to claim 8, wherein said thermoplastic elastomer is styrene-based thermoplastic elastomer.

10. An injection molded article according to claim 1, wherein at least one compatibilizing agent is included in said thermoplastic resin composition by 2–45 wt. %.

11. An injection molded article according to claim 1, wherein at least one antistatic agent is included in said thermoplastic resin composition by 0.01–20 wt. %.

12. An injection molded article according to claim 1, wherein said thermoplastic resin is produced by a producing process of gas phase method in which solvent is not used, wherein a polymerizing temperature is 40–100° C., and a polymerizing pressure is 5–50 kg/cm$^2$.

13. An injection molded article according to claim 2, wherein said thermoplastic resin is polyolefin resin having melt flow rate of 3–100 g/10 minutes and melting point of 90° C. or more.

14. An injection molded article according to claim 1, wherein said thermoplastic resin is crystalline syndiotactic polystyrene resin having a melt flow rate of 1–50 g/10 minutes and a melting point of 220–310° C.

15. An injection molded article according to claim 14, wherein said crystalline syndiotactic polystyrene resin is produced by polymerizing a styrene monomer with said single-sight catalyst, and said injection molded article comprises a plurality of parts made of said thermoplastic resin composition including said crystalline syndiotactic polystyrene resin by 50 wt. % or more.

16. An injection molded article according to claim 15, wherein at least one of said parts includes silicone-based lubricant and/or fatty acid metal salt-based lubricant in said thermoplastic resin composition by 0.01–10 wt. %.

17. An injection molded article according to claim 14, wherein said thermoplastic resin composition includes said crystalline syndiotactic polystyrene resin by 50 wt. % or more, and said injection molded article comprises said thermoplastic resin composition under a condition that a resin temperature is 230–350° C. and a mold temperature is 50–200° C.

18. An injection molded article according to claim 14, wherein said thermoplastic resin composition includes said crystalline syndiotactic polystyrene resin by 50 wt. % or more and a light shielding material by 0.05–40 wt. %, and said injection molded article is made of said thermoplastic resin composition under a condition that a resin temperature is 230–350° C. after drying moisture amount of said thermoplastic resin composition until it becomes 0.50 wt. % or less.

19. An injection molded article according to claim 2, wherein said thermoplastic resin is crystalline syndiotactic polystyrene resin having a melt flow rate of 1–50 g/10 minutes and a melting point of 220–310° C.

20. An injection molded article according to claim 19, wherein said crystalline syndiotactic polystyrene resin is produced by polymerizing a styrene monomer with said single-sight catalyst, and said injection molded article comprises a plurality of parts made of said thermoplastic resin composition including said crystalline syndiotactic polystyrene resin by 50 wt. % or more.

21. An injection molded article according to claim 20, wherein at least one of said parts includes silicone-based lubricant and/or fatty acid metal salt-based lubricant in said thermoplastic resin composition by 0.01–10 wt. %.

22. An injection molded article according to claim 19, wherein said thermoplastic resin composition includes said crystalline syndiotactic polystyrene resin by 50 wt. % or more, and said injection molded article is made of said thermoplastic resin composition under a condition that a resin temperature is 230–350° C. and a mold temperature is 50–200° C.

23. An injection molded article according to claim 19, wherein said thermoplastic resin composition includes said crystalline syndiotactic polystyrene resin by 50 wt. % or more and a light shielding material by 0.05–40 wt. %, and said injection molded article comprises said thermoplastic resin composition under a condition that a resin temperature is 230–350° C. after drying moisture amount of said thermoplastic resin composition until it becomes 0.50 wt. % or less.

24. An injection molded article according to claim 1, wherein said α-olefin component from which said ethylene-α-olefin copolymer resin is formed is selected from the group consisting of butene-1, pentene-1, octene-1, hexene-1, 4-methyl-pentene-1, heptene-1, 3-methyl-pentene-1, 4,4-dimethyl-pentene-1, hepcene-1, nonene-1, undecene-1, dodecene-1 and decene-1.

25. An injection molded article according to claim 1, wherein said thermoplastic resin is present in the composition in an amount of 50–99.5 wt %.

* * * * *